US010015060B2

(12) United States Patent
Yamada et al.

(10) Patent No.: US 10,015,060 B2
(45) Date of Patent: Jul. 3, 2018

(54) INFORMATION SHARING METHOD THAT PROVIDES A GRAPHICAL USER INTERFACE IMAGE FOR SHARING INFORMATION RELATING TO AN APPLICATION WITHIN A HOME AMONG A PLURALITY OF USERS

(71) Applicant: Panasonic Intellectual Property Corporation of America, Torrance, CA (US)

(72) Inventors: Kazunori Yamada, Aichi (JP); Shigehiro Iida, Osaka (JP); Mitsuhiro Aso, Osaka (JP); Michiko Sasagawa, Osaka (JP); Masayuki Hiromoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 667 days.

(21) Appl. No.: 14/399,076

(22) PCT Filed: Mar. 5, 2014

(86) PCT No.: PCT/JP2014/001224
§ 371 (c)(1),
(2) Date: Nov. 5, 2014

(87) PCT Pub. No.: WO2014/136451
PCT Pub. Date: Sep. 12, 2014

(65) Prior Publication Data

US 2015/0156074 A1 Jun. 4, 2015

Related U.S. Application Data

(60) Provisional application No. 61/775,146, filed on Mar. 8, 2013.

(51) Int. Cl.
*H04L 12/24* (2006.01)
*G06Q 10/10* (2012.01)
(Continued)

(52) U.S. Cl.
CPC .............. *H04L 41/22* (2013.01); *G05B 15/02* (2013.01); *G06Q 10/10* (2013.01); *G06Q 50/01* (2013.01); *G05B 2219/2613* (2013.01)

(58) Field of Classification Search
None
See application file for complete search history.

(56) References Cited

U.S. PATENT DOCUMENTS 7,383,036 B2 * 6/2008 Kang .................. H04L 12/2803 370/340
7,441,113 B2 * 10/2008 Chong .................. G06F 9/4401 713/1
(Continued)

FOREIGN PATENT DOCUMENTS

CN 1777253 5/2006
JP 2004-272650 9/2004
(Continued)

OTHER PUBLICATIONS

International Search Report dated May 20, 2014 in International (PCT) Application No. PCT/JP2014/001224.

*Primary Examiner* — Van Nguyen
(74) *Attorney, Agent, or Firm* — Wenderoth, Lind & Ponack, L.L.P.

(57) ABSTRACT

An information sharing method that provides a graphical user interface image for sharing information relating to an appliance within a home among a plurality of users includes a receiving step of receiving, as home appliance event information, information on a state change of an appliance within a plurality of homes, a priority determining step of determining a priority of a home that is to be displayed in the
(Continued)

graphical user interface image in accordance with an occurrence frequency of the home appliance event information within each home, and a home determining step of determining a home to be displayed in the graphical user interface image in accordance with the priority.

11 Claims, 63 Drawing Sheets

(51) Int. Cl.
*G06Q 50/00* (2012.01)
*G05B 15/02* (2006.01)

(56) References Cited

U.S. PATENT DOCUMENTS

| | | | | |
|---|---|---|---|---|
| 7,823,074 | B2 * | 10/2010 | Takemura | H04L 12/2803 715/757 |
| 8,073,921 | B2 * | 12/2011 | Thomas | G05B 15/02 709/208 |
| 8,086,836 | B2 * | 12/2011 | Chong | G06F 9/4401 712/32 |
| 9,329,650 | B2 * | 5/2016 | Paul | H02J 3/14 |
| 2002/0059617 | A1 * | 5/2002 | Terakado | H04N 21/8186 725/80 |
| 2006/0063645 | A1 | 3/2006 | Chiang | |
| 2008/0282182 | A1 | 11/2008 | Oosaka | |
| 2010/0306404 | A1 * | 12/2010 | Wakita | G06F 21/6245 709/231 |
| 2011/0178618 | A1 * | 7/2011 | Iggulden | G05B 15/02 700/94 |
| 2012/0162709 | A1 | 6/2012 | Watanabe et al. | |
| 2013/0054166 | A1 | 2/2013 | Suzuki et al. | |
| 2013/0245849 | A1 * | 9/2013 | Paul | H02J 3/14 700/295 |

FOREIGN PATENT DOCUMENTS

| | | |
|---|---|---|
| JP | 2005-101839 | 4/2005 |
| JP | 2006-81903 | 3/2006 |
| JP | 2008-9466 | 1/2008 |
| JP | 2012-141792 | 7/2012 |
| JP | 2013-20587 | 1/2013 |
| JP | 2013-45229 | 3/2013 |
| TW | 200619959 | 6/2006 |

* cited by examiner

FIG. 5

| EVENT OCCURRENCE TIME | APPLIANCE ID | HOME APPLIANCE TYPE | HOUSEWORK TYPE | DETAILED HOUSEWORK TYPE | EVENT | EVENT VALUE |
|---|---|---|---|---|---|---|
| 2010/01/01 12:12:35 | ID-001 | LAUNDRY MACHINE | LAUNDRY -RELATED | LAUNDRY | LAUNDRY OPERATION | START (START, END) |
| 2010/01/01 12:12:36 | ID-001 | LAUNDRY MACHINE | LAUNDRY -RELATED | DRYING | DRYING OPERATION | END (START, END) |
| 2010/01/01 12:13:36 | ID-002 | VACUUM CLEANER | CLEANING -RELATED | CLEANING | HEAD SPEED | NORMAL (FAST, NORMAL, SLOW) |
| 2010/01/01 12:15:35 | ID-002 | VACUUM CLEANER | CLEANING -RELATED | CLEANING | DUST SENSOR | LARGE (SUCKED AMOUNT, LARGE, SMALL, NONE) |
| 2010/01/01 12:19:35 | ID-002 | VACUUM CLEANER | CLEANING -RELATED | CLEANING | SUCTION FORCE | MEDIUM (STRONG, MEDIUM, WEAK) |
| 2010/01/01 12:20:55 | ID-003 | IRON | ORGANIZING -RELATED | LAUNDRY ORGANIZING | HEATING | STRONG (STRONG, MEDIUM, WEAK) |
| 2010/01/01 12:22:25 | ID-004 | MICROWAVE | KITCHEN WORK -RELATED | COOKING | COOKING | MICROWAVE (MICROWAVE, HEATING) |
| 2010/01/01 12:32:30 | ID-005 | IH COOKER | KITCHEN WORK -RELATED | COOKING | COOKING | STRONG (STRONG, MEDIUM, WEAK) |
| | : | : | : | : | : | : |

FIG. 7

| HOUSEWORK TYPE | NUMBER OF SNSs PARTICIPATED BY REGISTRANT | HOUSEWORK TYPE COEFFICIENT | SNS VIEWING TIME OF REGISTRANT FOR EACH HOUSEWORK TYPE |
|---|---|---|---|
| ORGANIZING -RELATED | THREE | 2 | 15H/Week |
| KITCHEN WORK -RELATED | TWO | 5 | 20H/Week |
| LAUNDRY -RELATED | ONE | 7 | 10H/Week |

FIG. 8

| HOUSEWORK TYPE | NUMBER OF SNSs PARTICIPATED BY VIEWER | HOUSEWORK TYPE COEFFICIENT | SNS VIEWING TIME OF VIEWER FOR EACH HOUSEWORK TYPE |
|---|---|---|---|
| ORGANIZING -RELATED | THREE | 2 | 15H/Week |
| KITCHEN WORK -RELATED | TWO | 5 | 20H/Week |
| LAUNDRY -RELATED | ONE | 7 | 10H/Week |

FIG. 9

| HOUSEWORK TYPE OF HOUSE | BUSYNESS | COLOR | PRESENTATION 1 | PRESENTATION 2 |
|---|---|---|---|---|
| ORGANIZING -RELATED | INTENSE | GREEN | FLAME | FLAME |
| KITCHEN WORK -RELATED | MEDIUM | ORANGE | NORMAL | NONE (SMOKE IF ANY) |
| LAUNDRY -RELATED | MILD | BLUE | NORMAL | NONE (WAVE IF ANY) |

FIG. 12

| MESSAGE CONTENT | MESSAGE-ASSOCIATED HOME APPLIANCE TYPE | OPERATION EXAMPLE |
|---|---|---|
| USER INPUT TEXT | IH COOKER | SUPERIMPOSE MESSAGE AT THE TIME OF OPERATION OF IH COOKER |
| PRE-SET TEXT | FAN | OUTPUT Tweet INFORMATION WHEN FAN IS SHUT OFF |

FIG. 21

| | APPLIANCE ID | HOME APPLIANCE TYPE | EVENT | EVENT VALUE |
|---|---|---|---|---|
| 2211 | 200xxx1 | LAUNDRY MACHINE | POWER | ON·OFF |
| 2212 | 200xxx1 | LAUNDRY MACHINE | OPERATION | WASHING, RINSING, SPINNING, DRYING |
| 2213 | 200xxx2 | VACUUM CLEANER | POWER | ON·OFF |
| | 200xxx2 | VACUUM CLEANER | HEAD SPEED | FAST, NORMAL, SLOW |
| | 200xxx2 | VACUUM CLEANER | DUST SENSOR | SUCTION FORCE, LARGE, SMALL, NONE |
| | 200xxx2 | VACUUM CLEANER | SUCTION FORCE | STRONG, MEDIUM, WEAK |
| | 200xxx3 | IRON | POWER | ON·OFF |
| | 200xxx3 | IRON | MODE | STEAM, HIGH, MEDIUM, LOW |
| | 200xxx4 | BODY COMPOSITION SCALE | WEIGHT | 62kg |
| | 200xxx4 | BODY COMPOSITION SCALE | BODY FAT PERCENTAGE | 14.2% |
| | : | : | : | : |

FIG. 22

| | HOUSE ID | EVENT TYPE | EVENT | EVENT VALUE |
|---|---|---|---|---|
| 2221 | 000-0001 | HOME APPLIANCE: LAUNDRY MACHINE | POWER | ON |
| 2222 | 000-0001 | HOME APPLIANCE: VACUUM CLEANER | HEAD SPEED | FAST |
| 2223 | 000-0002 | TWEET | TEXT | "IT'S ANOTHER ROUGH DAY CLEANING THE ROOM" |
| | 000-0002 | HOUSE | NAME | HANASAN@TOKYO |
| 2224 | 000-0003 | HOUSE | TITLE | HOUSEWORK MASTER |
| 2225 | 000-0003 | HOUSE | STATE | VIBRANT |
| | : | : | : | : |

FIG. 34

| APPLIANCE ID | HOME APPLIANCE TYPE |
|---|---|
| aa:bb:cc:01 | TYPE_MICROWAVE_OVEN |
| aa:bb:cc:02 | TYPE_IH |
| aa:bb:cc:03 | TYPE_TV |
| aa:bb:cc:04 | TYPE_TOOTHBRUSH |
| aa:bb:cc:05 | TYPE_A_SENSOR_MODULE |

| HOME APPLIANCE TYPE | MOUNTED SENSOR TYPE | EVENT PROCESS |
|---|---|---|
| TYPE_A_SENSOR_MODULE | ACCELEROMETER | If value > DEFAULT_ACCELEROMETOER_VALUE then Event Emit POWER_ON else POWER_OFF |
| | TEMPLATURE | ... |
| | ... | ... |

FIG. 39

| USER ID | GWID | REGISTERED NAME | REGISTERED COMMUNITY | POSSESSED APPLIANCE | REFERENCE TO OPERATION HISTORY |
|---|---|---|---|---|---|
| U0001 | G0001 | Haru | DIET COMMUNITY | BATHROOM SCALE<br>WASHSTAND | ● |
| U0002 | G0002 | Aki | CLEANING COMMUNITY | VACUUM CLEANER | |

40310 40320 40301 40302 40303 40304 40305 40306

OPERATION HISTORY DB OF Haru

| YEAR/MONTH/DAY | TIME | OPERATED APPLIANCE | OPERATION DETAIL |
|---|---|---|---|
| 2013/3/1 | 21:00 | BATHROOM SCALE | POWER ON |
| 2013/3/1 | 21:00 | BATHROOM SCALE | PERSON SELECTION (No. 1) |
| 2013/3/1 | 21:01 | BATHROOM SCALE | MEASUREMENT COMPLETE (No. 1, 46.5 kg) |
| 2013/3/1 | 21:02 | BATHROOM SCALE | POWER OFF |
| 2013/3/2 | 22:00 | BATHROOM SCALE | POWER ON |

| | COMMUNITY | CORRESPONDING APPLIANCE | REFERENCE TO APP |
|---|---|---|---|
| 40510 | DIET COMMUNITY | BATHROOM SCALE | (REFERENCE TO APP 1) |
| 40520 | CLEANING COMMUNITY | VACUUM CLEANER | (REFERENCE TO APP 2) |
| | 40501 | 40502 | 40503 |

INFORMATION SHARING METHOD THAT PROVIDES A GRAPHICAL USER INTERFACE IMAGE FOR SHARING INFORMATION RELATING TO AN APPLICATION WITHIN A HOME AMONG A PLURALITY OF USERS

TECHNICAL FIELD

The present invention relates to an information sharing method that realizes an information sharing service using information obtained from an appliance (home appliance and sensor) within a home.

BACKGROUND ART

Due to the spread of smartphones, social networking services (hereinafter abbreviated as "SNSs") in recent years have allowed smartphone users to share experiences with friends instantly, enabling these people to exchange fresh information, which is attractive as content, over the devices.

However, information on a current SNS is mainly text information input by a user of the service him/herself, and the time of occurrence of an event that the information actually refers to is unclear. Whether the content of information is factual is unclear to a viewer of the information, and proof cannot be provided by one who inputs the information.

As one example of a method of sharing an operating situation of an appliance or the like with another person, there is a method disclosed in Patent Literature 1. Therein, a technique is disclosed in which remote control of an appliance installed within a building is performed from a mobile terminal, and information on control at that time is notified also to another user through e-mail.

However, the system configuration, user interface, and method of forming a screen in the case where a large number of users release information are not disclosed.

CITATION LIST

Patent Literature

Patent Literature 1: Japanese Patent Application Laid-open No. 2005-101839

SUMMARY OF INVENTION

An object of the present invention is to provide a more attractive graphical user interface image with enhanced reality or real time properties of information by sharing information on the state change of an appliance that has actually occurred between a plurality of users.

An information sharing method according to one aspect of the present invention is an information sharing method that provides a graphical user interface image for sharing information relating to an appliance within a home between a plurality of users, including a receiving step of receiving, as home appliance event information, information on a state change of an appliance within a plurality of homes, a priority determining step of determining a priority of a home that is to be displayed in accordance with an occurrence frequency of the home appliance event information within each home, and a home determining step of determining a home to be displayed in the graphical user interface image in accordance with the priority.

With the information sharing method described above, a more attractive graphical user interface image with enhanced reality or real time properties of information can be provided by sharing information on the state change of an appliance that has actually occurred between a plurality of users.

BRIEF DESCRIPTION OF DRAWINGS

FIG. 5 is a view showing one example of home appliance event information used in the information sharing system in Embodiment 1 of the present invention.

FIG. 7 is a view showing one example of setting information on a transmission side user that is used in a character setting of a house used in the information sharing system in Embodiment 1 of the present invention.

FIG. 8 is a view showing one example of setting information on a viewing side user that is used in a character setting of a house used in the information sharing system in Embodiment 1 of the present invention.

FIG. 9 is a view showing a presentation example of a character setting of a house used in the information sharing system in Embodiment 1 of the present invention.

FIG. 12 is a view showing one example of message information used in the message superimposition process of the information sharing system in Embodiment 1 of the present invention.

FIG. 21 is a view showing one example of home appliance event information transmitted by a home appliance.

FIG. 22 is a view showing one example of home appliance event information transmitted by the SNS server.

FIG. 34 is a view showing one example of home appliance event information used in the determination of the type of appliance connected to a network.

FIG. 35 is a view showing one example of home appliance event information acquired from a home appliance management server shown in FIG. 30.

FIG. 39 is a view showing one example of a customer database stored in a customer DB and one example of a user operation history database stored in an operation history DB shown in FIG. 38.

FIG. 40 is a view showing one example of a community database stored in a community DB shown in FIG. 38.

DESCRIPTION OF EMBODIMENTS

Each embodiment of the present invention will be described below with reference to the drawings.

(Embodiment 1)

In this embodiment, a method of collecting, as home appliance event information, information on the state change of an appliance such as a home appliance or sensor within a home that occurs due to, for example, a user operation or the like and forming an information display screen (graphical user interface image) for sharing on a social network is described.

Figure 1:
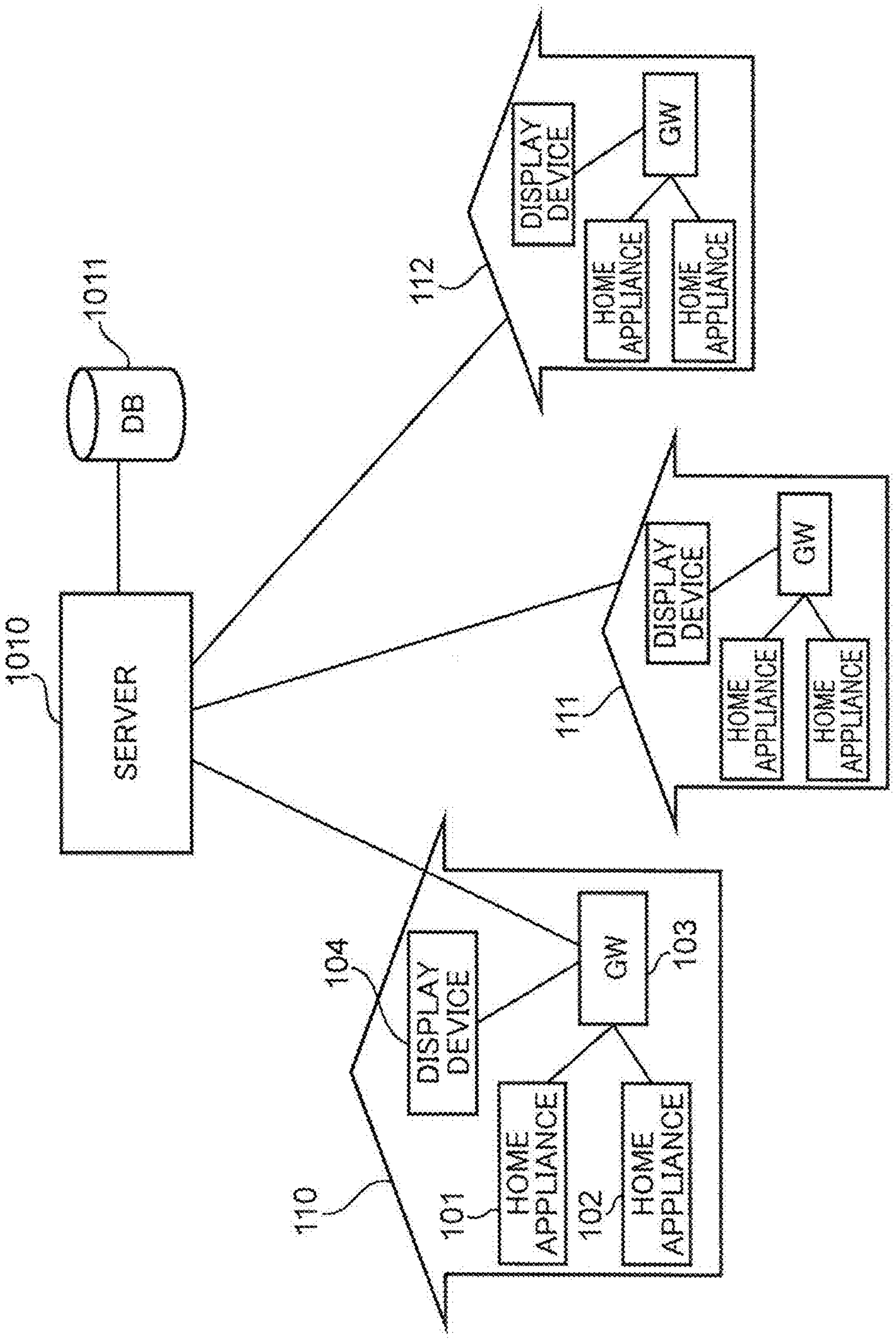
FIG. 1 is a view showing the configuration of an information sharing system in Embodiment 1 of the present invention.

FIG. 1 is a view showing the configuration of an information sharing system in Embodiment 1 of the present invention. In FIG. 1, home appliance event information including the state of a home appliance is transmitted from a home appliance 101 or 102 within each house 110, 111, or 112 registered in advance with respect to a server 1010 via a gateway (hereinafter referred to as "GW") 103. Each of the houses 110, 111, and 112 represent one home.

The server 1010 acquires and stores, in a database (DB) 1011, the home appliance event information on the home appliance 101 or 102 sent from each of the houses 110, 111, and 112. The server 1010 retrieves home appliance event information on a house (home) desired by a user from the DB 1011 based on setting information on the user owning a display device 104, forms information on each house as screen information based on the home appliance type and housework type included in the home appliance event information and the occurrence frequency of the home appliance event information, and provides the screen information (graphical user interface image) with respect to a request of the display device 104.

That is, the information sharing system shown in FIG. 1 is an information sharing system that provides a graphical user interface image for sharing information relating to an appliance within a home between a plurality of users. The server 1010 receives information on the state change of the home appliance 101 or 102 within the plurality of houses 110, 111, and 112 as home appliance event information, determines the priority of a house that should be displayed in a graphical user interface image in accordance with the occurrence frequency of the home appliance event information within the respective houses 110, 111, and 112, and determines the house to be displayed in the graphical user interface image in accordance with the determined priority.

The home appliance event information includes home appliance type information representing the type of appliance. The server 1010 uses home appliance type information to classify home appliance event information for each type of appliance, determines the priority of a house that should be displayed in a graphical user interface image in accordance with the occurrence frequency of the home appliance event information for each type of appliance, and determines the house to be displayed in the graphical user interface image in accordance with the determined priority.

The server 1010 generates and transmits, to the display device 104, a graphical user interface image in which the display state of an appliance icon representing an appliance within a home displayed in the graphical user interface image is changed in accordance with the occurrence frequency of home appliance event information for each type of appliance. The display device 104 changes and displays, in the graphical user interface image, the display state of the appliance icon in accordance with the occurrence frequency of the home appliance event information for each type of appliance.

The home appliance event information includes home appliance type information representing the type of appliance and housework type information representing the type of housework associated with the type of appliance specified by the home appliance type information. The server 1010 uses housework type information to classify home appliance event information for each type of housework, determines the priority of a house that should be displayed in accordance with the occurrence frequency of the home appliance event information associated with the type of housework selected by a user, and determines the house to be displayed in a graphical user interface image in accordance with the determined priority.

The server 1010 generates and transmits, to the display device 104, a graphical user interface image in which the display state of a home icon representing a house displayed in the graphical user interface image is changed in accordance with the occurrence frequency of home appliance event information associated with the type of housework selected by a user. The display device 104 changes and displays, in the graphical user interface image, the display state of the home icon in accordance with the occurrence frequency of the home appliance event information associated with the type of housework selected by the user.

The server 1010 receives request information requesting display in coordination with the type of appliance or type of housework selected by a user and message information including a message input by the user, and, when home appliance event information associated with the type of appliance or type of housework specified by the request information is received, generates and transmits, to the display device 104, a graphical user interface image in which the message is superimposed and displayed. The display device 104 superimposes and displays the message in the graphical user interface image, when the server 1010 has received the home appliance event information associated with the type of appliance or type of housework specified by the request information.

The server 1010 generates and transmits, to the display device 104, a graphical user interface image in which message information is superimposed and displayed near a home icon of a user that has transmitted the message information. The display device 104 displays the home icon in the graphical user interface image and superimposes and displays the message information near the home icon.

The server 1010 generates and transmits, to the display device 104, a graphical user interface image in which message information is superimposed and displayed near an appliance icon representing an appliance within a home of a user that has transmitted the message information. The display device 104 displays the appliance icon in the graphical user interface image and superimposes and displays the message information near the appliance icon.

In FIG. 1, the display device 104, the home appliance 101 or 102, or a sensor does not necessarily need to communicate with the server 1010 via the GW and may include communication means for communicating directly with the server 1010. The GW may be an access point of a wireless local area network (LAN) or may be a dedicated GW connected with each appliance with a low power transceiver or the like and further connected with the server 1010 via the Internet. The display device 104 is a device that can display screen information, such as a television, smartphone, or personal computer (PC), and may be a home appliance, as long as screen information can be displayed.

Figure 2:
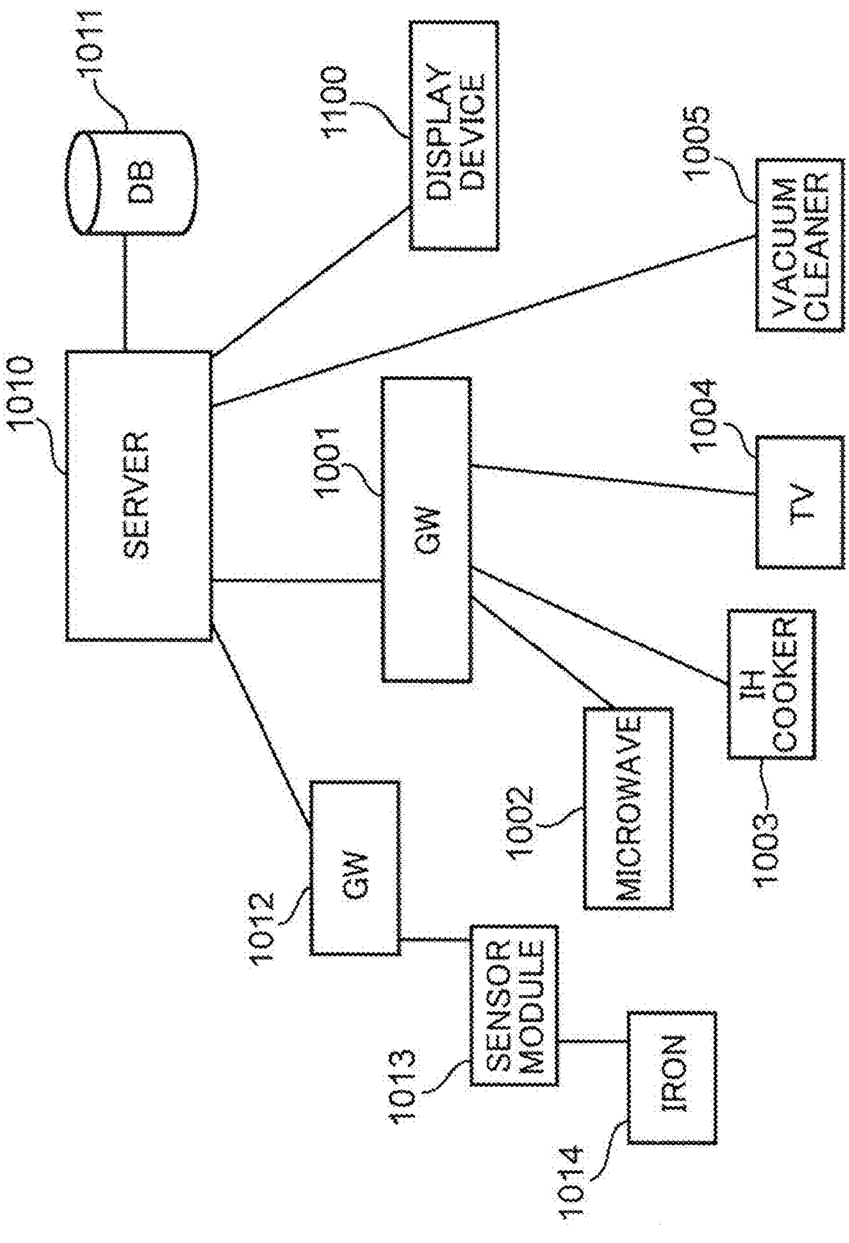
FIG. 2 is a configuration diagram of the information sharing system representing the inside of a house in FIG. 1 in more detail.

FIG. 2 is a configuration diagram of the information sharing system representing the inside of the house 110 in FIG. 1 in more detail. As shown in FIG. 2, a microwave 1002, an induction heating (IH) cooker 1003, and a television (TV) 1004 are connected as the home appliance 101 or 102 shown in FIG. 1 to a GW 1001.

In the case of a home appliance not having a function of transmitting information on itself such as an iron 1014, it may be such that a separate sensor module 1013 is attached, and information is transmitted to the server 1010 from the sensor module 1013 via a GW 1012. In this manner, an appliance as a subject matter of the present invention may be not only a home appliance, a sensor, or a home appliance built in with a sensor, but also a home appliance attached with a sensor module. An object such as a pot can be treated as a home appliance by attaching a sensor module to the object such as a pot.

A home appliance and a display device may access the server 1010 through access to an Internet network such as a third-generation (3G) network directly, as with a vacuum cleaner 1005 and a display device 1100. The server 1010 is often mainly arranged on a cloud.

Figure 3:
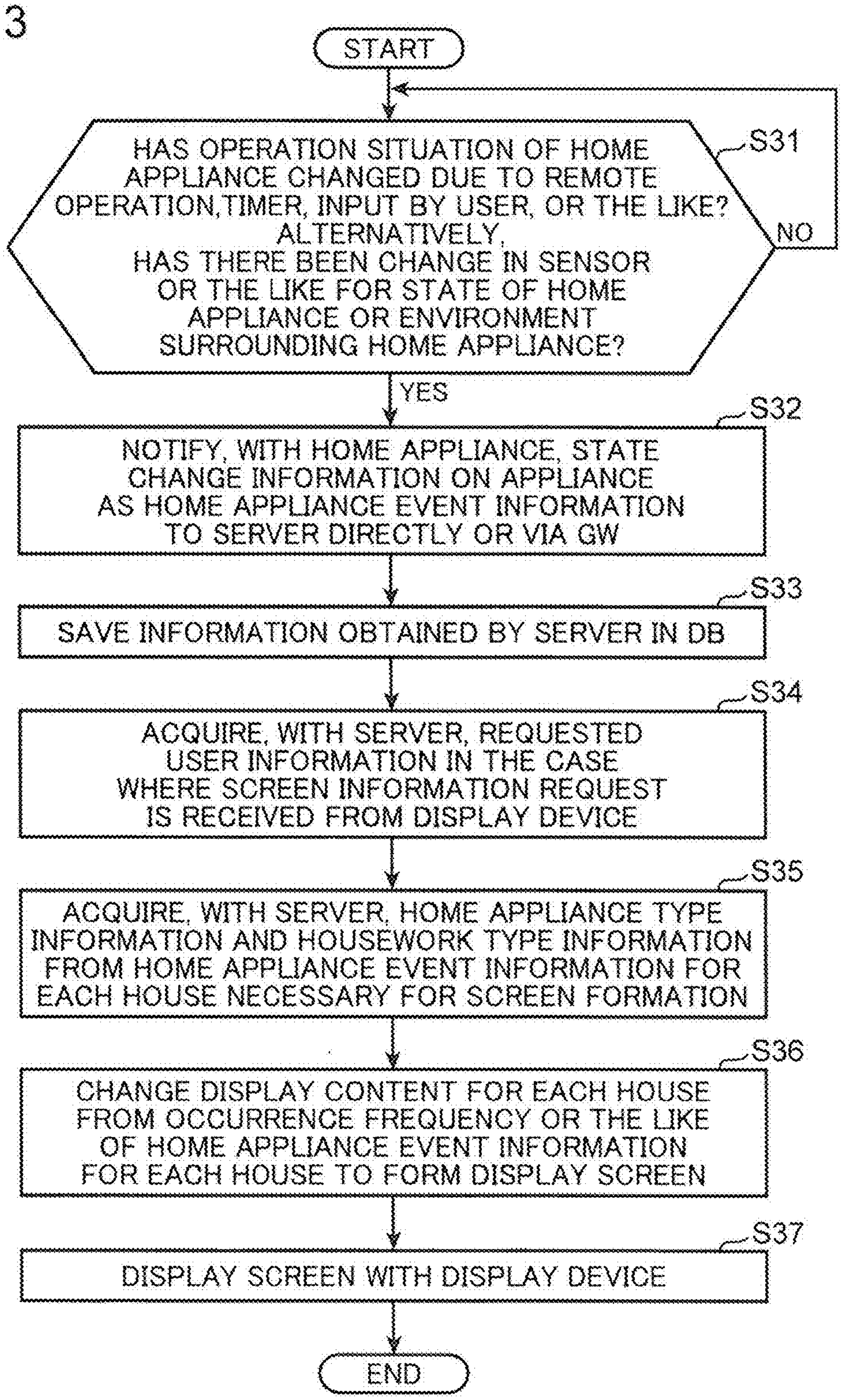
FIG. 3 is a flowchart showing the operation of the information sharing system in Embodiment 1 of the present invention.

FIG. 3 is a flowchart showing the operation of the information sharing system in Embodiment 1 of the present invention. As shown in FIG. 3, the respective home appliances 101 and 102 determine whether or not the state of the appliance has changed by determining whether or not the operation situation of the home appliance has changed due to a remote operation, a timer, an input by a user, or the like or whether or not there has been a change in the state of the home appliance 101 or 102 or the environment surrounding the home appliance 101 or 102 with a sensor (e.g., the sensor module 1013) or the like (step S31).

In the case where there has been a change in the operation situation of the home appliance (YES in step S31), the home appliance 101 or 102 notifies information on the state change of the home appliance as home appliance event information to the server 1010 directly or via the GW 103 (step S32). In the case where there has not been a change in the operation situation or the like of the home appliance (NO in step S31), the process of step S31 is repeated.

Next, the server 1010 saves the obtained home appliance event information in the DB 1011 (step S33). Next, in the case where a screen information request from the display device 104 is received, the server 1010 acquires, from the DB 1011, information on the user (e.g. house in display setting, preference of housework category, registered community, or viewed information) requested by the screen information request (step S34).

Next, the server 1010 acquires home appliance type information and housework type information from the home appliance event information for each house necessary for screen formation (step S35). Next, from the occurrence frequency of the home appliance event information for each house, the occurrence frequency of the home appliance event information for each housework type, the occurrence frequency of the home appliance event information for each home appliance type, and user information, the server 1010 changes the display content for each house to form a display screen and transmits the display screen to the display device 104 (step S36).

Specifically, the server 1010 determines the priority of a house that should be displayed in a graphical user interface image in accordance with the occurrence frequency of the home appliance event information for each house, the occurrence frequency of the home appliance event information for each housework type, and the occurrence frequency of the home appliance event information for each home appliance type. From the determined priority, the server 1010 determines a predetermined number of houses having a high-level priority (e.g., houses of up to the fifth highest level) as the house to be displayed in the graphical user interface image, and generates and transmits, to the display device 104, the graphical user interface image in which a home icon or the like representing the determined house is displayed.

Finally, the display device 104 displays the received display screen (graphical user interface image) (step S37).

Figure 4:
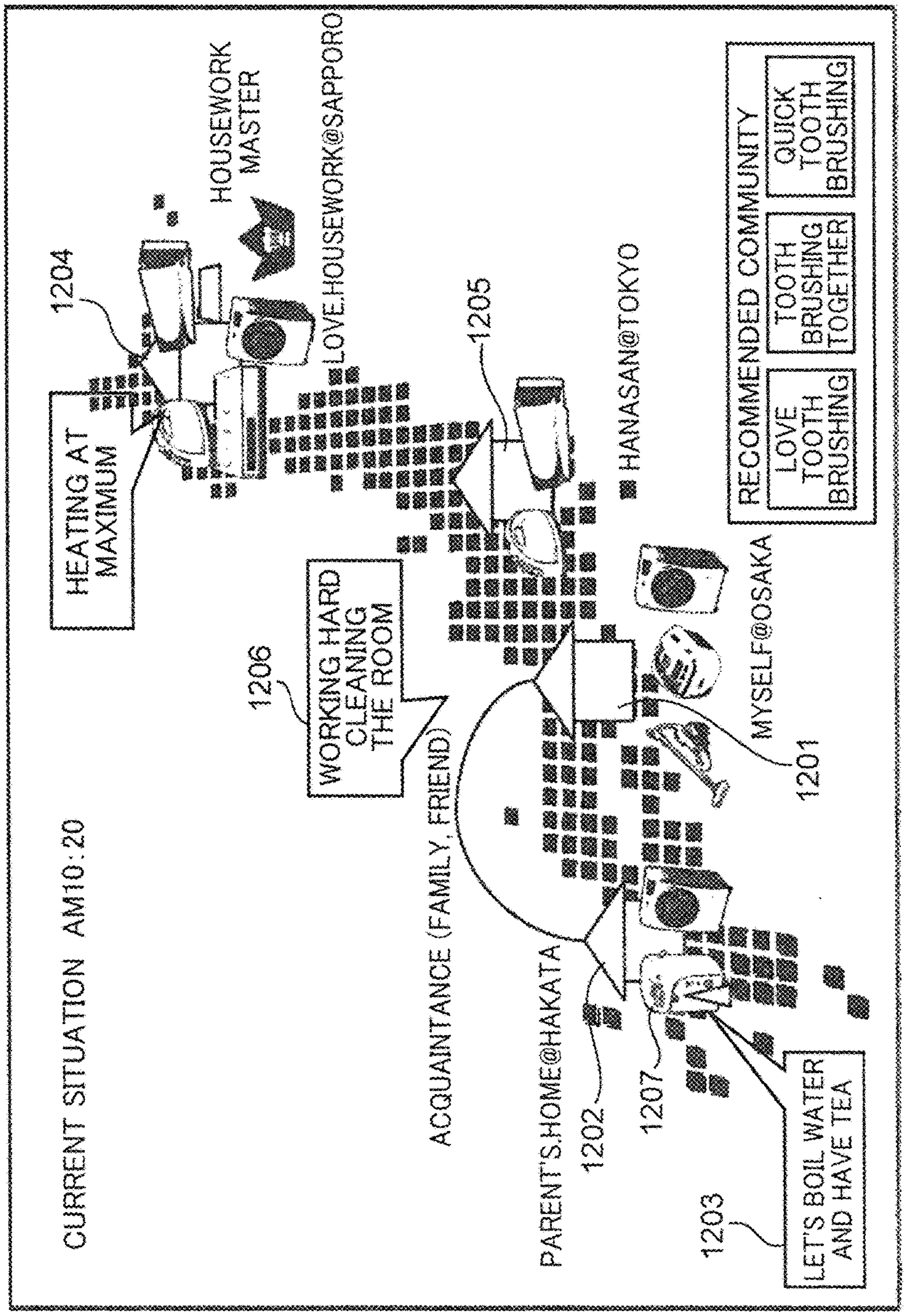
FIG. 4 is a view showing one example of screen information on an information sharing service by the information sharing system in Embodiment 1 of the present invention.

FIG. 4 is a view showing one example of screen information on an information sharing service by the information sharing system in Embodiment 1 of the present invention. The screen information shown in FIG. 4 is displayed in the display device 104 of a user as a graphical user interface image, so that operation state information on a home appliance of each house that the user wants to see is displayed and shared on a screen. For example, in the case where the priority of a house that should be displayed in the graphical user interface image is determined in accordance with the occurrence frequency of home appliance event information within each house and three houses with high priority out of transmission side users have been determined, home icons 1202, 1204, and 1205 corresponding to the three houses of the transmission side users in addition to a home icon 1201 corresponding to a house of a viewing side user are displayed on a map of Japan.

For example, in the case where an air conditioner that is a heating appliance is heating at maximum in the house (home) represented by the home icon 1204 and a user of a community likes the situation of air conditioning, a house using a heating appliance is selected and displayed without displaying other houses. In this case, by setting divided regions of, for example, six blocks on the map of Japan and causing a setting to be such that at least one house with significant use of air conditioning is selected and displayed for each region, information on the house with significant use of air conditioning can be displayed conveniently while displaying a house with many cleaning events or the like.

As with a message 1203, a message or the like of each house can be displayed in addition by providing a link with a post or the like of another SNS site via a temporal or communication application programming interface (API). A mark of a house may be displayed in units of persons, and a human-shaped icon or the like may be used.

In the case where a user him/herself has a character input device at this time, the user can input a message within the service to display the information in accordance with a home appliance event. Audio data may be input using an audio input device, or a moving image may be shared using a moving image input device. Further, it is also possible to use an audio recognition device to display audio data as a text.

In the screen information described above, a house to be selected is selected with setting information on a transmission side user that releases information and setting information on a viewing side user that views the information. For example, in the case where the transmission side user wants to emphasize kitchen work, the priority becomes higher in the selection of a house to be displayed in the display device 104 of the viewing side user when the occurrence frequency of kitchen work-related home appliance event information is greater than or equal to a certain level, and a kitchen work-related home appliance is displayed to be greater than or in a more easily viewable position than other home appliances.

There are cases where a house to be displayed in the display device 104 of a viewing side user is selected based on the preference or setting information on the viewing side user. Obviously, there are cases where a transmission side user and a viewing side user are the same person. In the case where setting information on a transmission side user is information prioritizing kitchen work-related housework, information display in accordance with the priority is possible also for screen information on a viewing side user.

FIG. 5 is a view showing one example of home appliance event information used in the information sharing system in Embodiment 1 of the present invention. As shown in FIG. 5, the home appliance event information includes respective pieces of information that are the event occurrence time of the home appliance event information, the appliance identification information (ID) for identifying a home appliance or sensor from which the home appliance event information has originated, the home appliance type representing the type of the home appliance or sensor, the housework type representing the type of housework associated with the home appliance or sensor, the detailed housework type with which the home appliance type is classified in further detail, the event representing the operation or the like of the home appliance or sensor, and the event value with which the operation of the home appliance or sensor is classified in further detail.

The housework type may be set from the housework type with a user setting or the like on the server 1010 side. The head speed of a vacuum cleaner can be acquired using an acceleration sensor, rotary encoder, or the like. This is not limited home appliances, and it is also possible to attach a sensor to a pot, drawer, or the like to acquire the state change of the pot, drawer, or the like as home appliance event information and cause the pot, drawer, or the like to behave like a home appliance.

Figure 6:
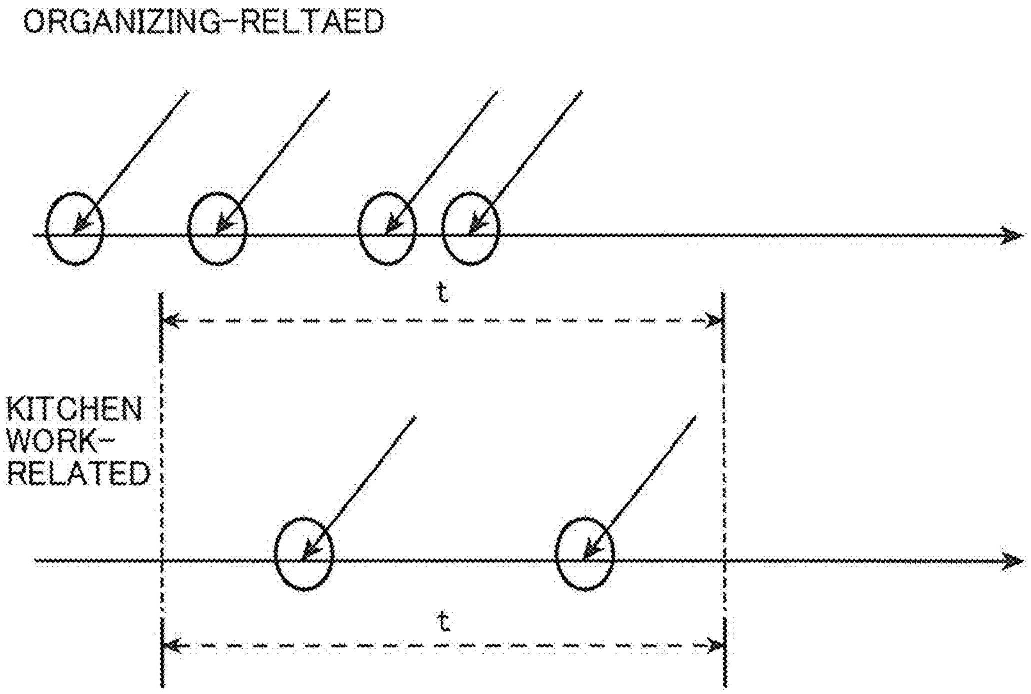
FIG. 6 is a schematic view for illustrating the occurrence frequency of a home appliance event used in the information sharing system in Embodiment 1 of the present invention.

FIG. 6 is a schematic view for illustrating the occurrence frequency of a home appliance event used in the information sharing system in Embodiment 1 of the present invention. When the housework type is classified as organizing-related, kitchen work-related, or the like, for example, as shown in FIG. 6, the occurrence frequency of home appliance event information (in circles shown with arrows in the drawing) can be acquired for each housework type.

The server 1010 calculates, as the occurrence frequency of home appliance event information for each housework type, the number of occurrences of home appliance event information (three times for organizing-related and two times for kitchen work-related in the example in FIG. 6) within a unit time t (e.g., three minutes) determined in advance. The server 1010 performs character setting that is a display effect of the priority of a house that should be displayed or a house itself to be displayed, depending on the occurrence frequency of the home appliance event information or the number of home appliances operating simultaneously.

FIG. 7 is a view showing one example of setting information on a transmission side user that is used in a character setting of a house used in the information sharing system in Embodiment 1 of the present invention. As shown in FIG. 7, setting information on a transmission side user used in a character setting of a house includes respective pieces of information that are the housework type, the number of SNSs in which a registrant (transmission side user) is participating, the housework type coefficient that is a weighting coefficient allocated for each housework type, and the SNS viewing time of the registrant (transmission side user) for each housework type.

Since an appliance within a home may be, depending on the housework type, an appliance that generates home appliance event information slowly over a long time or an appliance that causes too much home appliance event information instantly, the server 1010 multiplies, for each housework type, the occurrence frequency of home appliance event information by a housework type coefficient and determines the priority of a house (home) that should be displayed from the multiplied value. For example, 2 is set as the housework type coefficient with respect to a organizing-related housework type and 5 is set as the housework type coefficient with respect to a kitchen work-related housework type. In the case where the organizing-related occurrence frequency is three times and the kitchen work-related occurrence frequency is two times, the server 1010 calculates 6 (=3×2) as the occurrence frequency after correction with respect to organizing-related, calculates 10 (=2×5) as the occurrence frequency after correction with respect to kitchen work-related, and determines the priority of a house (home) that should be displayed from the occurrence frequencies after correction.

The server 1010 performs selection of the priority or display effect of a house (home) that should be displayed by using an SNS viewing time of a registrant for each housework type as other information or the like.

FIG. 8 is a view showing one example of setting information on a viewing side user that is used in a character setting of a house used in the information sharing system in Embodiment 1 of the present invention. As shown in FIG. 8, setting information on a viewing side user used in a character setting of a house includes respective pieces of information that are the housework type, the number of SNSs in which a viewer (viewing side user) is participating, the housework type coefficient that is a weighting coefficient assigned to each housework type, and the SNS viewing time of the viewer (viewing side user) for each housework type.

The server 1010 determines the interest of a viewer depending on the number of SNSs participated by the viewer described above, determines the housework type of preference depending on the SNS viewing time for each housework type, and performs selection of the priority or display effect of a house (home) that should be displayed based on these pieces of information.

Although the housework type coefficient that is the weighting coefficient is set with respect to the housework type in the description above, this example is not particularly limiting. It may be such that a home appliance type coefficient that is a weighting coefficient is set with respect to the home appliance type, and the occurrence frequency of home appliance event information is corrected using the home appliance type coefficient.

FIG. 9 is a view showing a presentation example of a character setting of a house used in the information sharing system in Embodiment 1 of the present invention. Using parameters of the respective pieces of information shown in FIG. 5, FIG. 7, and FIG. 8, the server 1010 can generate a graphical user interface image in which a character setting of a house is presented and displayed, as shown in FIG. 9.

For example, in the case where there are many pieces of organizing-related home appliance event information, the housework type of the house (home) is set to organizing-related, and the busyness is set to "intense," a home icon is displayed in green, and a flame effect is added. In the case where the housework type of the house is kitchen work-related and the busyness is "medium," the color of the home icon is in orange, without particular presentation. In the case where the busyness has become "intense" at this time, there may be a presentation of billowing smoke.

Figure 10:
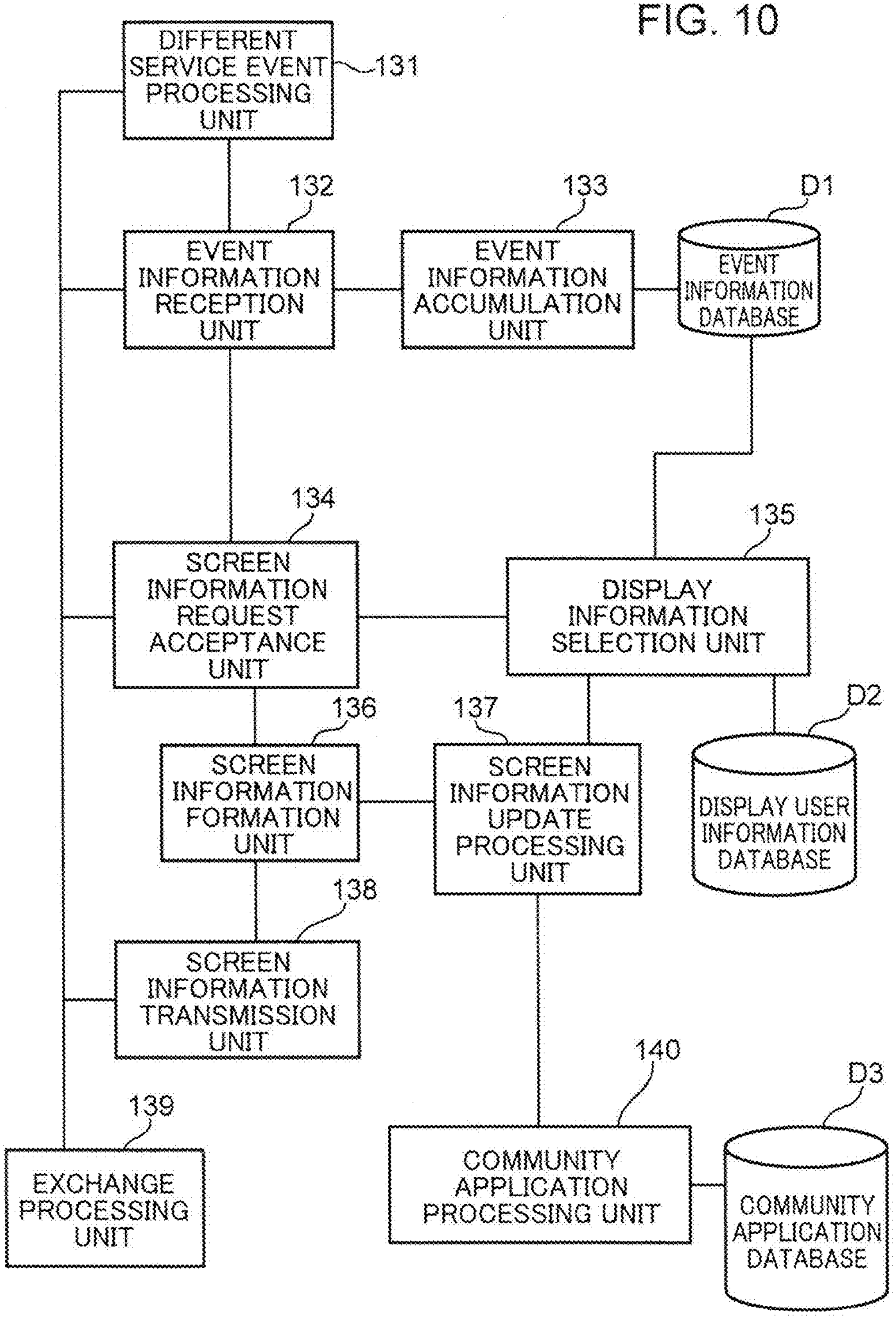
FIG. 10 is a view showing an example representing in detail the configuration of a server and a DB shown in FIG. 1.

FIG. 10 is a view showing an example representing in detail the configuration of the server 1010 and the DB 1011 shown in FIG. 1. As shown in FIG. 10, the server 1010 shown in FIG. 1 includes a different service event processing unit 131, an event information reception unit 132, an event information accumulation unit 133, a screen information request acceptance unit 134, a display information selection unit 135, a screen information formation unit 136, a screen information update processing unit 137, a screen information transmission unit 138, an exchange processing unit 139, and a community application processing unit 140. The DB 1011 shown in FIG. 1 includes an event information database D1, a display user information database D2, and a community application database D3.

The server 1010 has the event information reception unit 132 that receives home appliance event information, and the event information accumulation unit 133 accumulates home appliance event information in the event information database D1. In the event information database D1, not only home appliance event information but also setting information on a user is accumulated. As setting information on each user, information such as the user ID, the display housework type priority, the registered community, the community viewing time, and the message exchange frequency by house is accumulated, and these pieces of information can be used upon sorting of home appliance event information.

In the case where information is already displayed to a viewing side user, the event information reception unit 132 gives an update instruction with respect to the screen information request acceptance unit 134, depending on the type of home appliance event information. The screen information request acceptance unit 134 accepts a screen display request of a viewing side user. The display information selection unit 135 selects information that should be displayed, based on information such as the user ID, the display housework type priority, the registered community, the community viewing time, or the message exchange frequency by house accumulated in the display user information database D2 and the event information database D1.

The screen information update processing unit 137 performs screen information update using the information selected by the display information selection unit 135. The screen information formation unit 136 eventually forms a screen in accordance with the screen information update by the screen information update processing unit 137 and delivers screen information (graphical user interface image) to the display device 104 of a viewing side user via the screen information transmission unit 138.

In the community application database D3, various community applications are accumulated. The community application processing unit 140 processes a community application read from the community application database D3. Depending on the type of home appliance event information, the screen information update processing unit 137 executes an associated community application or the like using the community application processing unit 140.

The different service event processing unit 131 has an interface for a service such as a different SNS, accepts an event such as a message input, and causes coordination with a process of forming a screen information. By the different service event processing unit 131 notifying necessary home appliance event information to a different service, convenience can be provided to a user of the different service.

Figure 11:
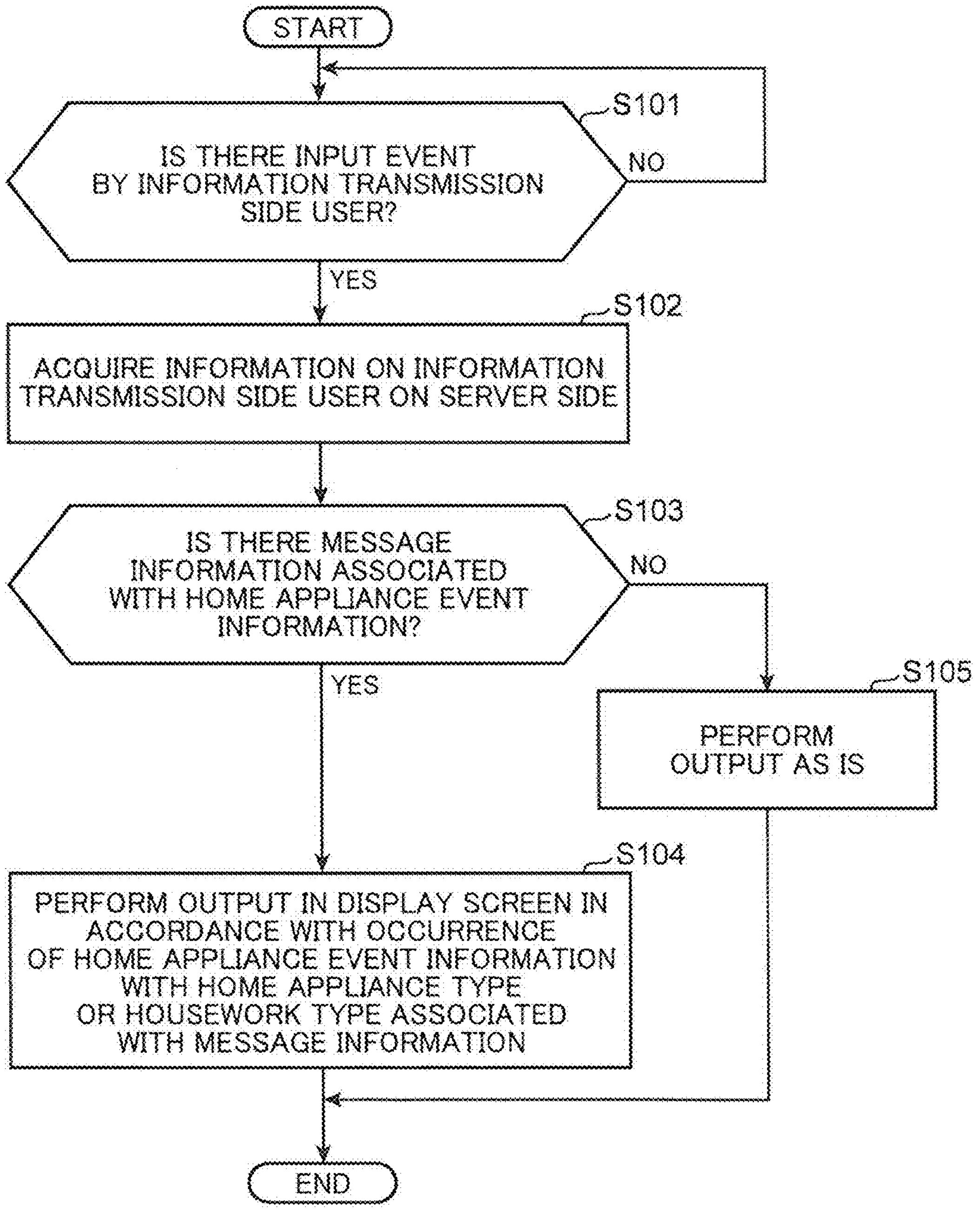
FIG. 11 is a flowchart showing one example of a message superimposition process of the information sharing system in Embodiment 1 of the present invention.

FIG. 11 is a flowchart showing one example of a message superimposition process of the information sharing system in Embodiment 1 of the present invention. As shown in FIG. 11, the server 1010 determines whether or not there is an input event by a transmission side user that releases information (step S101). In the case where an event such as a text or audio has been transmitted directly or through coordination with a different site from a transmission side user that releases information (YES in step S101), the server 1010 acquires information on the transmission side user that releases information (step S102).

Then, the server 1010 determines whether there is message information associated with home appliance event information (step S103). The message information includes request information requesting display in coordination with the type of appliance or type of housework selected by the user and a message input by the user. As a determination method, relevant event information or the like may be added to a message header. In this case, it may be such that there is a setting icon or the like at the time of input, and a graphical user interface (GUI) with which input is easy may be set. As category information, a specific keyword (text, audio, or the like) may be included.

In the case where there is message information associated with home appliance event information (YES in step S103), the server 1010 superimposes a message to form a screen in accordance with a timing when the home appliance event information associated with the type of appliance or type of housework specified by the request information on the message information has occurred (step S104). In the case where message information associated with home appliance event information is absent (NO in step S103), the server 1010 performs output as is (step S105).

FIG. 12 is a view showing one example of message information used in the message superimposition process of the information sharing system in Embodiment 1 of the present invention. For example, in the case where the message content is a message of user-input text and IH cooker is set as the message-associated home appliance type in request information as shown in FIG. 12, home appliance event information is transmitted when operation of the IH cooker is started, and the message is accordingly superimposed and displayed in a graphical user interface image.

For example, in the case where the home icon 1201 is displayed as shown in FIG. 4, the server 1010 receives message information including request information requesting display in coordination with a vacuum cleaner as the type of appliance selected by a user and a message "working hard cleaning the room," and then creates a graphical user interface image in which a message 1206 "working hard cleaning the room" is superimposed and displayed near the home icon 1201 when home appliance event information associated with a vacuum cleaner is received. The display device 104 superimposes and displays the message 1206 "working hard cleaning the room" near the home icon 1201.

In the case where an appliance icon 1207 representing an electric pot is displayed near the home icon 1202 as shown in FIG. 4, the server 1010 receives message information including request information requesting display in coordination with an electric pot as the type of appliance selected by a user and a message "let's boil water and have tea," and then creates a graphical user interface image in which the message 1203 "let's boil water and have tea" is superimposed and displayed near the appliance icon 1207 when home appliance event information associated with an electric pot is received. The display device 104 superimposes and displays the message 1203 "let's boil water and have tea" near the appliance icon 1207.

In the case where the message content is a message of a pre-set text, a text set in advance may be superimposed in accordance with the operation or the like of a fan. For example, tweet information may be output when the fan is shut off. It may be such that audio is recorded, and the audio is superimposed in the case where a movement of a pot (acquisition of information with an acceleration sensor or the like in this case) has been detected.

In this manner, in this embodiment, state change information on a home appliance within a home that occurs due to user operation or the like can be collected as home appliance event information to form an information display screen for sharing on a social network. As a result, in this embodiment, a more attractive graphical user interface image with enhanced reality or real time properties of information can be provided by sharing, between a plurality of users, home appliance event information as information on the state change of an appliance that has actually occurred.

(Embodiment 2)

Figure 13:
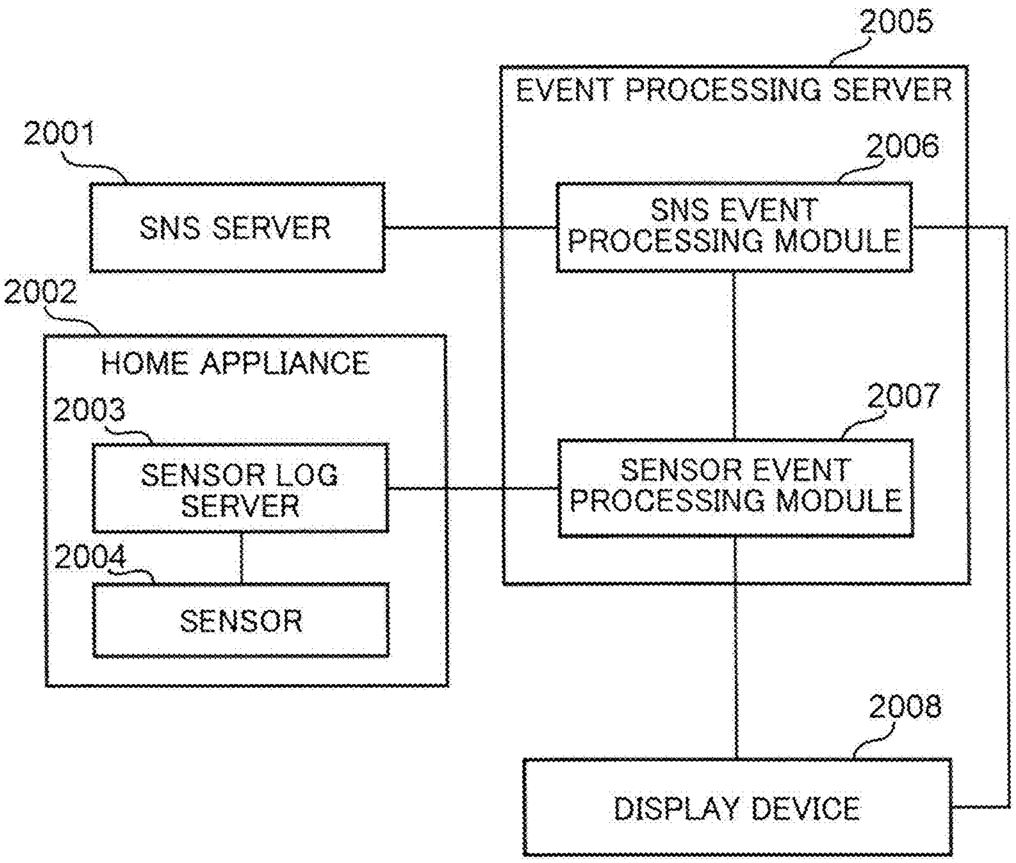
FIG. 13 is a view showing the configuration of an information sharing system in Embodiment 2 of the present invention.

FIG. 13 is a view showing the configuration of an information sharing system in Embodiment 2 of the present invention. In this embodiment as well, in a similar manner to Embodiment 1, it can be such that home appliance event information including the state of a home appliance is transmitted with respect to an event processing server 2005 shown in FIG. 13 from a home appliance 2002 or the like within each house registered in advance, information on each house is formed as screen information based on the type of the home appliance event information or the occurrence frequency of the home appliance event information, and the screen information is provided with respect to a request of a display device 2008. Regarding this point, description is omitted, and characteristic portions of this embodiment will be described below in detail.

The information sharing system shown in FIG. 13 includes an SNS server 2001, the home appliance 2002, the event processing server 2005, and the display device 2008. The event processing server 2005 includes an SNS event processing module 2006 and a sensor event processing module 2007. The home appliance 2002 includes a sensor log server 2003 and a sensor 2004.

The event processing server 2005, the display device 2008, and the home appliance 2002 are connected in a home LAN. The event processing server 2005 and the SNS server 2001 exist on a world wide web (WWW). The event processing server 2005 gathers, via the sensor event processing module 2007, sensing information (home appliance event information) of the home appliance 2002 connected to a network that occurs within each home. The home appliance event information is converted to information necessary for display of a graphical user interface (GUI) image of the display device 2008 and held. In the case where the sensor 2004 mounted to the home appliance 2002 is connected directly to a global network, sensing information may be gathered without involving the sensor event processing module 2007.

The sensor log server 2003 gathers and holds a sensor value (home appliance event information) detected by the sensor 2004 and performs transmission of the detected sensor value to the sensor event processing module 2007 and transmission of the held sensor value in accordance with a request from the sensor event processing module 2007. Regarding the sensor log server 2003, there are cases of being mounted to an appliance separate from the home appliance 2002, cases of existing as a single appliance, and cases of existing on the WWW.

The sensor 2004 is mounted to the home appliance 2002 to detect and notify, to the sensor log server 2003, the operation or state of the home appliance 2002. Regarding the sensor 2004, there are cases of being mounted to an appliance other than the home appliance 2002 and cases of being attached as the sensor 2004 alone to an object such as a household item.

The event processing server 2005 is configured of the SNS event processing module 2006 and the sensor event processing module 2007. Regarding the event processing server 2005, there are cases of being mounted to the display device 2008, cases of existing on the WWW, and cases of existing as a single appliance.

The SNS event processing module 2006 receives home appliance event information or the like transmitted from the SNS server 2001 and transmits home appliance event information or the like with respect to the display device 2008. The SNS event processing module 2006 requests necessary home appliance event information to the SNS server 2001, receives the home appliance event information, and then transmits the received home appliance event information to the display device 2008. The SNS event processing module 2006 transmits home appliance event information or the like to the SNS server 2001 based on the home appliance event information transmitted from the sensor event processing module 2007.

The sensor event processing module 2007 receives home appliance event information from the sensor log server 2003 and transmits home appliance event information according to necessity with respect to the display device 2008 and the SNS event processing module 2006.

The display device 2008 performs acquisition of a graphical user interface (GUI) image and update of the display content in accordance with home appliance event information transmitted from the SNS event processing module 2006 and the sensor event processing module 2007. The display device 2008 may hold in advance a GUI to be displayed.

Figure 14:
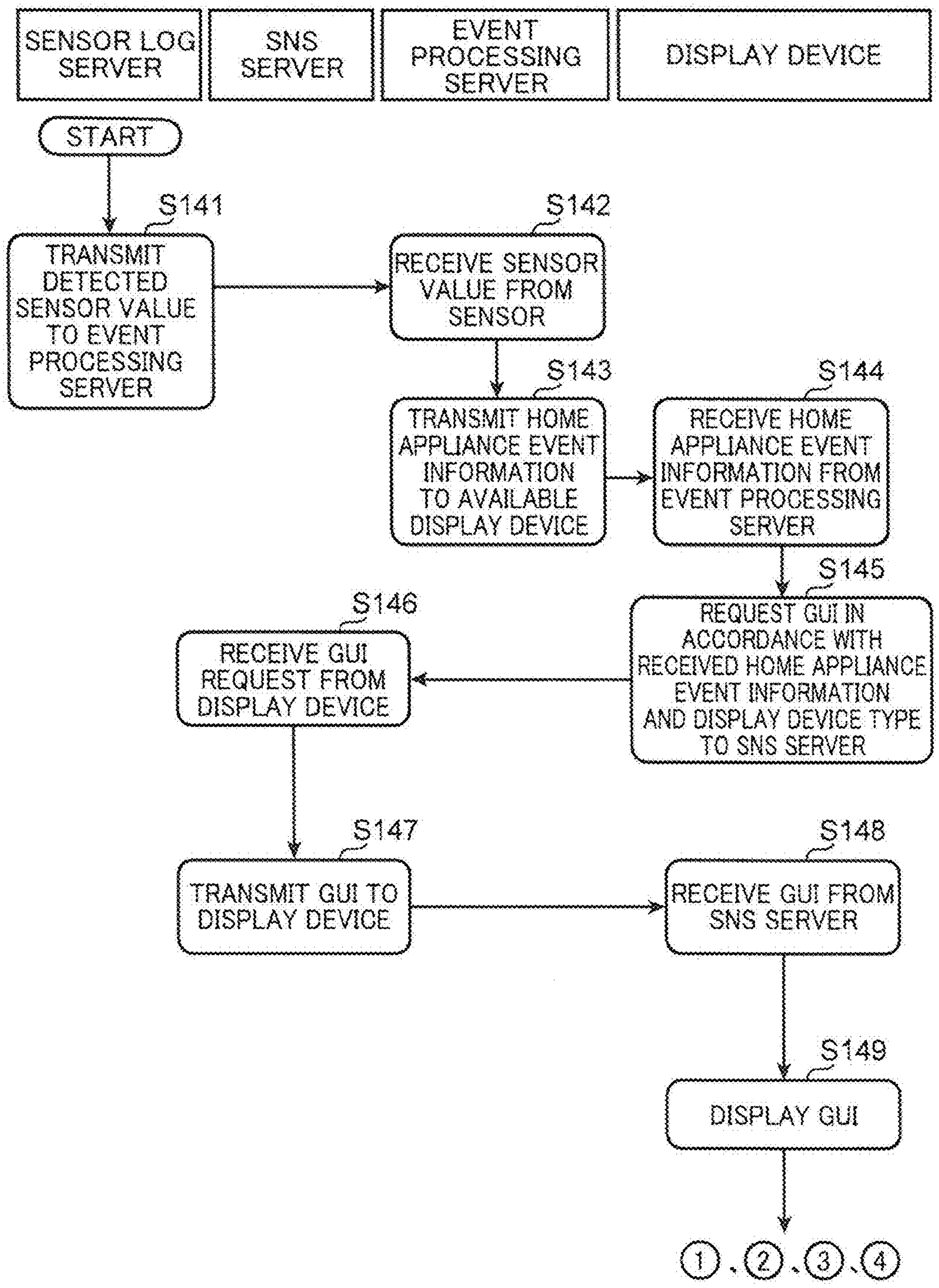
FIG. 14 is a flowchart showing one example of a process in the case of performing display of a GUI with a display device shown in FIG. 13.
Figure 23:
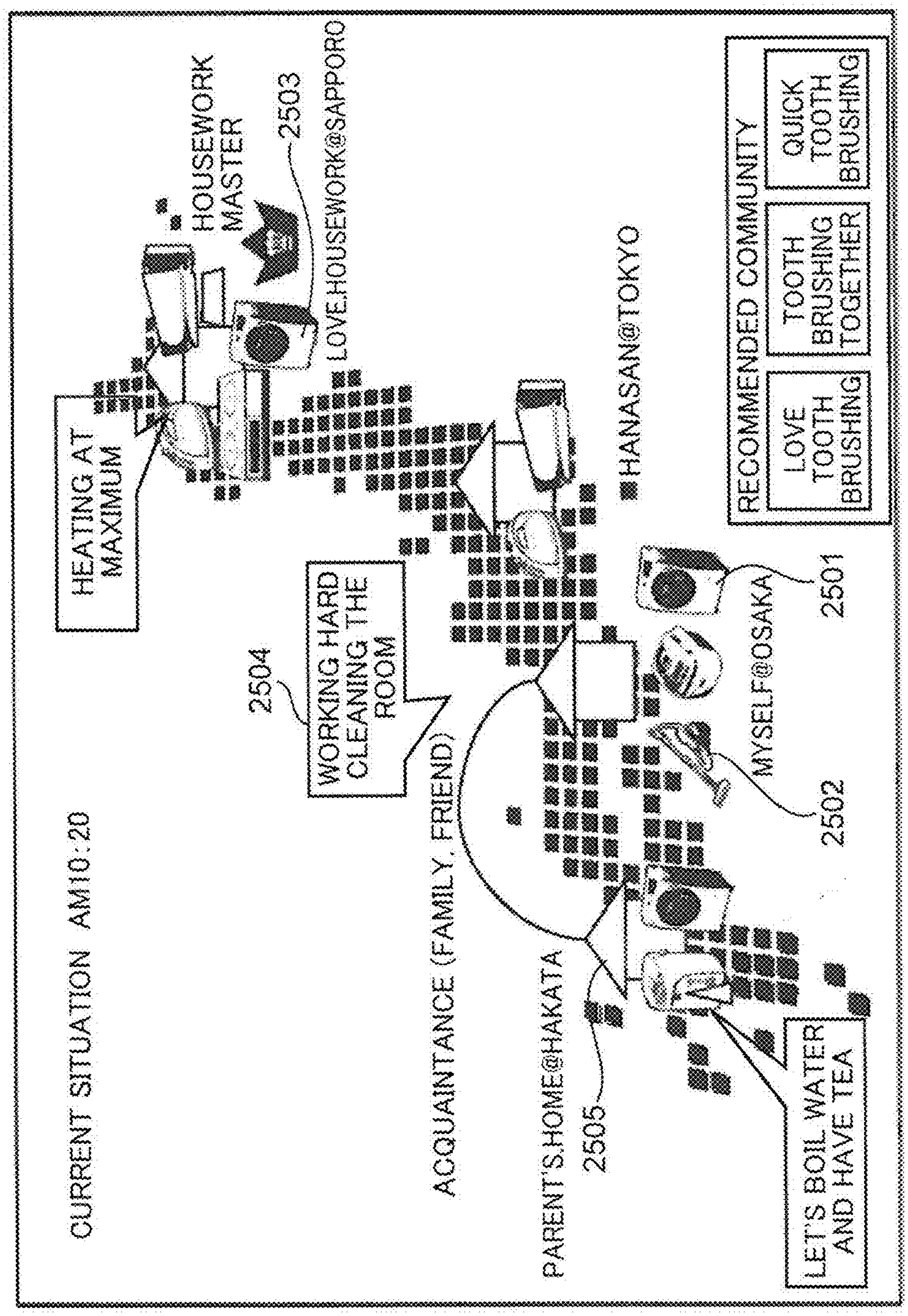
FIG. 23 is a view showing one example of a GUI displayed in the display device shown in FIG. 13.

FIG. 14 is a flowchart showing one example of a process in the case of performing display of a GUI with the display device 2008 shown in FIG. 13. One example of the graphical user interface (GUI) image displayed in the display device 2008 shown in FIG. 13 is shown in FIG. 23.

First, in the case where the start of operation of the home appliance 2002 has been detected, the sensor 2004 transmits that operation has started (a sensor value) to the sensor log server 2003 as home appliance event information. The sensor log server 2003 transmits the received home appliance event information (sensor value) to the sensor event processing module 2007 of the event processing server 2005 (step S141). The sensor event processing module 2007 receives the home appliance event information (sensor value) from the sensor 2004 (step S142) and transmits the received home appliance event information to the display device 2008 available to a user (step S143).

The display device 2008 receives the home appliance event information from the sensor event processing module 2007 of the event processing server 2005 (step S144) and requests a GUI in accordance with the received home appliance event information and the type (e.g., screen size and screen resolution) of the display device 2008 to the SNS server 2001 (step S145).

The SNS server 2001 receives a GUI request from the display device 2008 (step S146) and transmits the requested GUI to the display device 2008 (step S147). The display device 2008 receives a file in hypertext markup language (HTML) or the like for displaying the GUI from the SNS server 2001 (step S148) and displays the GUI in a screen (step S149).

In the case where the display content of the GUI is determined based on information in the sensor log server 2003 or the SNS server 2001 when the display device 2008 displays the GUI, processes of step S151 and thereafter in FIG. 15 or processes of step S161 and thereafter in FIG. 16 described below are carried out. In the case where the display content of the GUI is changed by the behavior of the sensor 2004 or the SNS server 2001, processes of step S171 and thereafter in FIG. 17 or processes of step S181 and thereafter in FIG. 18 described below are carried out.

Figure 15:
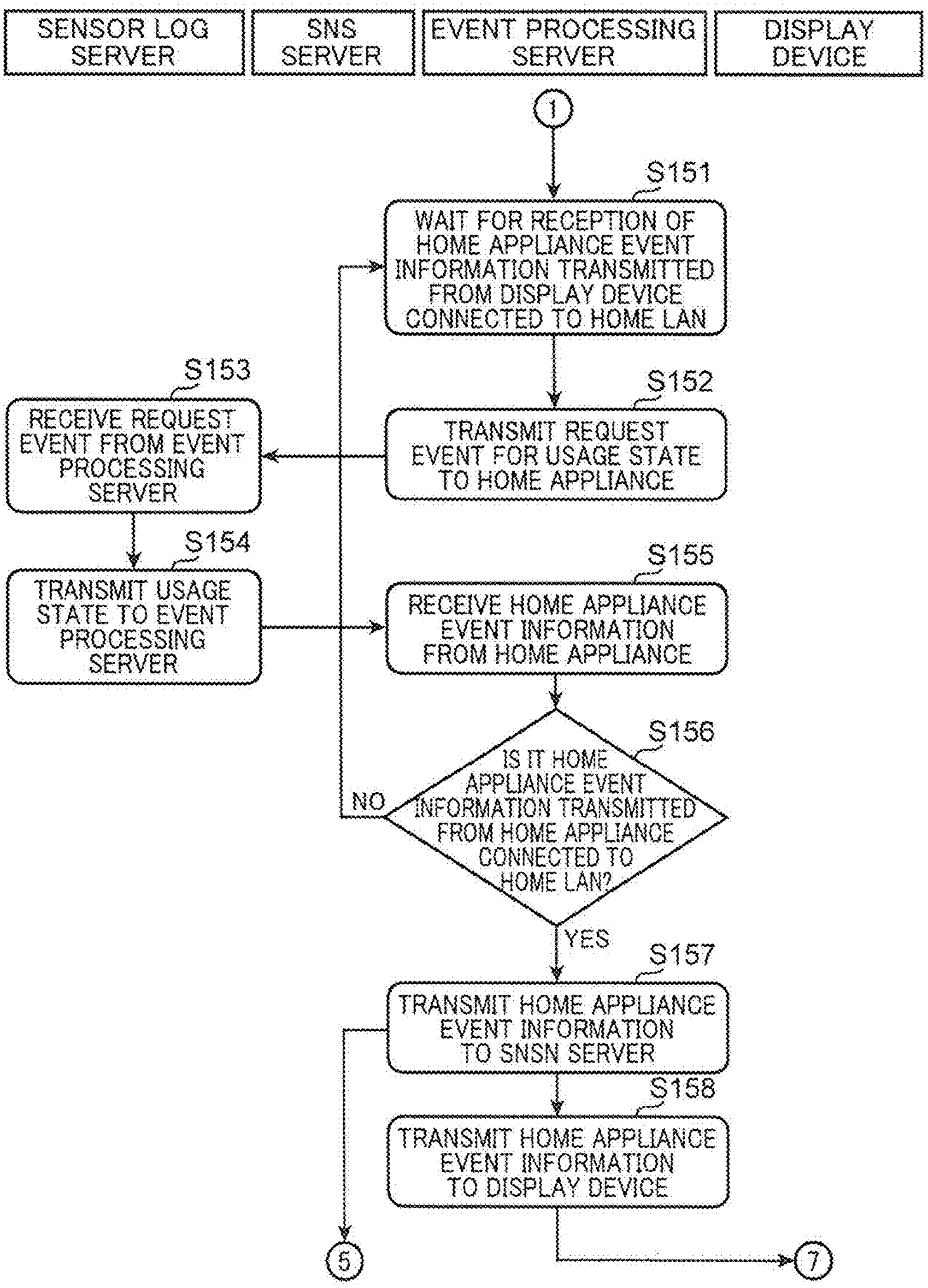
FIG. 15 is a flowchart showing one example of a process in the case where the display content of a GUI is determined based on information on a sensor log server shown in FIG. 13.

FIG. 15 is a flowchart showing one example of a process in the case where the display content of the GUI is determined based on information on the sensor log server 2003 shown in FIG. 13.

At first, the sensor event processing module 2007 of the event processing server 2005 is in a state of waiting to receive home appliance event information transmitted from the display device 2008 connected to the home LAN (step S151). In the case where home appliance event information has been received, the sensor event processing module 2007 transmits a request event for a usage state to the sensor log server 2003 of the home appliance 2002 (step S152).

The sensor log server 2003 receives the request event from the sensor event processing module 2007 of the event processing server 2005 (step S153) and transmits information (usage state) in accordance with the event content to the sensor event processing module 2007 of the event processing server 2005 (step S154).

The sensor event processing module 2007 of the event processing server 2005 receives home appliance event information from the sensor log server 2003 of the home appliance 2002 (step S155) and determines whether or not the received home appliance event information is home appliance event information transmitted from the home appliance 2002 connected to the home LAN (step S156). If it is the home appliance event information on the home appliance 2002 connected to the home LAN (YES in step S156), the sensor event processing module 2007 notifies the home appliance event information to the SNS event processing module 2006, transmits sensor information (home appliance event information) to the SNS server 2001 via the SNS event processing module 2006 (step S157), and transmits the acquired information (home appliance event information) to the display device 2008 (step S158).

The behavior in the case where the SNS server 2001 has received the sensor information (home appliance event information) will be described later using FIG. 19. The behavior in the case where the display device 2008 has received the sensor information (home appliance event information) will be described later using FIG. 20.

Figure 16:
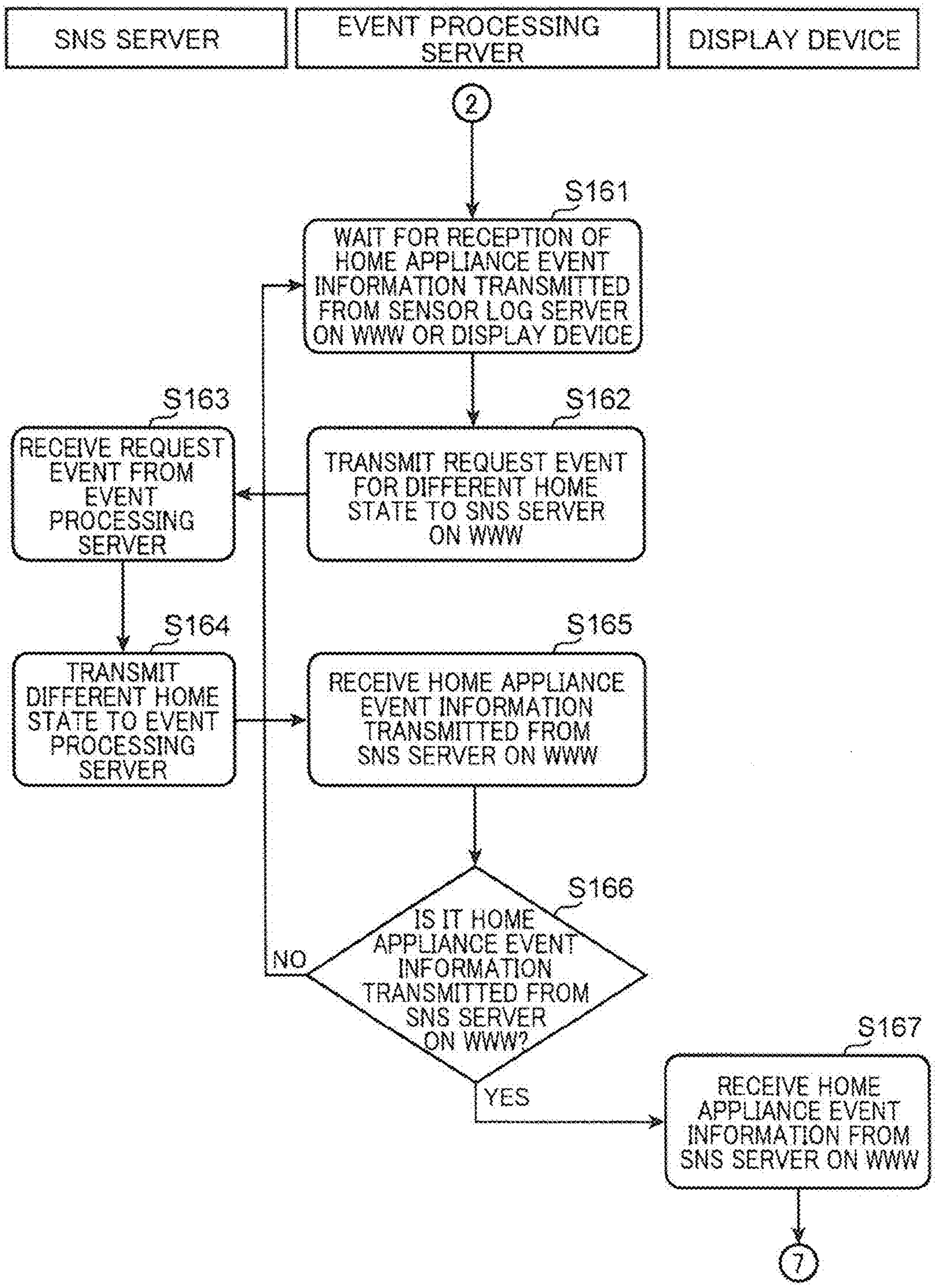
FIG. 16 is a flowchart showing one example of a process in the case where the display content of a GUI is determined based on information on an SNS server shown in FIG. 13.

FIG. 16 is a flowchart showing one example of a process in the case where the display content of the GUI is determined based on information on the SNS server 2001 shown in FIG. 13.

At first, the SNS event processing module 2006 of the event processing server 2005 is in a state of waiting to receive home appliance event information transmitted from the sensor log server 2003 on the WWW and the display device 2008 (step S161). In the case where home appliance event information has been received, the SNS event processing module 2006 transmits a request event for a different home state to the SNS server 2001 on the WWW (step S162).

The SNS server 2001 receives the request event from the SNS event processing module 2006 of the event processing server 2005 (step S163) and transmits home appliance event information (different home state) in accordance with the event content to the SNS event processing module 2006 of the event processing server 2005 (step S164).

The SNS event processing module 2006 of the event processing server 2005 receives the home appliance event information from the SNS server 2001 on the WWW (step S165) and determines whether or not the received home appliance event information is home appliance event information transmitted from the SNS server 2001 on the WWW (step S166). If it is the home appliance event information transmitted from the SNS server 2001 on the WWW (YES in step S166), the SNS event processing module 2006 transmits the acquired information (home appliance event information transmitted from the SNS server 2001 on the WWW) to the display device 2008, and the display device 2008 receives the home appliance event information that is from the SNS server 2001 on the WWW (step S167).

The behavior in the case where the display device 2008 has received the sensor information (home appliance event information) will be described later using FIG. 20.

Figure 17:
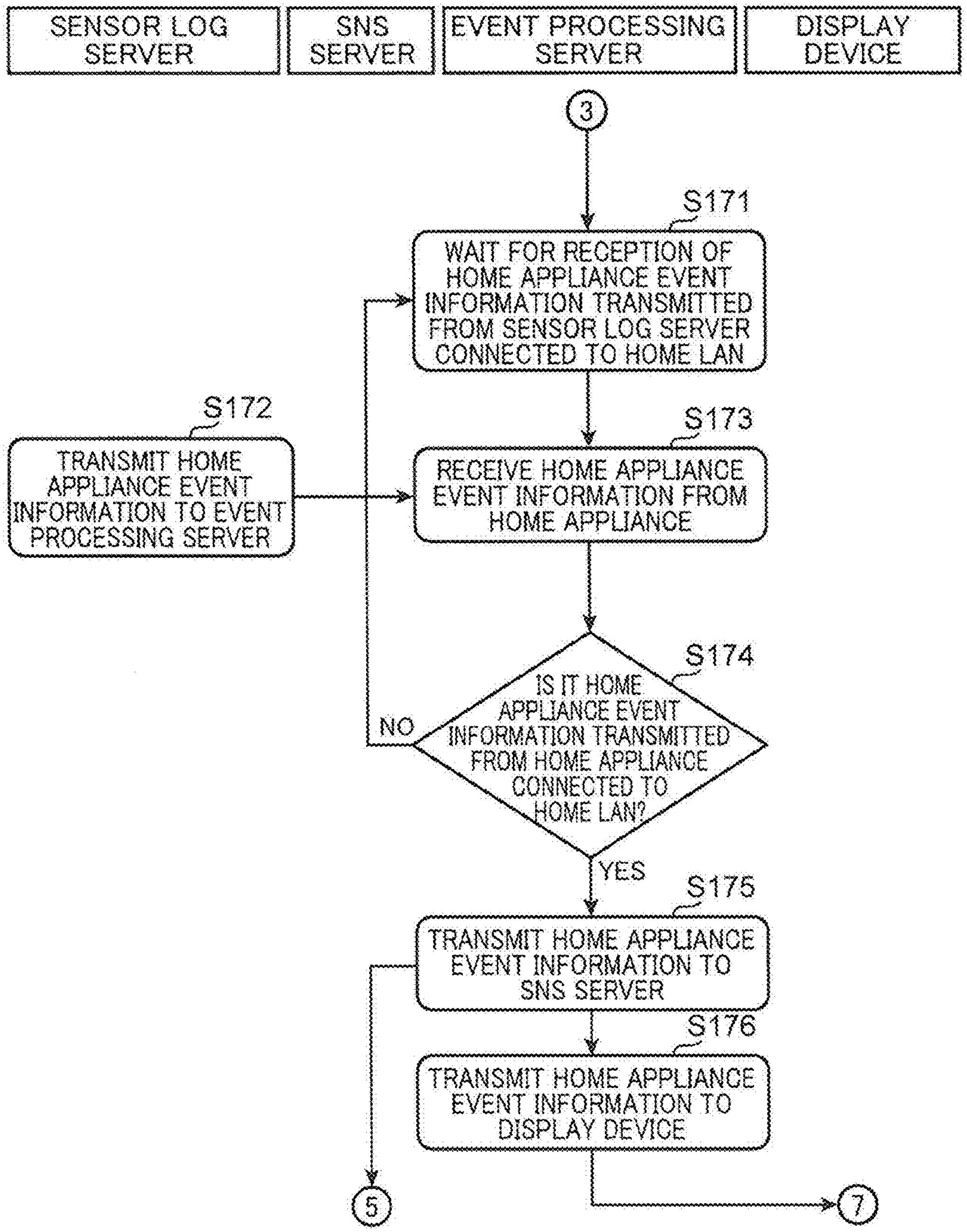
FIG. 17 is a flowchart showing one example of a process in the case where the display content of a GUI is changed based on information on a sensor shown in FIG. 13.

FIG. 17 is a flowchart showing one example of a process in the case where the display content of the GUI is determined based on information on the sensor 2004 shown in FIG. 13.

At first, the sensor event processing module 2007 of the event processing server 2005 is in a state of waiting to receive home appliance event information transmitted from the sensor log server 2003 connected to the home LAN (step S171).

When the sensor log server 2003 of the home appliance 2002 transmits home appliance event information to the sensor event processing module 2007 of the event processing server 2005 (step S172), the sensor event processing module 2007 receives the home appliance event information from the sensor log server 2003 of the home appliance 2002 (step S173) and determines whether or not it is home appliance event information transmitted from the home appliance 2002 connected to the home LAN (step S174).

If it is the home appliance event information on the home appliance 2002 connected to the home LAN (YES in step S174), the sensor event processing module 2007 notifies the information to the SNS event processing module 2006, transmits sensor information (home appliance event information) to the SNS server 2001 via the SNS event processing module 2006 (step S175), and transmits the acquired information (home appliance event information) to the display device 2008 (step S176).

The behavior in the case where the SNS server 2001 has received the sensor information (home appliance event information) will be described later using FIG. 19. The behavior in the case where the display device 2008 has received the sensor information (home appliance event information) will be described later using FIG. 20.

Figure 18:
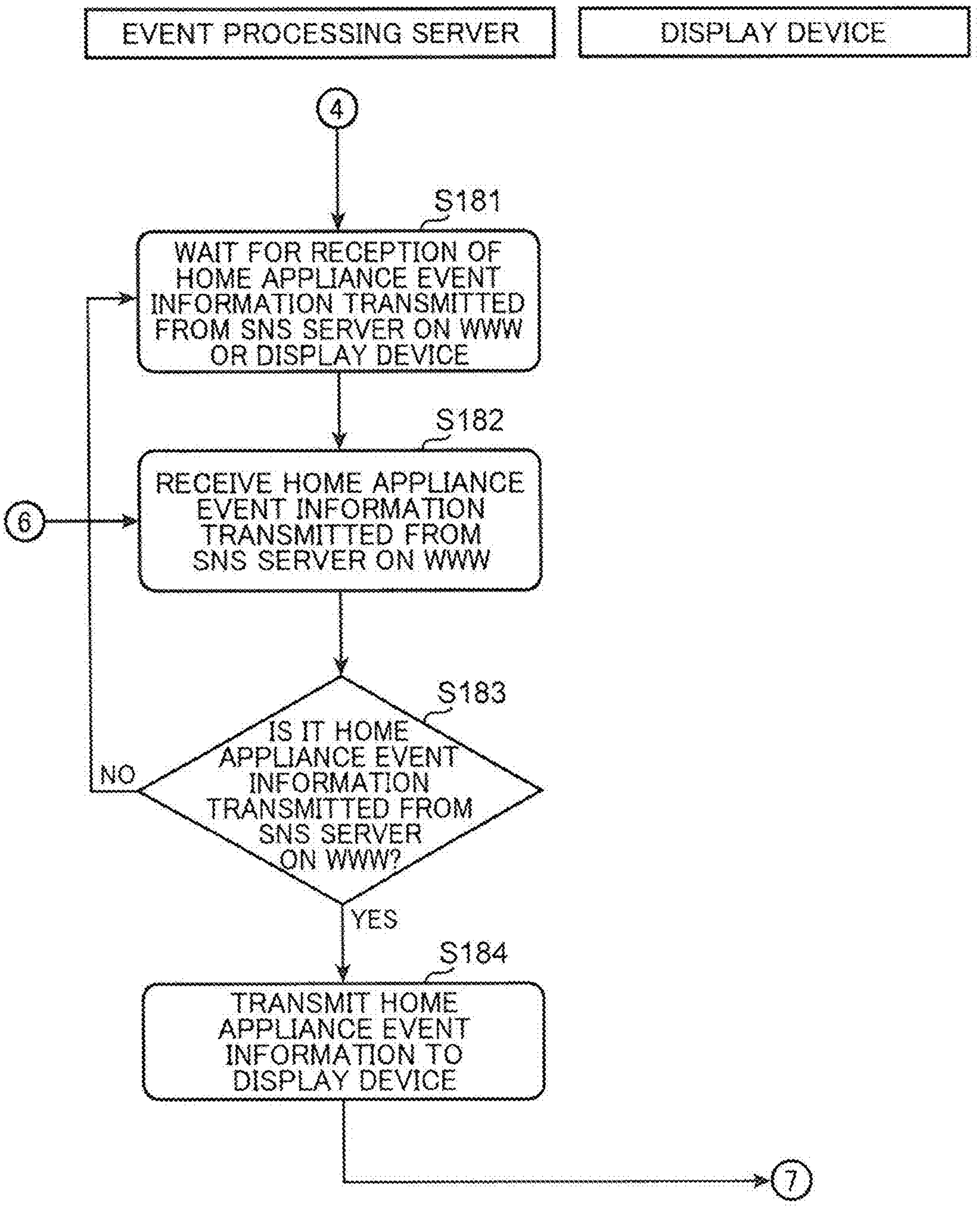
FIG. 18 is a flowchart showing one example of a process in the case where the display content of a GUI is changed based on information on the SNS sensor shown in FIG. 13.

FIG. 18 is a flowchart showing one example of a process in the case where the display content of the GUI is changed based on information on the SNS server 2001 shown in FIG. 13.

At first, the SNS event processing module 2006 of the event processing server 2005 is in a state of waiting to receive home appliance event information transmitted from the SNS server 2001 on the WWW and the display device 2008 (step S181).

When the SNS server 2001 transmits home appliance event information to the SNS event processing module 2006 of the event processing server 2005, the SNS event processing module 2006 receives the home appliance event information from the SNS server 2001 on the WWW (step S182) and determines whether or not it is home appliance event information transmitted from the SNS server 2001 on the WWW (step S183).

If it is the home appliance event information transmitted from the SNS server 2001 on the WWW (YES in step S183), the SNS event processing module 2006 transmits the acquired information (home appliance event information transmitted from the SNS server 2001 on the WWW) to the display device 2008 (step S184).

The behavior in the case where the display device 2008 has the received information (home appliance event information) of the SNS server 2001 will be described later using FIG. 20.

Figure 19:
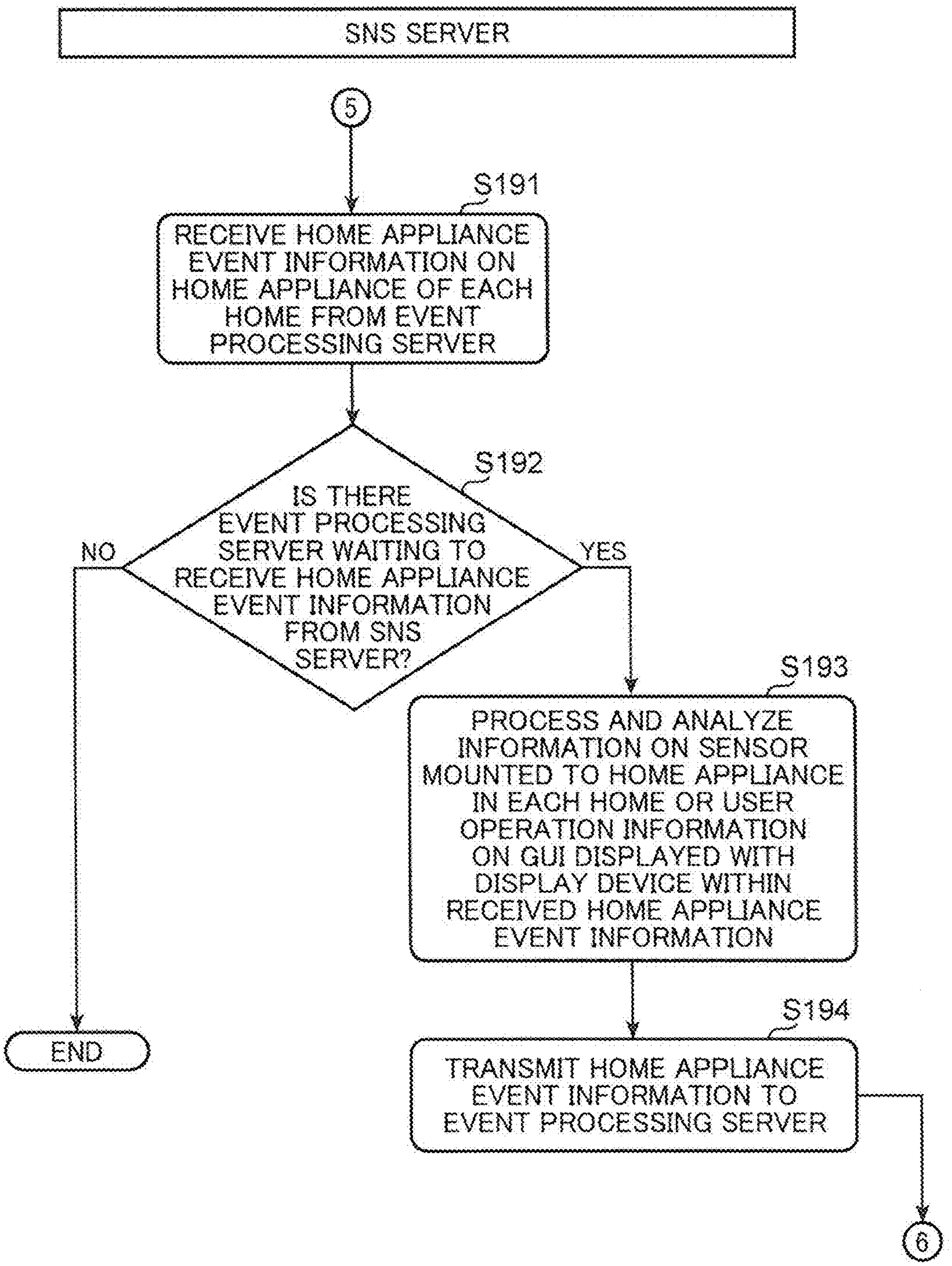
FIG. 19 is a flowchart showing one example of a process in the case where the SNS server shown in FIG. 13 has received information from an SNS event processing module.

FIG. 19 is a flowchart showing one example of a process in the case where the SNS server 2001 shown in FIG. 13 has received information from the SNS event processing module 2006.

First, the SNS server 2001 receives home appliance event information on the home appliance 2002 of each home from the SNS event processing module 2006 of the event processing server 2005 (step S191). Next, the SNS server 2001 determines whether or not there is the event processing server 2005 waiting for home appliance event information from the SNS server 2001 (step S192).

In the case where there is the event processing server 2005 waiting for home appliance event information from the SNS server 2001 (YES in step S192), the SNS server 2001 analyzes the received home appliance event information and carries out a processing process by processing and analyzing information on the sensor 2004 mounted to the home appliance 2002 in each home or information on user operation on a GUI displayed in the display device 2008 that is within the received home appliance event information (step S193), and transmits home appliance event information to the event processing server 2005 (step S194).

The home appliance event information received from the SNS event processing module 2006 includes the information on the sensor 2004 mounted to the home appliance 2002 in each home or the information on user operation on a GUI displayed in the display device 2008. These pieces of information are accumulated in the SNS server 2001 to be analyzed as information collected from a plurality of homes or used in changing the display content of a GUI displayed in the display device 2008 of each home.

Figure 20:
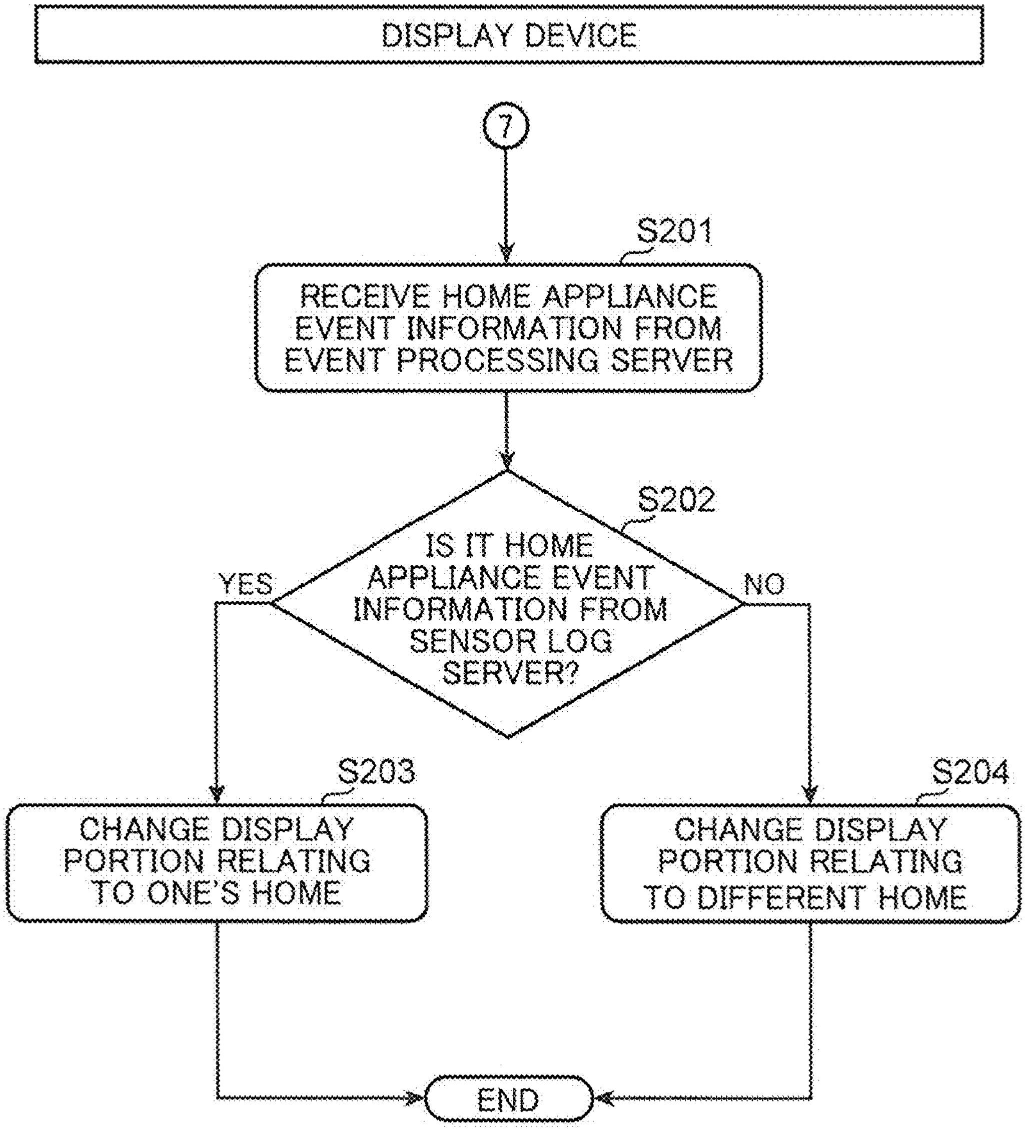
FIG. 20 is a flowchart showing one example of a process in the case where the display device shown in FIG. 13 updates the display content of a GUI.

FIG. 20 is a flowchart showing one example of a process in the case where the display device 2008 shown in FIG. 13 has received home appliance event information relating to a change in display content of a GUI from the SNS event processing module 2006 or the sensor event processing module 2007.

First, the display device 2008 receives home appliance event information from the SNS event processing module 2006 or the sensor event processing module 2007 of the event processing server 2005 (step S201) and determines whether the received home appliance event information is home appliance event information from the sensor log server 2003 (YES in step S202) or home appliance event information from the SNS server 2001 (NO in step S202).

The display device 2008 changes a display portion relating to one's home if it is home appliance event information from the sensor log server 2003 (step S203), and changes a display portion relating to a different home if it is home appliance event information from the SNS server 2001 (step S204).

Next, an example of a display portion relating to one's home in the case where the display portion relating to one's home is changed by the process in step S203 described above will be described below in detail. FIG. 21 is a view showing one example of home appliance event information transmitted by the home appliance 2002.

Figure 25A:
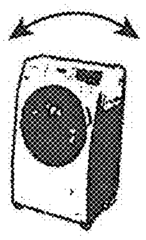
FIG. 25 is a second view showing a modified example of a GUI at the time of receiving home appliance event information.

In the case where home appliance event information that the power of a laundry machine in the row shown as 2211 in FIG. 21 has been turned ON has been received when a graphical user interface (GUI) image shown in FIG. 23 is displayed in the display device 2008, the laundry machine is shown as currently in use by using an animation effect of the laundry machine shaking to the left and right as shown in FIG. 25A to display an appliance icon 2501 representing the laundry machine of one's home in FIG. 23.

Figure 25B:
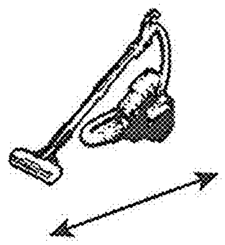
Figure 25C:

In the case where home appliance event information that the power of a vacuum cleaner in the row shown as 2212 in FIG. 21 has been turned ON has been received when a GUI in FIG. 23 is displayed in the display device 2008, the vacuum cleaner is shown as currently in use by using an animation effect of the vacuum cleaner moving to the left and right as shown in FIG. 25B to display an appliance icon 2502 representing the vacuum cleaner of one's home in FIG. 23. In a similar manner, in the case where home appliance event information that the power of a rice cooker has been turned ON has been received, the rice cooker is shown as currently in use by using an animation effect of steam coming out of the rice cooker as shown in FIG. 25C to display an appliance icon representing the rice cooker of one's home.

Figure 27:
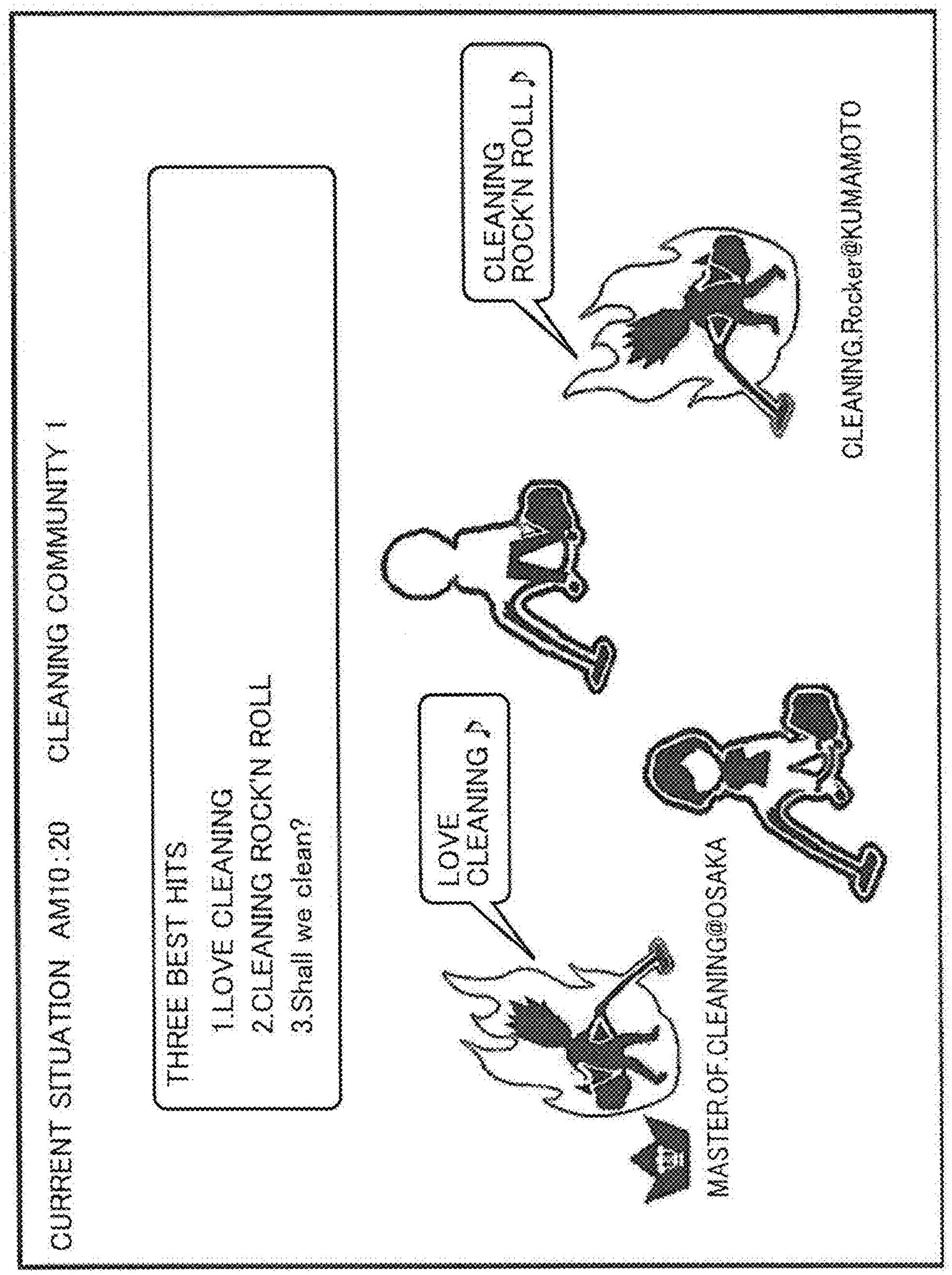
FIG. 27 is a view showing one example of another GUI displayed in the display device shown in FIG. 13.
Figure 28A:
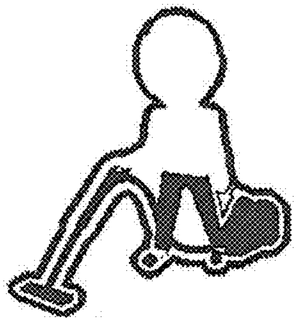
FIG. 28 is a fourth view showing a modified example of a GUI at the time of receiving home appliance event information.
Figure 28B:

In the case where home appliance event information that the head speed of a vacuum cleaner in the row shown as 2213 in FIG. 21 is "fast" (quick) has been received when a vacuum cleaner dedicated GUI shown in FIG. 27 is displayed in the display device 2008, the vacuum cleaner is shown as currently in use by changing an appliance icon of a person cleaning shown in FIG. 28A to an appliance icon shown in FIG. 28B and using an animation effect of a person in a flame to display the appliance icon.

Figure 29:
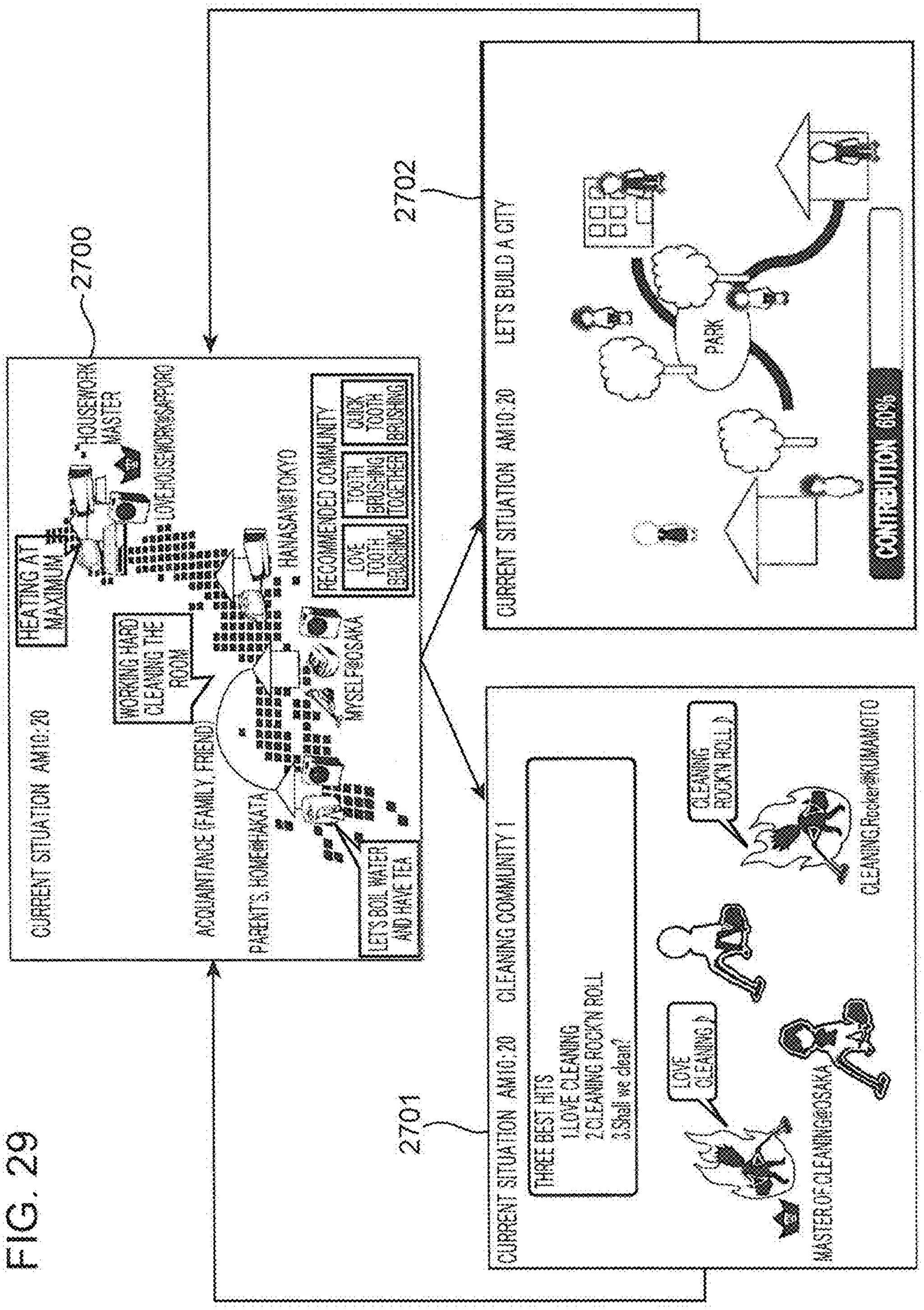
FIG. 29 is a view showing one example of the screen transition of a GUI displayed in the display device shown in FIG. 13.

In the case where the power of a vacuum cleaner dedicated GUI 2701 exists as shown in FIG. 29 when home appliance event information that the vacuum cleaner in the row shown as 2212 in FIG. 21 has been turned ON has been received, a screen transmission may be carried out such that a display image of the display device 2008 transitions from a basic GUI 2700 (graphical user interface image) to a vacuum cleaner dedicated GUI 2701 (community image). In the case where home appliance event information that the power of the vacuum cleaner has been turned OFF after the screen transition has been received in this case, transition is made again to the original screen (basic GUI 2700).

For example, as a picture of a community in the lower left in FIG. 29, situations of cleaning of respective houses are synthesized on the vacuum cleaner dedicated GUI 2701 for a cleaning community. At this time, the frequency of movement of a vacuum cleaner can be captured to change the display effect of a character on a screen as an indication of whether one is working hard, based on information obtained from an acceleration sensor, dust sensor, or the like simultaneously. Music or the like can be shared to share another person's music for cleaning.

It may be such that only a different home in which a vacuum cleaner is currently used is sorted and displayed on a map shown in FIG. 23 at the time of reception of home appliance event information that the power of a vacuum cleaner has been turned ON.

As shown in the lower right in FIG. 29, a GUI 2702 sharing a screen (community image) in which each person builds a house is provided as a housework community image for iron. At this time, a person working hard builds a house more quickly, and a large house can be built if a large goal is set in advance. Whether one is working hard and the magnitude of a goal are determined through the number of waves or moving distance in an acceleration sensor mounted to an iron or the used frequency of the iron itself. The progress of a user may be displayed in a lower portion of the screen.

In the case where home appliance event information includes home appliance type information representing the type of appliance as described above and the event processing server 2005 has received the home appliance event information when the display device 2008 is displaying a graphical user interface image, a display screen is caused to transition from the graphical user interface image to a community image relating to the type of appliance specified by the home appliance type information included in the home appliance event information. In this manner, in this embodiment, a GUI displayed in the display device 2008 is changed in accordance with the home appliance 2002 in use, and a GUI displayed in the display device 2008 is changed in accordance with the termination of use of the home appliance 2002.

Next, an example of a display portion relating to a different home in the case where the display portion relating to the different home is changed by the process in step S204 described above will be described below in detail. FIG. 22 is a view showing one example of home appliance event information transmitted by the SNS server 2001. The event type shown in FIG. 22 includes information on the home appliance type according to necessity. The house ID is identification information for identifying each home and may include the appliance ID according to necessity.

In the case where home appliance event information that the power of a laundry machine in the row shown as 2221 in FIG. 22 has been turned ON has been received when the graphical user interface (GUI) image shown in FIG. 23 is displayed in the display device 2008, the laundry machine is shown as currently in use by using an animation effect of the laundry machine shaking to the left and right as shown in FIG. 25A to display an appliance icon 2503 representing the laundry machine of a different home in FIG. 23.

In the case where home appliance event information on a tweet in the row shown as 2223 in FIG. 22 has been received when the GUI in FIG. 23 is displayed in the display device 2008, the tweet content is displayed in a dialogue balloon 2504 from a different home in FIG. 23.

Figure 26A:
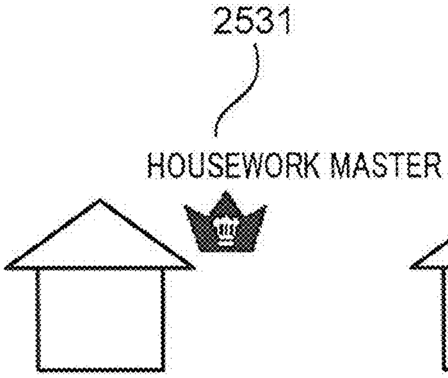
FIG. 26 is a third view showing a modified example of a GUI at the time of receiving home appliance event information.
Figure 26B:
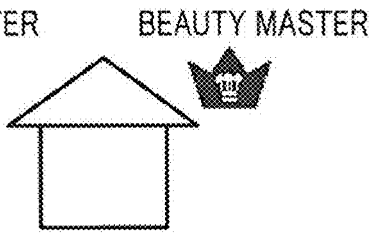

In the case where home appliance event information on the title of a house in the row shown as 2224 in FIG. 22 has been received when the GUI in FIG. 23 is displayed in the display device 2008, a home icon 2505 representing a different home in FIG. 23 can be displayed using display such as a crown 2531 (title icon for a housework master) as shown in FIG. 26A. The title of a house is determined through performing analysis of an operational situation or the like of the home appliance 2002, using sensing information (home appliance event information) that the SNS server 2001 has received from the same home. The title icon of a house is not particularly limited to the example described above, and various changes are possible. For example, an icon shown in FIG. 26B may be used as the title icon for a beauty master.

Figure 24A:
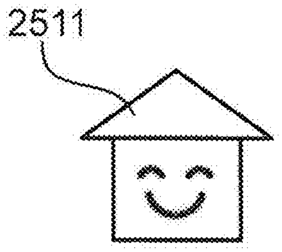
FIG. 24 is a first view showing a modified example of a GUI at the time of receiving home appliance event information.
Figure 24B:
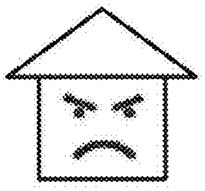
Figure 24C:
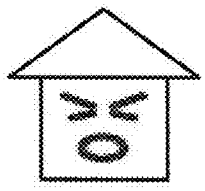

In the case where home appliance event information on the state of the house in the row shown as 2225 in FIG. 22 has been received when the GUI in FIG. 23 is displayed in the display device 2008, the home icon 2505 representing the different home in FIG. 23 can be displayed using a display effect such as a home icon 2511 representing a state with a smile as shown in FIG. 24A. The state of a house is determined through performing analysis of an operational situation or the like of the home appliance 2002, using sensing information (home appliance event information) that the SNS server 2001 has received from the same home. A home icon representing the state of the house is not particularly limited to the example described above, and various changes are possible. For example, a home icon representing a state with an angry face shown in FIG. 24B or a home icon representing a state with a troubled face shown in FIG. 24C may be used.

(Embodiment 3)

Figure 30:
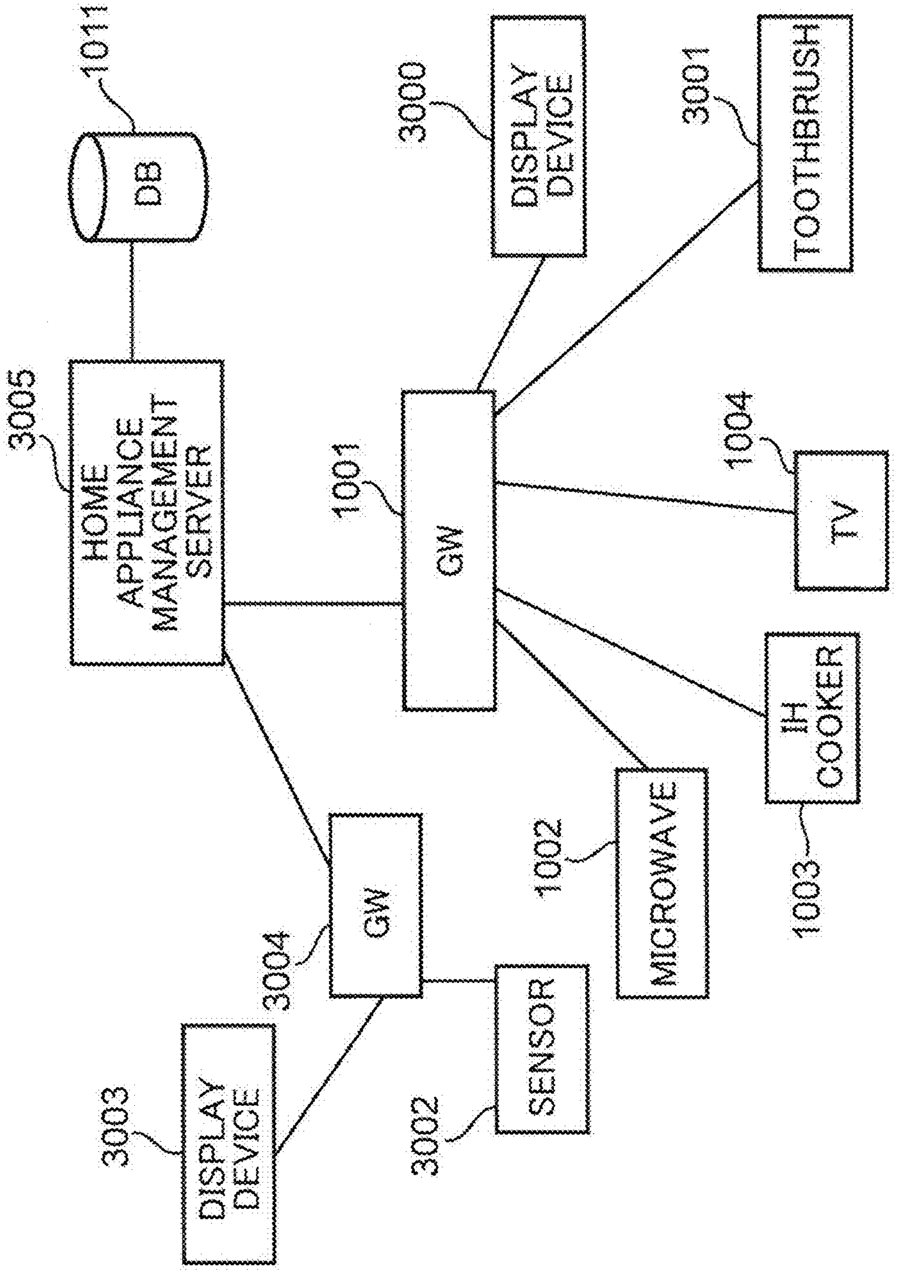
FIG. 30 is a view showing the configuration of an information sharing system in Embodiment 3 of the present invention.

FIG. 30 is a view showing the configuration of an information sharing system in Embodiment 3 of the present invention. In this embodiment as well, in a similar manner to Embodiment 1, it can be such that home appliance event information including the state of a home appliance is transmitted with respect to a home appliance management server 3005 shown in FIG. 30 from the microwave 1002 or the like within each house registered in advance, information on each house is formed as screen information based on the type of the home appliance event information or the occurrence frequency of the home appliance event information, and the screen information is provided with respect to a request of a display device 3000 or the like. Regarding this point, description is omitted, and characteristic portions of this embodiment will be described below in detail.

The information sharing system shown in FIG. 30 includes the GW 1001, the microwave 1002, the IH cooker 1003, the TV 1004, the DB 1011, the display device 3000, a toothbrush 3001, a sensor 3002, a display device 3003, a GW 3004, and the home appliance management server 3005.

In this embodiment, a home appliance such as the microwave 1002, the IH cooker 1003, the TV 1004, the toothbrush 3001, or the display device 3000 that displays a graphical user interface (GUI) image is connected to the home appliance management server 3005 via the GW 1001, and the sensor 3002 and the display device 3003 that displays a GUI are connected to the home appliance management server 3005 via the GW 3004 to form a network.

In FIG. 30, the home appliance management server 3005 that is newly defined manages the home appliance or sensor connected to the network and holds, in the DB 1011, appliance information (home appliance event information) in accordance with the type of home appliance or sensor.

FIG. 35 is a view showing one example of home appliance event information. The home appliance event information shown in FIG. 35 is one example of home appliance event information acquired from the home appliance management server 3005 and describes the type (mounted sensor type) of a sensor mounted to an appliance and a specific event process for each sensor value with respect to the home appliance type. The event process may be described with an executable program, may be a setting file for executing a program, or may be link information (uniform resource locator (URL) or pointer) for a program or setting file.

Next, a characteristic process in the GW 3004 or GW 1001 upon a new connection of the sensor 3002 or the toothbrush 3001 to a network and a display update process of the display device 3000 or the display device 3003 that displays a relating GUI will be described in detail.

In the case where a new home appliance (the toothbrush 3001 or the sensor 3002 as one example) has been found, the GW 1001 to which the toothbrush 3001 is connected or the GW 3004 to which the sensor 3002 is connected downloads a processing program for each piece of home appliance event information from the home appliance management server 3005. In order to immediately reflect sensor information (home appliance event information) acquired from the toothbrush 3001 or the sensor 3002, the home appliance management server 3005 requests a display update of a community screen (graphical user interface image) relating to a home screen displayed in the display device 3000 or the display device 3003.

The process of the GW described above may be performed instead by the home appliance management server 3005, so that each home appliance or sensor is connected directly with the home appliance management server 3005. The display device 3000 or the display device 3003 does not need to be connected to the same GW as the home appliance or sensor and may be connected directly with the home appliance management server 3005.

Figure 31:
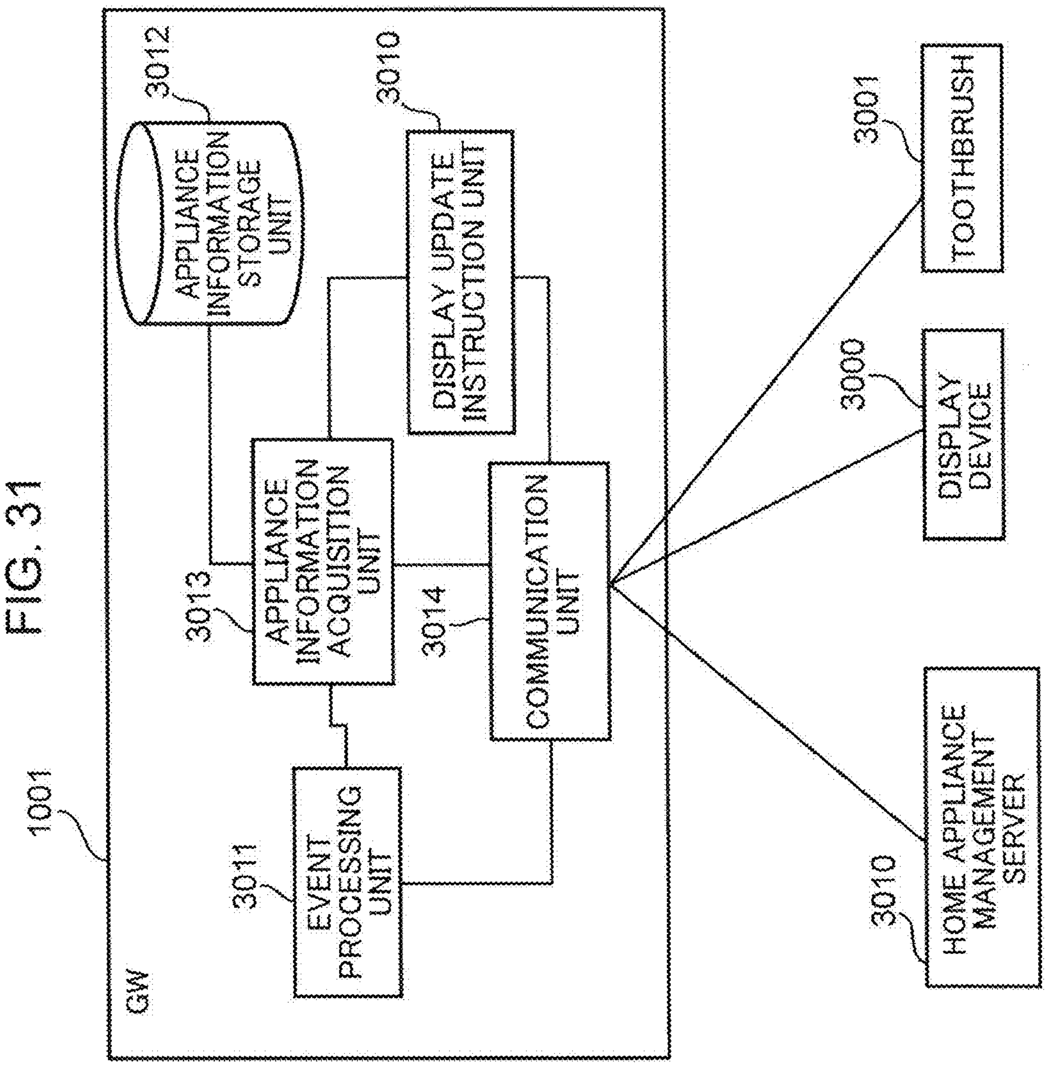
FIG. 31 is a view showing one example of the internal configuration of a GW shown in FIG. 30.

FIG. 31 is a view showing one example of the internal configuration of the GW 1001 shown in FIG. 30. The internal configuration of the GW 3004 is similar to the configuration shown in FIG. 31, and operation is similar to the GW 1001. Therefore, in the description below, the GW 1001 will be described as an example.

In this configuration, a communication unit 3014 connects to a network to perform information communication with a home appliance or sensor (e.g., the display device 3000 or the toothbrush 3001) or the home appliance management server 3005. An appliance information acquisition unit 3013 acquires, from the home appliance management server 3005, home appliance event information in accordance with the type of appliance (home appliance or sensor) connected to the network. The home appliance event information acquired by the appliance information acquisition unit 3013 is saved in an appliance information storage unit 3012.

For a method of determining the type of appliance connected to the network, home appliance event information shown in FIG. 34 can be used, for example. It suffices that a home appliance or sensor be identified uniquely with the appliance ID shown in FIG. 34. For example, a media access control (MAC) address or manufacturing number is acceptable, and an Internet Protocol (IP) address is acceptable as long as the uniqueness is guaranteed. The home appliance type may be embedded in advance in a home appliance or sensor or may be caused to be set by a user by providing setting means such as a GUI. The home appliance type needs to be a sign agreed at least between the home appliance management server 3005 and the GW 1001 or 3004, a home appliance, or a sensor, but does not need to be managed as a character string. A numerical value or any symbol is acceptable.

If each home appliance or sensor that is individually identifiable with the appliance ID as described above holds the home appliance type, the appliance information acquisition unit 3013 can acquire the home appliance type via the communication unit 3014 upon connection to the network.

An event processing unit 3011 acquires, from the appliance information acquisition unit 3013, home appliance event information on a home appliance or sensor connected via the communication unit 3014 and performs an event process in accordance with the acquired home appliance event information. An event defined with the home appliance event information as a result of operation of the home appliance or sensor is specified as a result of the process of the event processing unit 3011, and the home appliance event information is notified to the display device 3000 or the home appliance management server 3005.

As an event with which an event process by the event processing unit 3011 occurs, a state change notification event showing a state change or the like in ON/OFF of power that is the power of a home appliance being turned on or off, an update notification event of sensor information that various sensor values of a home appliance or sensor have been updated, or the like can be defined based on the home appliance event information notified from the home appliance or sensor, for example. The event or event process is not limited to a specific event or event process, and any event or process can be defined.

In the case where the event processing unit 3011 has become capable of an event process with respect to a new home appliance or sensor after the appliance information acquisition unit 3013 has acquired home appliance event information corresponding to the new home appliance or sensor, the display update instruction unit 3010 instructs a display update with respect to the display device 3000 using the communication unit 3014.

As an alternative configuration, the display update instruction unit 3010 may instruct a display update with respect to the display device 3000 explicitly, or the event processing unit 3011 may notify a display update event with respect to the display device 3000.

The home appliance management server 3005 may have a part or all of the configuration of the GW 1001. In that case, a display device, a home appliance, and a sensor are connected directly with the home appliance management server 3005. Particularly, in the case where the role of the GW is a bridge function between the home appliance or sensor and the home appliance management server, a component other than the communication unit may be transferred to the home appliance management server. By this configuration being included in a display device such as the display device 3000, information from a home appliance or sensor may be received directly by the display device to reflect the received information in a GUI.

Figure 32:
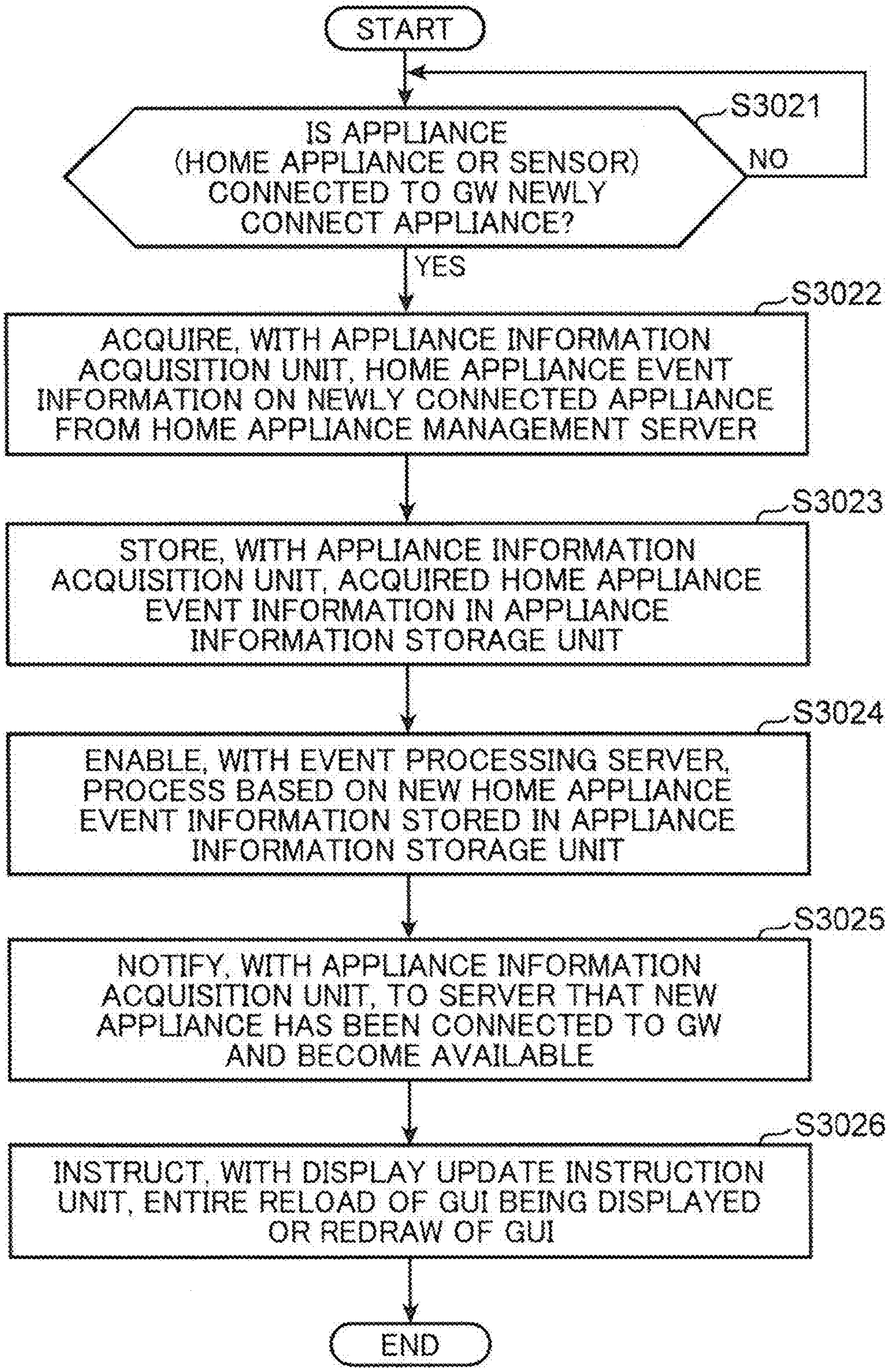
FIG. 32 is a flowchart showing one example of a process of the GW shown in FIG. 30 when a new home appliance or sensor is found.

FIG. 32 is a flowchart showing one example of a process of the GW 1001 when a new home appliance or sensor has been found in this embodiment.

As shown in FIG. 32, the GW 1001 determines whether or not a connected appliance (home appliance or sensor) is a newly connected appliance (step S3021). In the case where the connected home appliance or sensor is a newly connected appliance (YES in step S3021), the appliance information acquisition unit 3013 acquires home appliance event information on the newly connected appliance from the home appliance management server 3005 (step S3022). In the case where the home appliance event information is already acquired from the home appliance management server 3005, acquisition may be not performed.

Next, the appliance information acquisition unit 3013 stores the acquired home appliance event information in the appliance information storage unit 3012 (step S3023), and the event processing unit 3011 enables a process based on the new home appliance event information stored in the appliance information storage unit 3012 (step S3024).

Next, the appliance information acquisition unit 3013 notifies that a new appliance has been connected to the GW 1001 and become available to the home appliance management server 3005 (step S3025), and the display update instruction unit 3010 instructs an entire reload of a GUI being displayed or a redraw of the GUI to the display device 3000 using the communication unit 3014 (step S3026). As a result, a GUI relating to the information acquired from the newly connected home appliance or sensor is updated, and the information that relates to the newly connected home appliance or sensor is displayed in the GUI.

Figure 33:
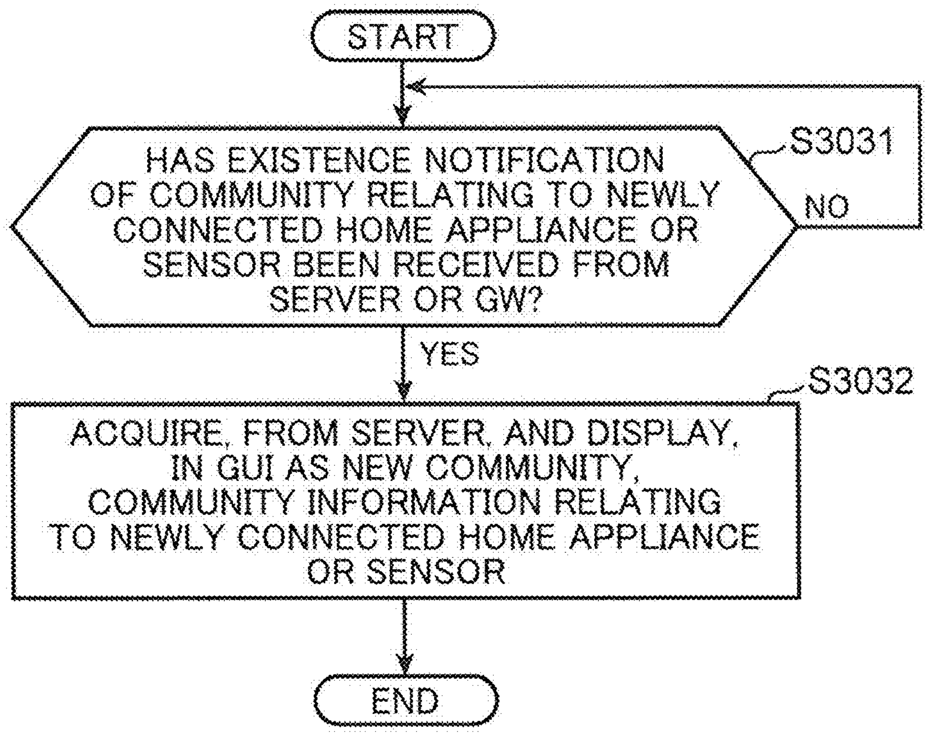
FIG. 33 is a flowchart showing one example of a process of the display device shown in FIG. 30 when a new home appliance or sensor is found.
Figure 36:
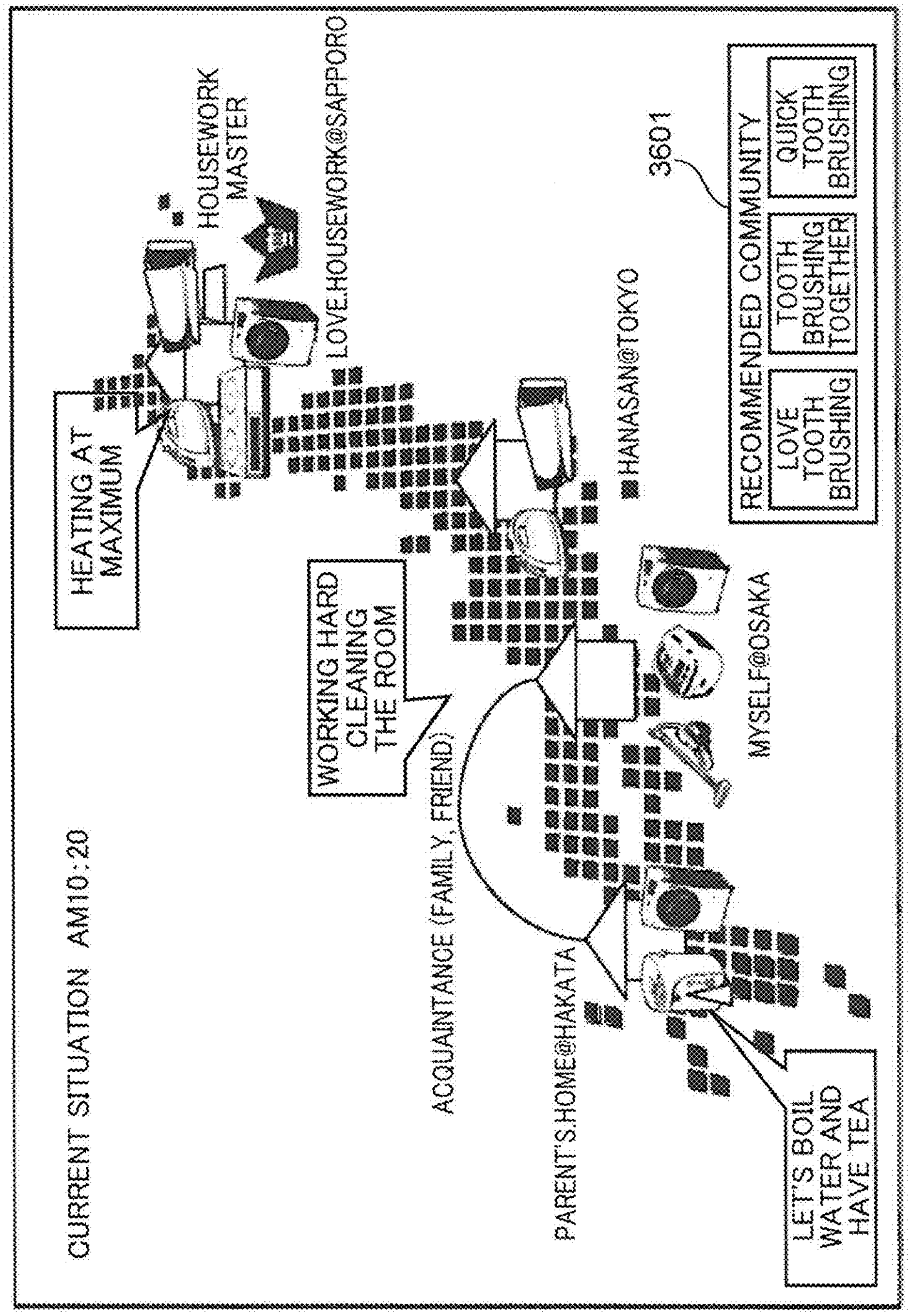
FIG. 36 is a view showing one example of a GUI in Embodiment 3 of the present invention.

FIG. 33 is a flowchart showing one example of a process of the display device 3000 to automatically display a relating community upon connection of a new home appliance or sensor to the network. FIG. 36 is a view showing one example of a GUI upon an automatic display of a relating community upon connection of a new home appliance or sensor to the network, as one example of the GUI displayed and updated in the display device 3000. Since the display device 3003 is configured in a similar manner and operates in a similar manner to the display device 3000, the display device 3000 will be described as an example in the description below.

As shown in FIG. 33, the display device 3000 determines whether or not an existence notification of a community relating to a newly connected home appliance or sensor has been received from the home appliance management server 3005 or the GW 1001 (step S3031). In the case where an existence notification of a community relating to the newly connected home appliance or sensor has been received (YES in step S3031), the display device 3000 acquires community information relating to the newly connected home appliance or sensor from the home appliance management server 3005 and displays the acquired community information as a new community in a GUI (step S3032).

As a result of each process described above, a GUI relating to information acquired from the newly connected home appliance or sensor is updated, and the information (community list information) that relates to the newly connected home appliance or sensor is displayed in a graphical user interface (GUI) image.

For example, a GUI shown in FIG. 36 is displayed, a recommended community image 3601 is displayed as community list information in the lower right of a screen in this example, and a recommended community that relates to the new home appliance or sensor is automatically displayed on the GUI. In this manner, the display device 3000 or the like acquires community list information that relates to a new appliance and superimposes and displays the community list information in a graphical user interface image, when the GW 1001 or the like has detected the new appliance (home appliance or sensor) within a home.

Since the GW 1001 or 3004 can acquire home appliance event information defining an event process for a new appliance when the new appliance (home appliance or sensor) is detected as described above, a GUI can be entirely displayed and updated automatically, or a community list that relates to the new appliance (home appliance or sensor) can be displayed and updated automatically. Thus, in this embodiment, display of a GUI can be updated without troubling a user with operation. Although a home appliance and a display device have been described as being separate in this embodiment, a home appliance having a screen such as a TV 1003 may have a function as a display device.

(Embodiment 4)

Figure 37:
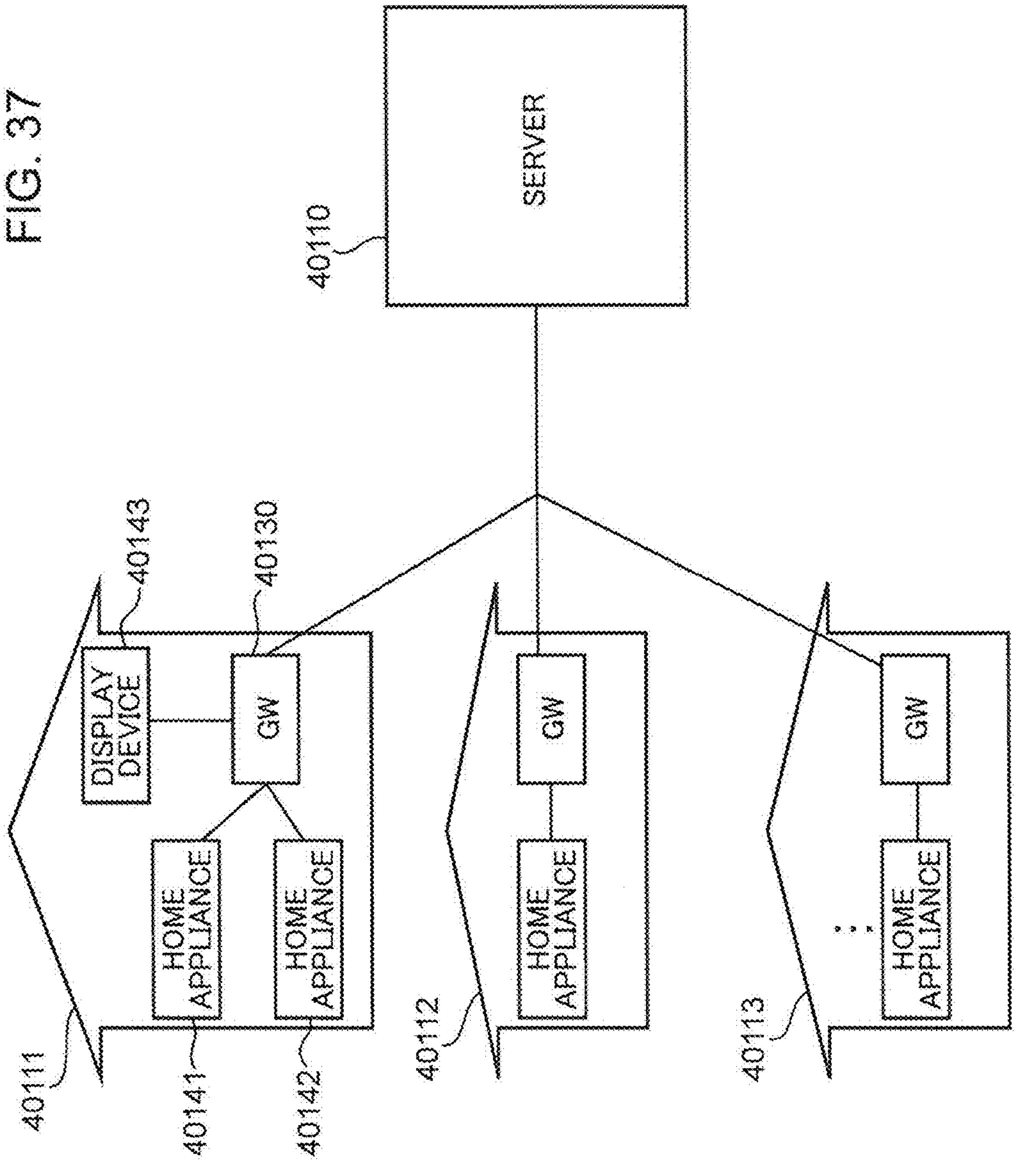
FIG. 37 is a view showing the configuration of an information sharing system in Embodiment 4 of the present invention.

FIG. 37 is a view showing the configuration of an information sharing system in Embodiment 4 of the present invention. In this embodiment as well, in a similar manner to Embodiment 1, it can be such that home appliance event information including the state of a home appliance is transmitted with respect to a server 40110 via the GW 40130 from a home appliance 40141 or 40142 within each house 40111, 40112, or 40113 registered in advance, information on each house is formed as screen information based on the type of the home appliance event information or the occurrence frequency of the home appliance event information, and the screen information is provided with respect to a request of a display device 40143. Regarding this point, description is omitted, and characteristic portions of this embodiment will be described below in detail.

The information sharing system shown in FIG. 37 is configured of the server 40110, a plurality of GWs 40130, the plurality of home appliances 40141 and 40142, and a plurality of the display devices 40143.

The server 40110 acquires the operation situation of the home appliance 40141 or 40142 as home appliance event information, detects a relating community in accordance with the operation situation, and transmits user interface (UI) information on the community to the home appliance 40141 or 40142 via the GW 40130.

The home appliance event information includes operation information representing the operation situation of the home appliance 40141 or 40142 as information on the state change of the home appliance 40141 or 40142 and home appliance type information representing the type of the home appliance 40141 or 40142. The server 40110 determines, as a community to which a user is related, a community associated with the type of appliance specified by the home appliance type information, and the display device 40143 displays a user interface image (UI image) relating to the community in accordance with the operation state of the appliance specified by the operation information.

As a network that connects the server 40110 and the GW 40130, the Internet can be used. A form using a different line such as a mobile phone network is acceptable, as long as home appliance event information on the home appliances 40141 and 40142 can be transmitted to the server 40110.

The GW 40130 is an appliance having a function of connecting with the server 40110 through a network, and may be in a shape of a router or may be an appliance that is a home appliance embedded with a gateway function. For example, out of home appliances, a home appliance such as a refrigerator, washstand, or air conditioner to which power is constantly supplied can function as a GW by being provided with a function of connecting to a network.

The home appliances 40141 and 40142 are Internet appliances including a function of network connection with the GW 40130. An Internet appliance is a concept showing a home appliance or equipment having a function of connecting to various networks including the Internet and widely covers not just audio-video (AV) equipments such as a television, recorder equipment, or remote control equipment thereof but also home appliances such as a bathroom scale, toothbrush, or dryer, major appliances, and the like.

Figure 38:
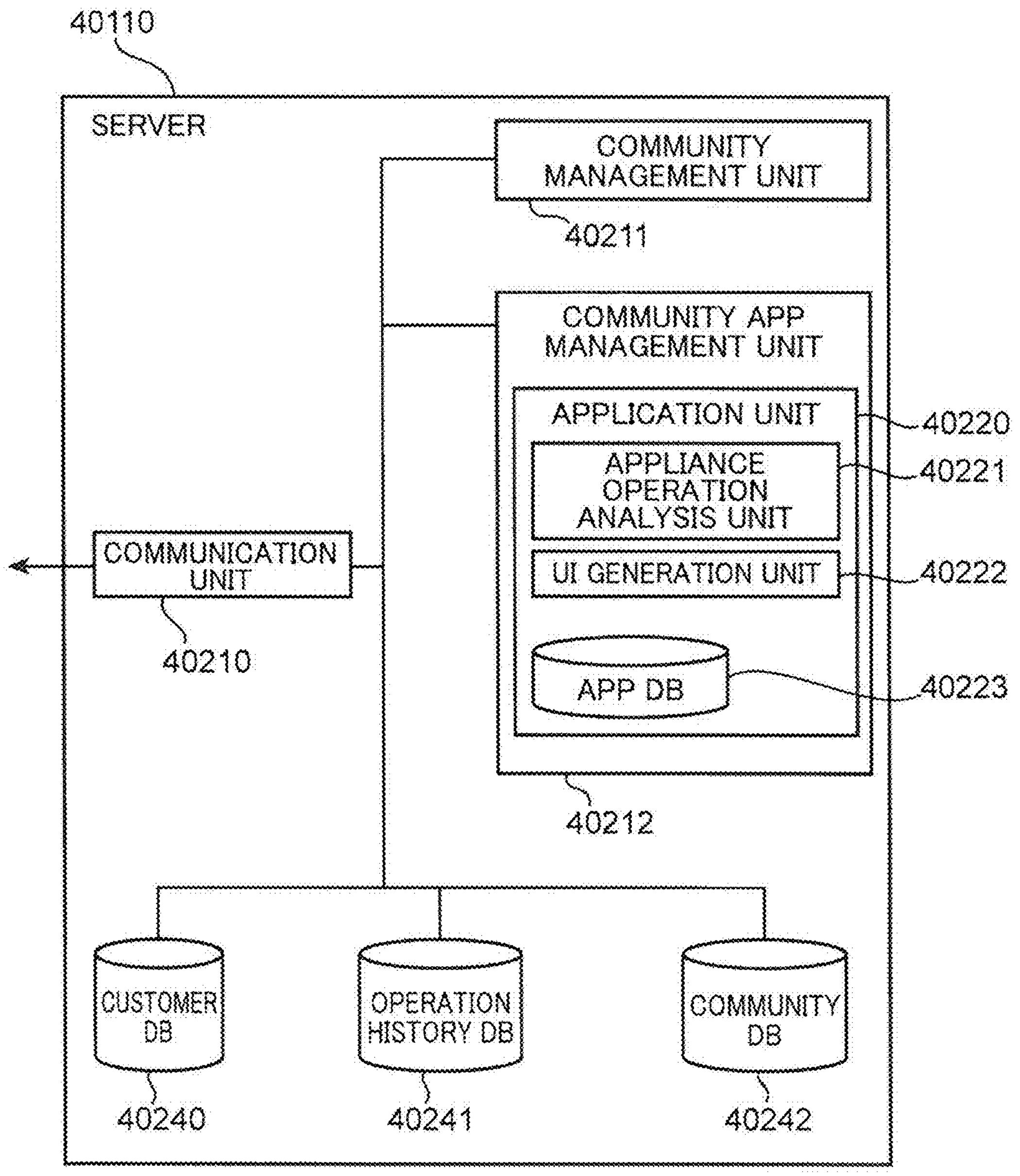
FIG. 38 is a view showing one example of the configuration of a server shown in FIG. 37.

FIG. 38 is a view showing one example of the configuration of the server 40110 shown in FIG. 37. As shown in FIG. 38, the server 40110 is configured of a communication unit 40210, a community management unit 40211, a community app management unit 40212, a customer DB 40240, an operation history DB 40241, and a community DB 40242. The community app management unit 40212 manages a plurality of application units 40220. Each application unit 40220 is configured of an appliance operation analysis unit 40221, a UI generation unit 40222, and an app DB 40223.

Although each DB is provided within the server 40110 as described above in this embodiment, this example is not particularly limiting, and an external DB may be used in a similar manner to Embodiment 1.

The communication unit 40210 establishes a state of performing data exchange and performs data communication with the home appliance 40141 or 40142 via the GW 40130 connected to the network.

The community management unit 40211 manages a community associated with the home appliance 40141 or 40142. Specifically, the community management unit 40211 specifies a community to which a user is related from the home appliance type information on the home appliance 40141 or 40142 acquired by the communication unit 40210 and transmits the operation situation of the home appliance 40141 or 40142 acquired by the communication unit 40210 to the community app management unit 40212 to request UI generation. The community management unit 40211 stores the operation situation (home appliance event information) of the home appliance 40141 or 40142 acquired by the communication unit 40210 in the operation history DB 40241.

The community app management unit 40212 manages the application unit 40220 associated with each community. Specifically, the community app management unit 40212 determines the operation situation of the home appliance 40141 or 40142 acquired from the community management unit 40211 and generates a UI image to be provided to a user.

Next, each component forming each application unit 40220 managed by the community app management unit 40212 will be described.

The appliance operation analysis unit 40221 acquires relating home appliance event information from the operation history DB 40241 and determines the context of a user from the history of appliance operation. The appliance operation analysis unit 40221 requests generation of a UI image to be displayed to the user in accordance with the determined context to the UI generation unit 40222. The UI generation unit 40222 determines the display region of the display device 40143 and generates the UI image in accordance with the display region.

The app DB 40223 stores information to be used by an application executed by the application unit 40220. For example, in the case where the application displays a log of the past, information to be saved is associated with a user ID or GW ID in the customer DB 40240 and saved internally by the app DB 40223.

The customer DB 40240 holds, for each user, respective pieces of information that are the various IDs, the registration information, and the reference to the operation history of the user. Using the information, the community management unit 40211 and the community app management unit 40212 determine the community or UI image in accordance with the user.

FIG. 39 is a view showing one example of a customer database stored in the customer DB 40240 and one example of a user operation history database stored in the operation history DB 40241 shown in FIG. 38. As shown in the upper section in FIG. 39, respective pieces of information that are a user ID 40301, a GW ID 40302, a registered name 40303 of a user, a registered community 40304 of a user, a possessed appliance 40305, and a reference 40306 to the operation history are stored in the customer DB 40240 in table format.

The user ID 40301 is an identifier with which a user is uniquely identified. The GW ID 40302 is an identifier with which the GW 40130 is uniquely identified. For the sake of simple description, a case where one GW exists in each house (home) is described. However, depending on the house, there is a possibility that a house owning a plurality of GWs exists. In such a case, it may be such that a house ID (identifier with which a home is uniquely identified) is introduced in addition to a GW ID, a form is taken in which a plurality of GW IDs exist under the house ID, and the house ID is used instead of the GW ID described in this embodiment. For the house ID, a method of managing with the server 40110 is acceptable. A method is also acceptable in which a house ID is registered with respect to a home appliance upon performing registration of a newly obtained home appliance or the like in the server 40110 and the house ID is notified to the server 40110 at the time of communication from the home appliance.

Information on the registered name 40303 may be either a tentative name or real name of a user that is used within a community. Information on the registered community 40304 is the name of a community in which a user in question is registered. Information on the possessed appliance 40305 shows a list of home appliances owned by a user in question. Information on the reference 40306 to the operation history is reference information for the operation history DB 40241 storing the history of operation of the possessed appliance 40305 by a user in question. In the upper section in FIG. 39, information relating to a user ID "U0001" is stored in a row 40310, and information relating to a user ID) "U0002" is stored in a row 40320, as one example.

The operation history DB 40241 stores, as home appliance event information, operation history information managed for each user. In the lower section in FIG. 39, one example of an operation history database relating to a user (registered name "Haru") with the user ID "U0001" shown in the upper section in FIG. 39 is shown. In the example shown in the lower section in FIG. 39, respective pieces of information that are year/month/day 40401, time 40402, an operated appliance 40403, and an operation detail 40404 are stored in the operation history DB 40241 in table format.

Information on the year/month/day 40401 shows the year, month, and day in which operation has been performed. Information on the time 40402 shows the time at which the operation has been performed. Information on the operated appliance 40403 shows home appliance type information representing the type of appliance for which the operation has been performed. Information on the operation detail 40404 shows the operation information representing the operation performed with the appliance that is the operated appliance 40403.

List information on operation details that may occur for each operated appliance may be determined in advance at the time of product shipment and stored in advance in the operation history DB 40241 or may be under a policy of update on an as-needed basis on the server 40110. In the lower section in FIG. 39, the date and time or the like in which the power of a bathroom scale has been turned ON are stored in a row 40410, and the date and time or the like in which an operation button for selecting a person registered in the bathroom scale (selecting a person associated with button No. 1) has been pressed are stored in a row 40420, as one example of the operation history relating to the user (registered name "Haru").

The community DB 40242 stores association information on a list of a community managed by the server 40110 and a corresponding appliance (home appliance). FIG. 40 is a view showing one example of a community database stored in the community DB 40242 shown in FIG. 38.

In the example shown in FIG. 40, respective pieces of information that are a community 40501, a corresponding appliance 40502, and a reference 40503 to an application are stored in the community DB 40242 in table format. Information on the community 40501 shows a list of communities managed by the server 40110. Information on the corresponding appliance 40502 shows the home appliance type information representing the relating type of appliance for each community. Information on the corresponding appliance 40502 is not particularly limited to the example described above. For example, the corresponding appliance 40502 may be classified into and managed as necessarily corresponding appliance and possibly corresponding appliance.

As information on the reference 40503 to an application, reference information for a region storing a program of a community in question is held. In FIG. 40, a corresponding appliance for a diet community and reference information for an application 1 are stored in a row 40510, and a corresponding appliance for a cleaning community and reference information for an application 2 are stored in a row 40520, as one example.

Figure 41:
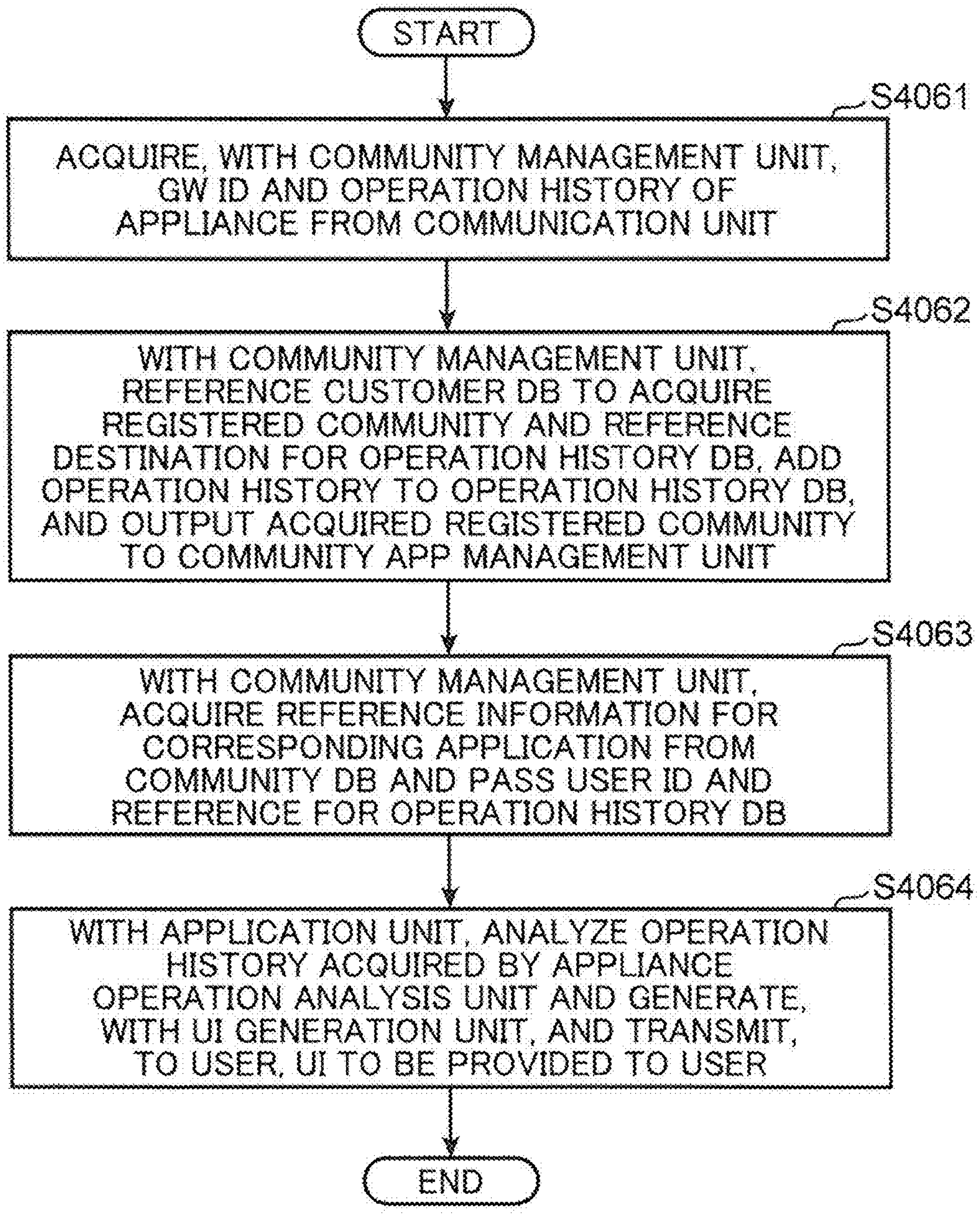
FIG. 41 is a flowchart showing one example of a control process of the server shown in FIG. 37.

Next, a control process of the server 40110 will be described. FIG. 41 is a flowchart showing one example of the control process of the server 40110 shown in FIG. 37.

First, the community management unit 40211 acquires the GW ID and the operation history of an appliance from the communication unit 40210 (step S4061). Next, the community management unit 40211 references the customer DB 40240 to acquire the user ID, registered community, and information on reference to the operation history that are associated with the acquired GW ID, then adds an operation history to the operation history DB 40241, and further outputs the acquired information on the registered community to the community app management unit 40212 (step S4062).

Next, the community app management unit 40212 references the community DB 40242, acquires reference information for an application associated with the acquired registered community, and passes reference information for the application, the user ID, and reference information for the operation history to the application unit 40220 (step S4063). Next, the application unit 40220 executes the corresponding application using the reference information for the application, analyzes, with the appliance operation analysis unit 4021, the operation history acquired using the reference information for the operation history, generates a UI image to be provided to a user with the UI generation unit 40222, and transmits the generated UI image to the user (step S4064).

Next, one example of the control process of the server 40110 in the case where a washstand (appliance having not only a function of a washstand as a home appliance but also a function of the GW 40130 and a function of the display device 40143) equipped with a network function and a display function is used as the GW 40130 and a bathroom scale is used as the home appliance 40141 will be described in detail.

Figure 42:
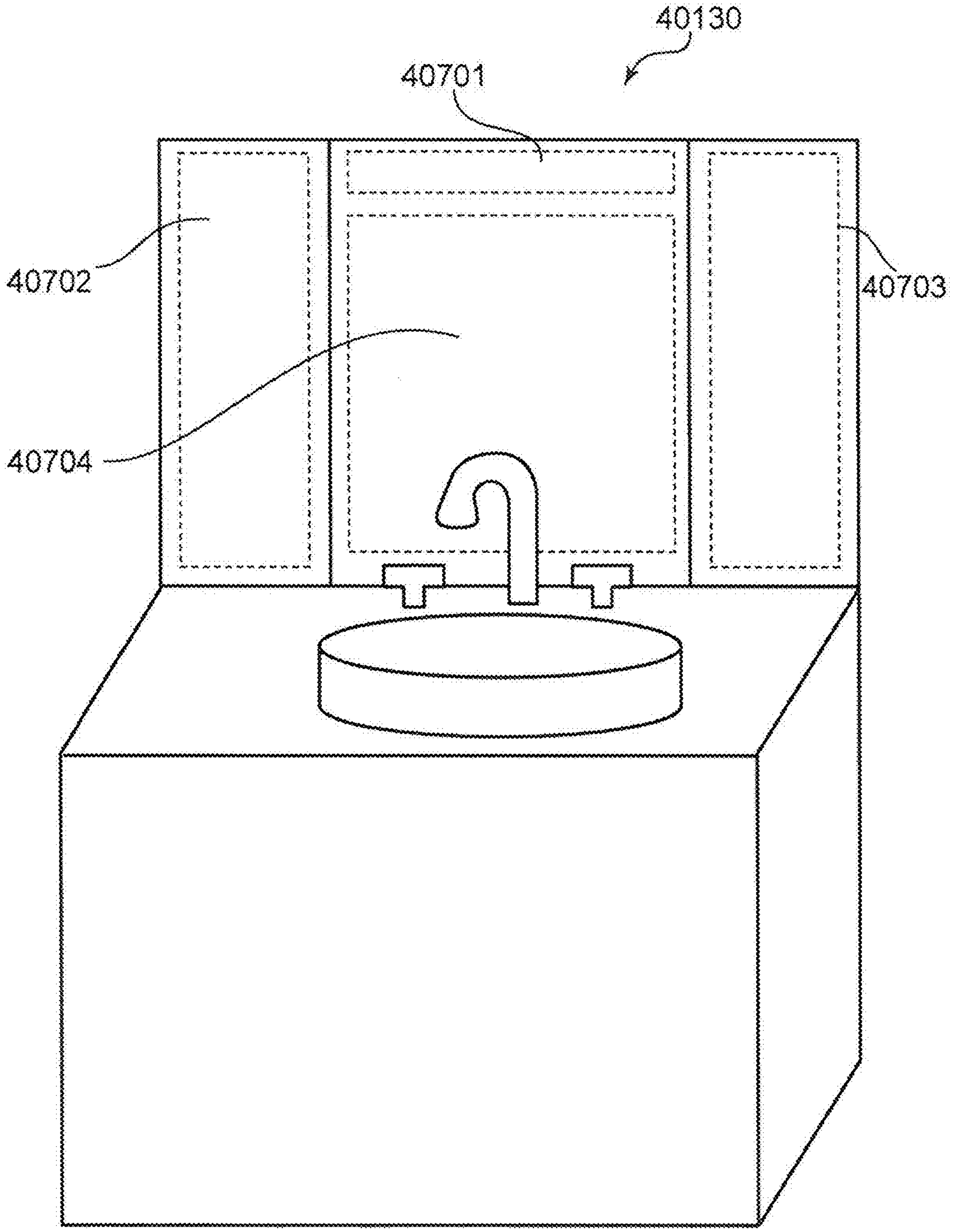
FIG. 42 is a perspective view of a washstand equipped with a network function and a display function.

FIG. 42 is a perspective view of the washstand 40130 equipped with the network function and the display function. The washstand 40130 can be connected to the Internet and can be connected to the bathroom scale 40141 existing near the washstand 40130 or another home appliance 40142 such as a toothbrush. The mirror surface of the washstand 40130 is a half mirror in which an image displayed by a built-in display and an image reflected in the mirror surface can be superimposed and displayed.

The washstand 40130 can change the display content for each region of the mirror surface. For example, an appliance area 40701 is a region that displays a home appliance icon of the bathroom scale 40141 or another home appliance 40142 that can be connected with the washstand 40130. By changing the manner of display in accordance with the current state of connection with the washstand 40130, a connectable appliance such as a home appliance or the like connected with the washstand 40130 can be visualized.

Figure 43:
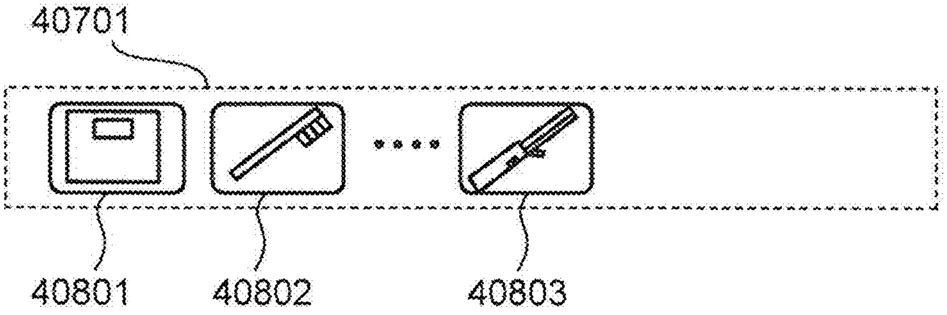
FIG. 43 is a view showing a display example of connectable appliances in an appliance area shown in FIG. 42.

FIG. 43 is a view showing a display example of connectable appliances in the appliance area shown in FIG. 42. For example, in the appliance area 40701, a list of home appliances or the like connectable to the washstand 40130, such as a bathroom scale icon 40801 representing the bathroom scale 40141, a toothbrush icon 40802 representing a toothbrush, and a dryer icon 40803 representing a dryer, is displayed. When the bathroom scale 40141 is connected to the washstand 40130, the bathroom scale icon 40801 representing the bathroom scale 40141 lights up to display a connected home appliance or the like clearly to a user.

A log area 40702 shown in FIG. 42 is a region for displaying data measured by the bathroom scale 40141 or the like clearly to a user. Display can be performed not only for the weight at a timing of performing weight measurement but also for comparison with a log (measurement data or the like) of the past.

Figure 44:
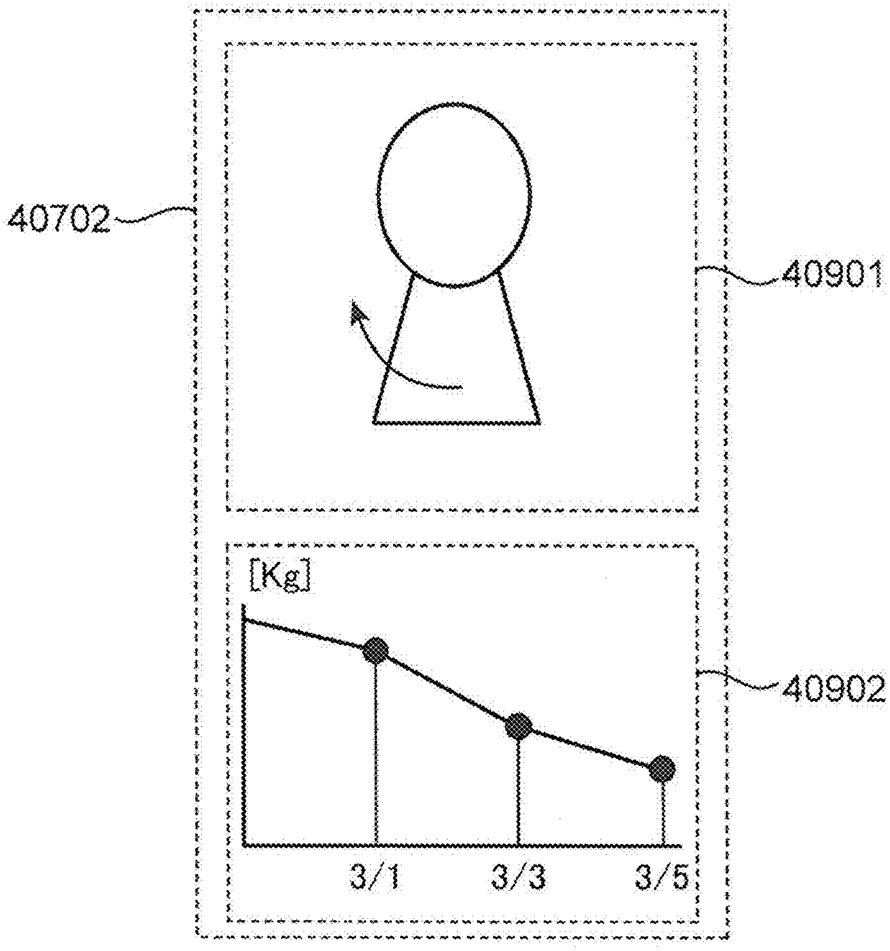
FIG. 44 is a view showing a display example of measurement data in a log area shown in FIG. 42.

FIG. 44 is a view showing a display example of measurement data in a log area shown in FIG. 42. For example, in the case where a camera is mounted to the washstand 40130, a photograph or image can be taken at a timing of weight measurement, and the weight can be displayed not only with a number but also with the taken image of a user as a change in body shape in a region 40901 in the upper portion of the log area 40702. In the case where imaging information on the back and side of a user is combined to create a three-dimensional image and the three-dimensional image is displayed, the direction of display may be changed by user operation. It can be such that the display in question is expressed not with a normal photograph or image but with a silhouette image, and visualization of a change in body shape is performed through superimposition with a silhouette image of the past.

In a region 40902 in the lower portion of the log area 40702, the weight of the past is displayed in a clear manner in a graph or the like. By selecting a measurement point on the graph in question, the body shape of a user at the time of the selection can be displayed within the region 40901.

An SNS area 40703 shown in FIG. 42 is a community region that displays an image relating to a community in which a user is participating. By displaying the situation of another user participating in the community, the motivation of the user upon operating a home appliance or the like can be improved.

Figure 45:
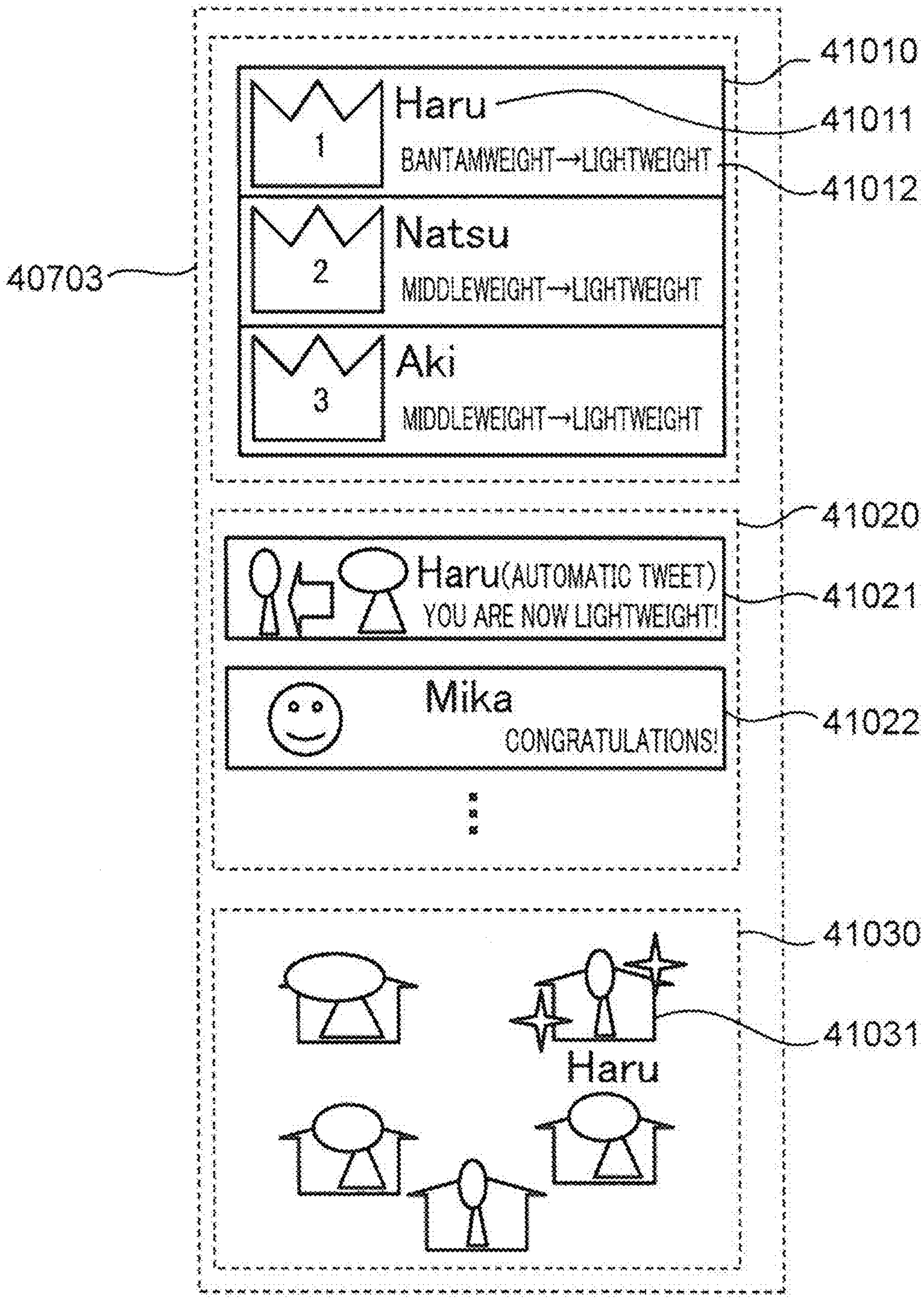
FIG. 45 is a view showing a display example of a community in an SNS area shown in FIG. 42.

FIG. 45 is a view showing a display example of a community in the SNS area shown in FIG. 42. For example, in a region 41010 in the upper portion of the SNS area 40703, ranking information on users participating in the same community is displayed.

For example, upon a user performing weight measurement, the washstand 40130 transmits weight data measured by the bathroom scale 40141 to the server 40110. In accordance with the measurement result, the appliance operation analysis unit 40221 within the application unit 40220 for a diet community detects that weight has been measured, and the UI generation unit 40222 creates a UI image of a ranking of weight change for comparison with other community participants. The created UI image is transmitted to the washstand 40130, and the UI image of the ranking of weight change is displayed in the region 41010 shown in FIG. 45. A user name 41011 is the registered name registered in the customer database in FIG. 39. Since a user may feel uncomfortable with the weight result being displayed as is, weights are divided into classes, and a class display 41012 displays a change in class of the user.

In this method of expressing a class as well, a stout show-business personality, a thin show-business personality, or the like who is symbolic can be used for expression of a class in accordance with the trend, for example. A categorization in consideration of the balance between height and weight can be performed, such as the class being made the same as a show-business personality with the closest body mass index (BMI) calculated from the height and weight of a user.

A region 41020 in an intermediate portion in the SNS area 40703 is a region representing information on a tweet between members belonging to a community in question. For example, tweet information 41021 represents a tweet generated automatically upon a class promotion in one's weight. The change in class can be notified to a user belonging to the same community merely by measuring the weight. As with the tweet information 41022, an award with respect to the weight approaching a goal can be received by receiving a message from a friend. On the other hand, upon an increase in weight to a higher class, a message from a friend can be an encouragement. Since a response from others with respect to one's action can be seen easily, a user can be inclined to continue weight management while maintaining motivation.

A region 41030 in the lower portion of the SNS area 40703 is a region that displays a list of a part or all of community participants. By actually changing what is displayed to a city group, age group, or the like, a class with many users or the like can be comprehended at a glance. It is easy with the UI image to compare one's class with others. For example, as with a user icon 41031, it becomes easy to grasp movements of other participants within the community by adding an expression (e.g., sparkling expression) comprehensible to a user for a recent class change that has occurred.

By representation through an expression (e.g. class display (ranking display), display of tweet information, or display of a list of users) with which a loose connection of users belonging to the same community can be felt in this manner instead of one's weight management being performed alone by oneself from the result of measurement with the bathroom scale 40141, a user can more enjoyably perform weight management and enable motivation to be maintained.

A middle region 40704 shown in FIG. 42 is a region in which a user standing in front of a mirror is most reflected, and therefore is a region that can be expected to be utilized for a temporary large display or the like of an operation result or the like of a home appliance or the like of the user. For example, by a result upon completion of measurement of weight with the bathroom scale 40141 not only being displayed in a liquid crystal panel in the bathroom scale 40141 but also being displayed largely for a certain Lime in the middle region 40704 of the washstand 40130, a user can further comprehend the result at a glance.

Although a UI display with coordination of the bathroom scale 40141 and the washstand 40130 has been described as an example in this embodiment, there are appliances for which superimposition and display on an image of a user is advisable, depending on the type of home appliance or the like in coordination. For example, in the case of a community app that assists the use of a toothbrush, there are cases where an illustration using an image in which the placement or the like of the toothbrush is superimposed on one's teeth is more comprehensible to a user. In this manner, the position or content of the display region described above is one example. The position or content of the display region can be determined freely in accordance with a home appliance or the like in coordination or a participated community. Therefore, the present invention is not limited to the content described herein and can be adapted widely.

Figure 46:
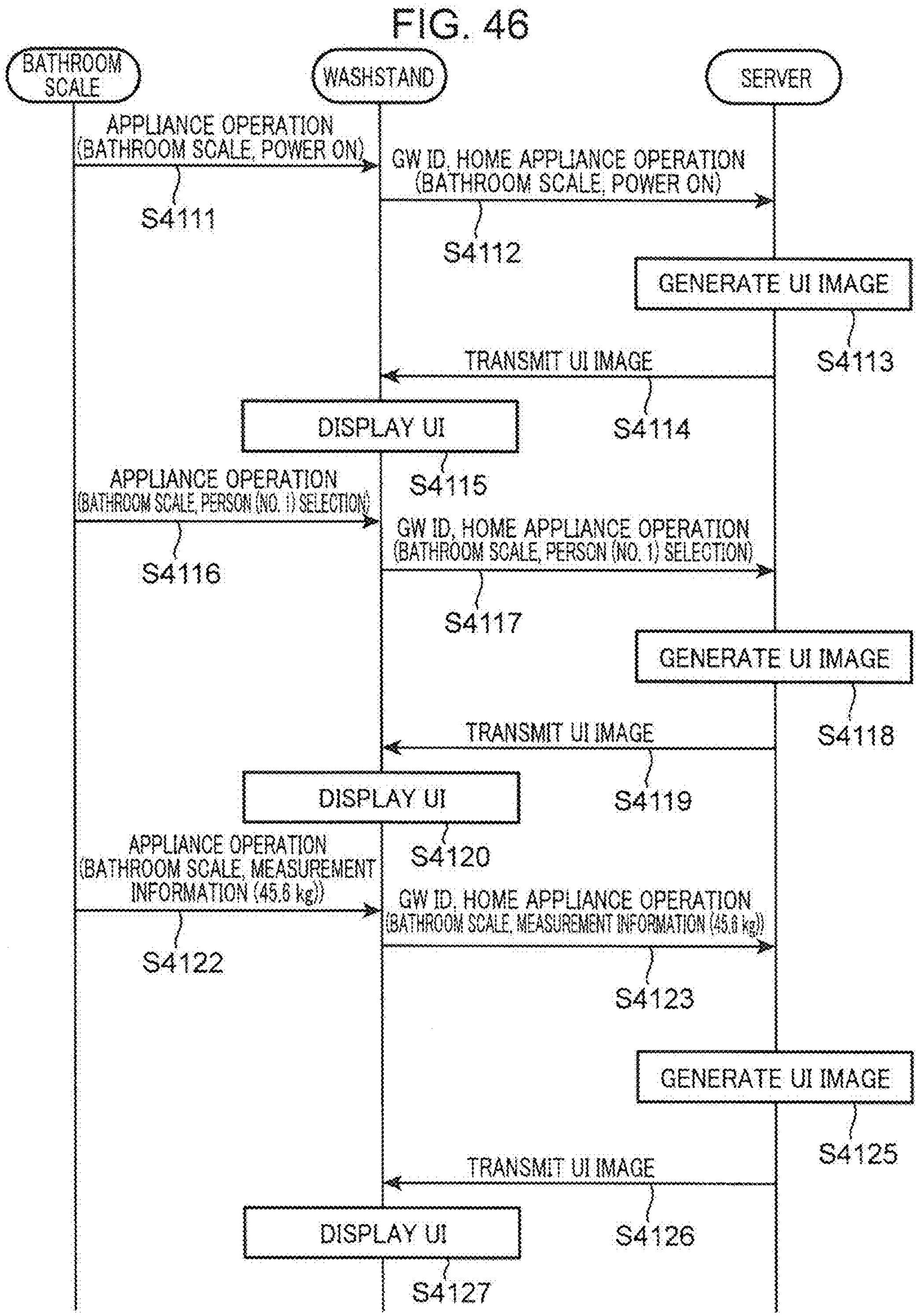
FIG. 46 is a sequence diagram showing one example of a control process using a washstand and bathroom scale by the server shown in FIG. 37.

Finally, one example of a control process of the information sharing system will be described with the washstand 40130 and the bathroom scale 40141 as one example. FIG. 46 is a sequence diagram showing one example of the control process of the server 40110 using the washstand 40130 and the bathroom scale 40141.

Upon a user turning ON the bathroom scale 40141, the bathroom scale 40141 performs data communication with the washstand 40130 (step S4111). At this time, the washstand 40130 transmits "GW ID" and information on operated appliance and operation detail information as "home appliance operation" to the server 40110 (step S4112).

Next, according to the control process in FIG. 41, the server 40110 generates a UI image to be displayed in the washstand 40130 (step S4113). The server 40110 transmits the generated UI image to the washstand 40130 (step S4114). Although the UI image is transmitted directly herein, it may be such that a destination of access to the server 40110 is transmitted to the washstand 40130 and the washstand 40130 acquires the UI image from the server 40110, or a method may be such that the server 40110 transmits a UI component to the washstand 40130.

Next, the washstand 40130 displays the UI image designated by the server 40110 (step S4115). As one example, the washstand 40130 displays that a bathroom scale is currently connected by displaying the bathroom scale icon 40801 in the appliance area 40701 shown in FIG. 43 and changing the color or the like of the bathroom scale icon 40801.

When a user presses a person selection button in order to measure the weight or the like of oneself, the bathroom scale 40141 transmits "bathroom scale" and "person selection information" that are information on the operated appliance to the washstand 40130 (step S4116). At this time, the washstand 40130 transmits "GW ID" and information on the operated appliance and operation detail information as "home appliance operation" to the server 40110 (step S4117).

Next, according to the control process in FIG. 41, the server 40110 generates a UI image to be displayed in the washstand 40130 (step S4118). The server 40110 transmits the generated UI image to the washstand 40130 (step S4119).

Next, the washstand 40130 displays the UI image designated by the server 40110 (step S4120). As one example, the washstand 40130 displays in a graph the weight of the past in the region 40902 shown in FIG. 44 to display past weight information on the selected user in the graph or the like in a clear manner. In the case where a video is displayed in the region 40901, body shape information on the user may be displayed. In the case where a static image is displayed in the region 40901, an image taken at a timing when the user is facing an appropriate direction may be displayed.

When the user measures the weight of oneself, the bathroom scale 40141 transmits "bathroom scale" and "measurement information" that are information on the operated appliance to the washstand 40130 (step S4122). At this time, the washstand 40130 transmits "GW ID" and information on the operated appliance and operation detail information as "home appliance operation" to the server 40110 (step S4123).

Next, according to the control process in FIG. 41, the server 40110 generates a UI image to be displayed in the washstand 40130 (step S4125). The server 40110 transmits the generated UI image to the washstand 40130 (step S4126).

Next, the washstand 40130 displays the UI image designated by the server 40110 (step S4127). As one example, the washstand 40130 displays ranking information or the like in the regions 41010 to 41030 shown in FIG. 45. As a result, the washstand 40130 can display in class the relationship of another user with one user belonging to a community as a user interface image.

Although the image shown in FIG. 45 is displayed as the UI image of the measurement result herein, it may be such that the image shown in FIG. 45 is displayed in step S4120 and the region of the SNS area 40703 is changed in accordance with the measurement result in step S4127.

For example, upon the user name "Haru" achieving class promotion in this measurement, the ranking of the user name "Haru" in the region 41010 changes to first place. Further, the tweet information 41021 in the region 41020 is automatically tweeted, and, in response thereto, a message from a friend is also tweeted. In the display of a list in the region 41030, the user icon 41031 of the user name "Haru" is changed from an icon for bantamweight to an icon for lightweight, and a sparkling mark showing a change in class is displayed.

In this manner, in the case where a user is participating in a community in this embodiment, a UI image that is community information relating to other community participants can be displayed by operation of a home appliance or the like, and the motivation of the user operating the home appliance or the like can be maintained.

(Embodiment 5)

Next, a GUI screen displayed upon operation of a vacuum cleaner using an SNS application process using the vacuum cleaner will be described for an information sharing system in Embodiment 5 of the present invention.

Figure 47:
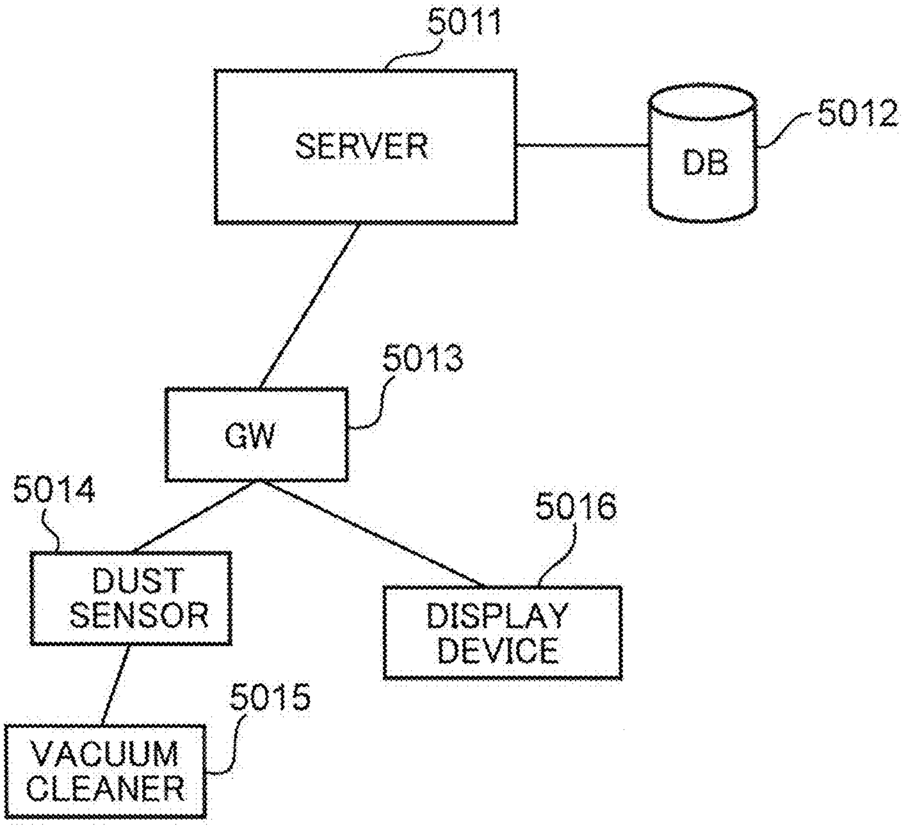
FIG. 47 is a view showing the configuration of an information sharing system in Embodiment 5 of the present invention.
Figure 48:
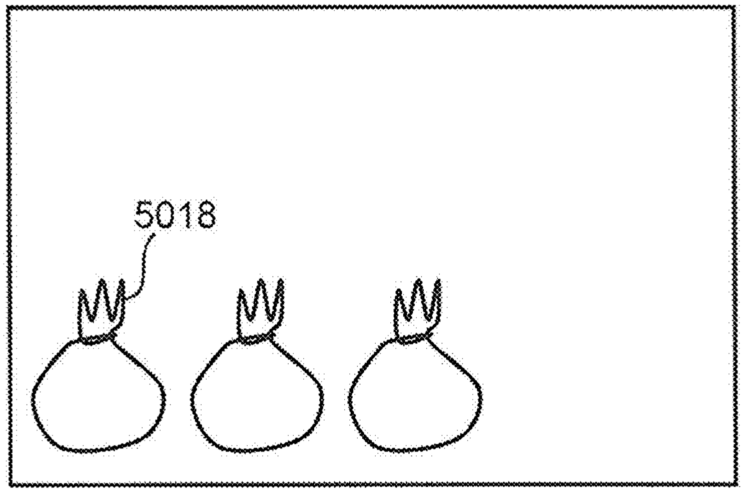
FIG. 48 is a view showing one example of a display screen displayed in a display device shown in FIG. 47.

FIG. 47 is a view showing the configuration of the information sharing system in Embodiment 5 of the present invention. FIG. 48 is a view showing one example of a display screen displayed in a display device shown in FIG. 47. In this embodiment as well, in a similar manner to Embodiment 1, it can be such that home appliance event information including the state of a home appliance is transmitted with respect to a server 5011 via a GW 5013 from a home appliance within each house registered in advance, information on each house is formed as screen information based on the type of the home appliance event information or the occurrence frequency of the home appliance event information, and the screen information is provided with respect to a request of a display device 5016. Regarding this point, description is omitted, and characteristic portions of this embodiment will be described below in detail.

The information sharing system shown in FIG. 47 includes a server 5011, a DB 5012, a GW 5013, a dust sensor 5014 that is one example of a sensor, a vacuum cleaner 5015 that is one example of a home appliance, and the display device 5016. In this embodiment, in a manner below, a garbage bag item can be gained on an SNS service as a reward, when the amount of dust exceeds a value set in advance.

That is, when the vacuum cleaner 5015 sucks up dust, the dust sensor 5014 detects the amount of sucked dust. The GW 5013 acquires, from the dust sensor 5014, and notifies, as home appliance event information to the server 5011, the amount of dust sucked by the vacuum cleaner 5015.

When the amount of dust exceeds the value set in advance, the server 5011 provides the garbage bag item on the SNS service to a user as a reward. Specifically, the server 5011 retains the number of gained garbage bags in the DB 5012 for each user. The server 5011 generates and, via the GW 5013, causes the display device 5016 to display a graphical user interface (GUI) image in accordance with the number of gained garbage bags. For example, as the GUI image, a garbage bag icon 5018 shown in FIG. 48 is displayed on the display screen of the display device 5016.

Figure 49:
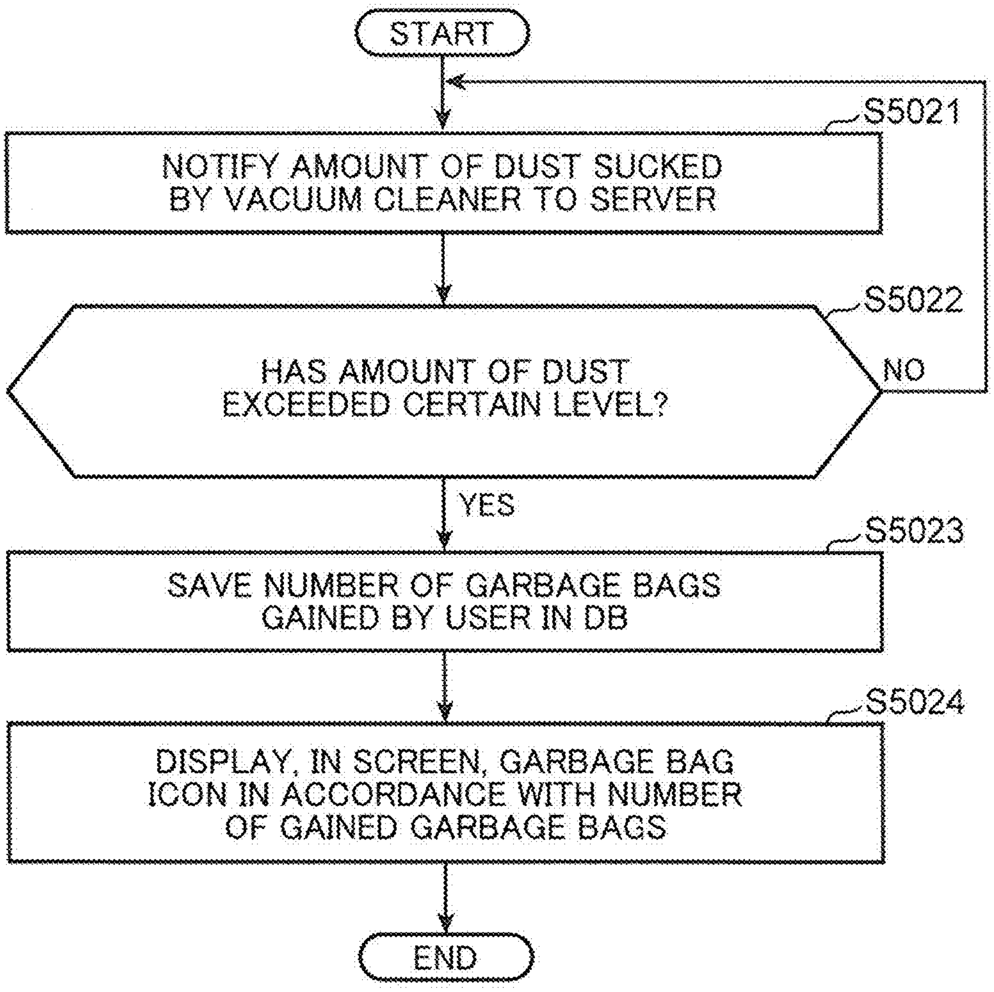
FIG. 49 is a flowchart showing one example of a process in the information sharing system shown in FIG. 47.

FIG. 49 is a flowchart showing one example of a process in the information sharing system shown in FIG. 47. First, the GW 5013 acquires, from the dust sensor 5014, and notifies, to the server 5011, the amount of dust sucked by the vacuum cleaner 5015 (step S5021). Next, the server 5011 determines whether or not the amount of dust has exceeded the value set in advance (step S5022) and, in the case where the amount of dust has not exceeded the value set in advance (NO in step S5022), the process of step S5021 is repeated.

In the case where the amount of dust exceeds the value set in advance (YES in step S5022), the user gains a garbage bag, and the server 5011 saves the number of gained garbage bags in the DB 5012 (step S5023). Next, the server 5011 creates a GUI image in accordance with the number of gained garbage bags and causes the garbage bag icon 5018 to be displayed in the display screen of the display device 5016 via the GW 5013 (step S5024).

With the process described above, in this embodiment, the garbage bag icon 5018 increases on the display screen of the display device 5016 in accordance with the amount of dust sucked by the vacuum cleaner 5015, and the number of gained garbage bags is saved in the DB 5012. The display device 5016 or the dust sensor 5014 does not necessarily need to communicate with the server 5011 via the GW 5013 and may use a network for direct communication.

Figure 50:
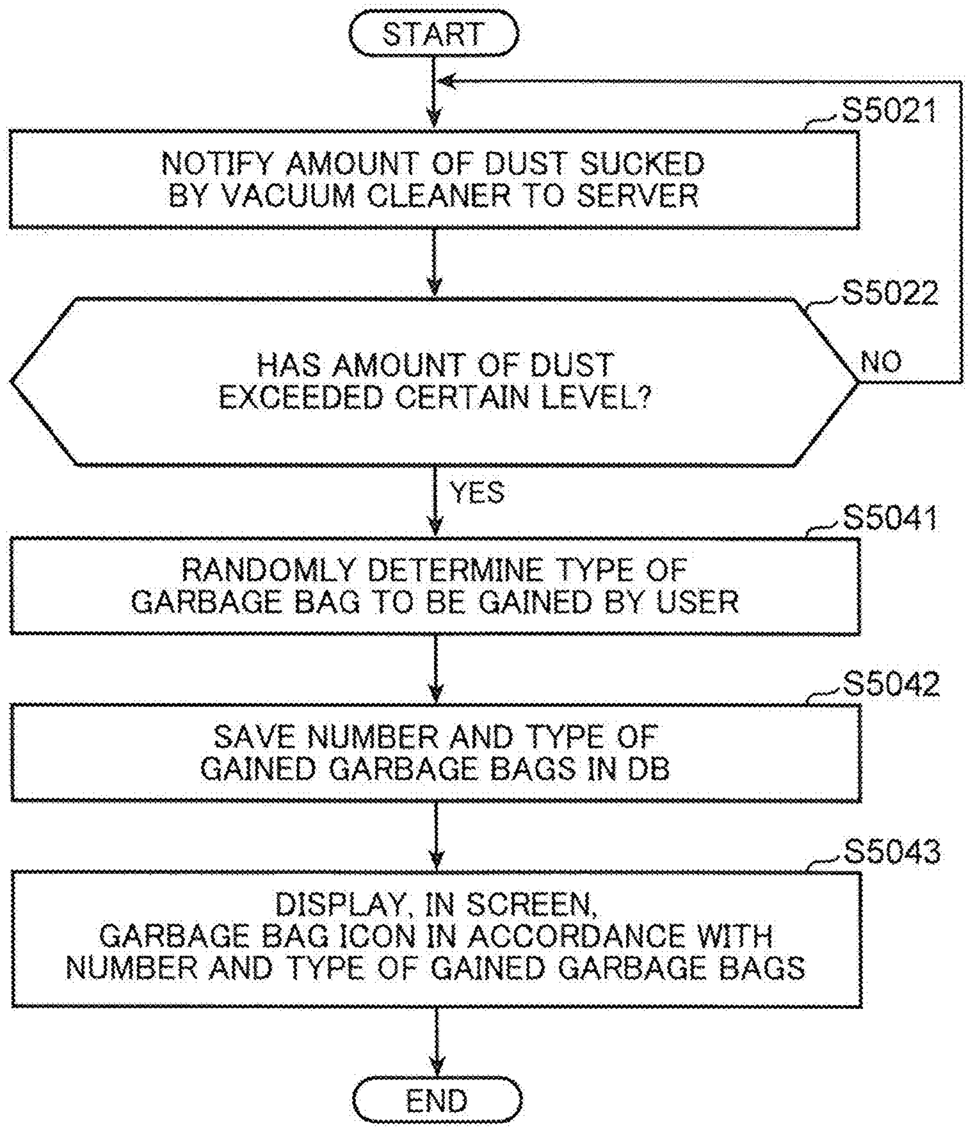
FIG. 50 is a flowchart showing a first extended process in the information sharing system shown in FIG. 47.
Figure 51:
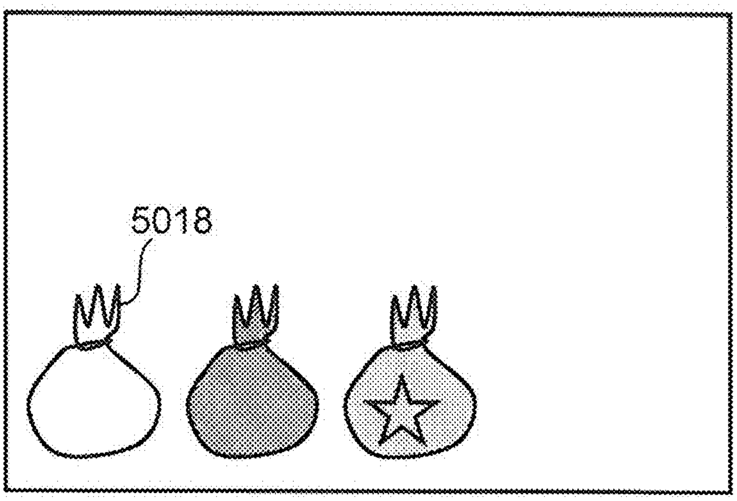
FIG. 51 is a view showing another example of a display screen displayed in the display device shown in FIG. 47.

The process described above may be extended as in FIG. 50. FIG. 50 is a flowchart showing a first extended process in the information sharing system shown in FIG. 47. FIG. 51 is a view showing another example of a display screen displayed in the display device shown in FIG. 47. Steps S5021 and S5022 shown in FIG. 50 are processes similar to steps S5021 and S5022 shown in FIG. 49, and therefore description is omitted. Processes different from FIG. 49 will be described in detail.

In the case where the amount of dust exceeds the value set in advance after the processes of steps S5021 and S5022 have been executed (YES in step S5022), the server 5011 randomly determines the type of garbage bag to be gained by the user (step S5041) and saves the number and type of gained garbage bags in the DB 5012 for each user (step S5042). Next, the server 5011 creates a GUI image in accordance with the number and type of gained garbage bags and causes a garbage bag icon to be displayed in the display screen of the display device 5016 via the GW 5013 (step S5043). For example, as the GUI image, three garbage bag icons 5018 of different types shown in FIG. 51 are displayed on the display screen of the display device 5016.

With the process described above, in this example, the garbage bag icon 5018 increases on the display screen of the display device 5016 in accordance with the amount of dust sucked by the vacuum cleaner 5015, the number and type of gained garbage bags are saved in the DB 5012, and garbage bags with different colors or designs can be gained at random.

Figure 52:
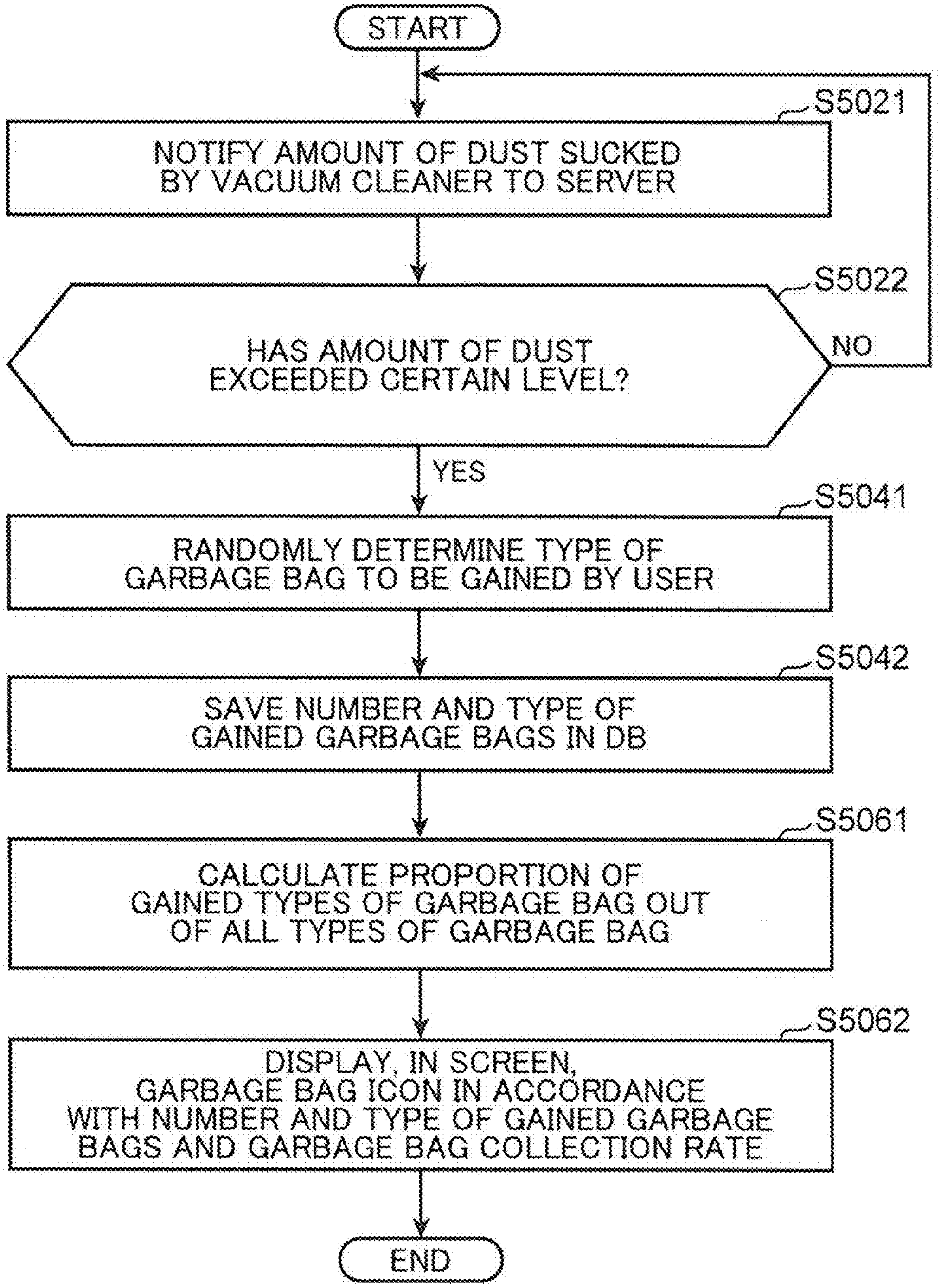
FIG. 52 is a flowchart showing a second extended process in the information sharing system shown in FIG. 47.
Figure 53:
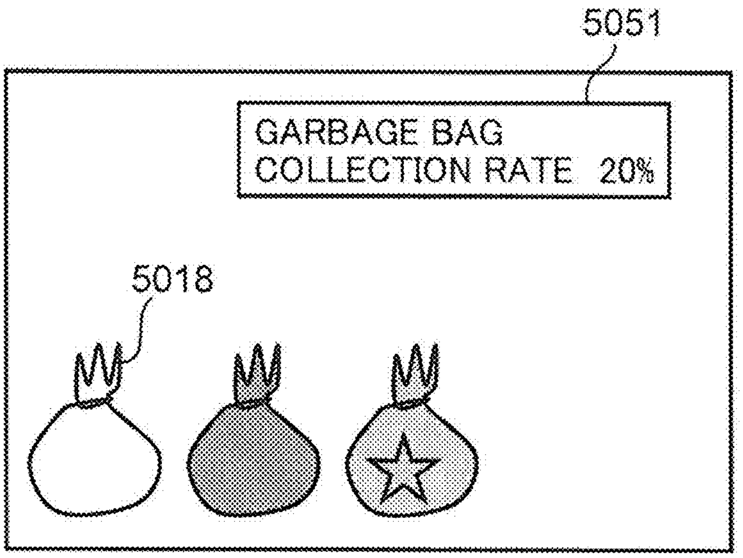
FIG. 53 is a view showing still another example of a display screen displayed in the display device shown in FIG. 47.

The process described above may be extended as in FIG. 52. FIG. 52 is a flowchart showing a second extended process in the information sharing system shown in FIG. 47. FIG. 53 is a view showing another example of a display screen displayed in the display device shown in FIG. 47. Steps S5021 to S5042 shown in FIG. 52 are processes similar to steps S5021 to S5042 shown in FIG. 50, and therefore description is omitted. Processes different from FIG. 50 will be described in detail.

After the process of step S5042 has been executed, the server 5011 calculates the proportion of the gained types of garbage bag (garbage bag collection rate) with respect to all of the types of garbage bags (step S5061). Next, the server 5011 creates a GUI image displaying a garbage bag icon and the garbage bag collection rate in accordance with the number and type of gained garbage bags and causes the garbage bag icon and the garbage bag collection rate to be displayed in the display screen of the display device 5016 via the GW 5013 (step S5062). For example, as the GUI image, three garbage bag icons 5018 of different types shown in FIG. 53 and information 5051 showing "garbage bag collection rate 20%" are displayed on the display screen of the display device 5016.

With the process described above, in this example, the garbage bag icon 5018 increases on the display screen of the display device 5016 in accordance with the amount of dust sucked by the vacuum cleaner 5015, the number and type of gained garbage bags are saved in the DB 5012, garbage bags with different colors or designs can be gained at random, and the types of garbage bags that have been collected at this point can be displayed in percentage.

Figure 54:
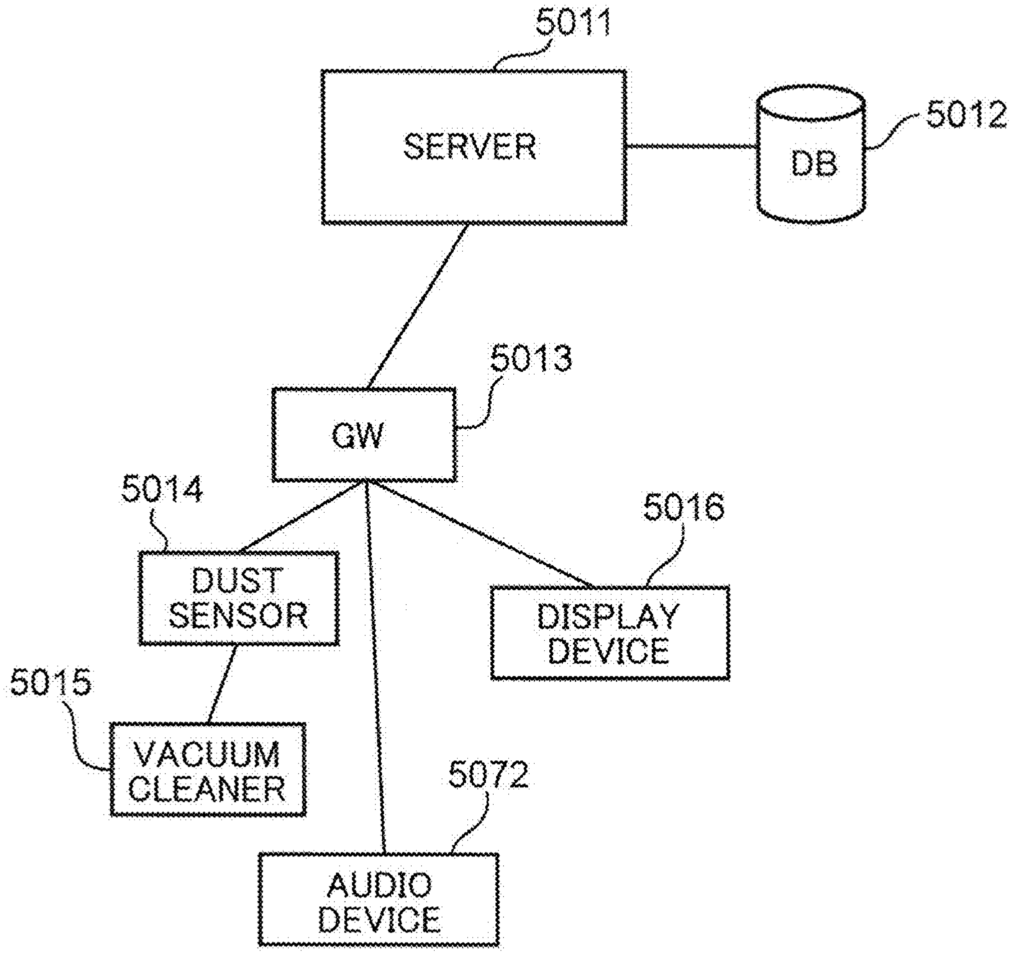
FIG. 54 is a view showing the configuration of another information sharing system in Embodiment 5 of the present invention.
Figure 55:
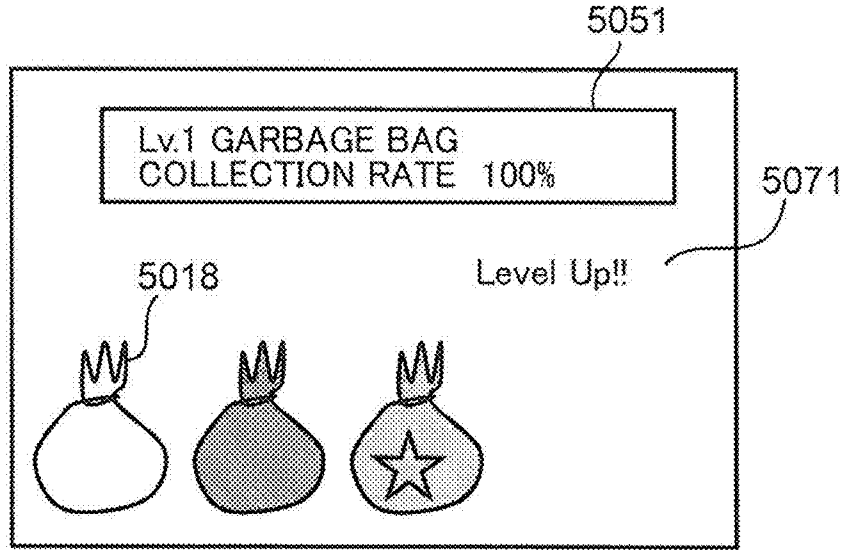
FIG. 55 is a view showing one example of a display screen displayed in a display device shown in FIG. 54.

The information sharing system described above may be extended as in FIG. 54. FIG. 54 is a view showing the configuration of another information sharing system in Embodiment 5 of the present invention. FIG. 55 is a view showing one example of a display screen displayed in a display device shown in FIG. 54.

The information sharing system shown in FIG. 54 includes the server 5011, the DB 5012, the GW 5013, the dust sensor 5014 that is one example of a sensor, the vacuum cleaner 5015 that is one example of a home appliance, the display device 5016, and an audio device 5072.

As shown in FIG. 54, the dust sensor 5014 detects the amount of sucked dust when the vacuum cleaner 5015 sucks up dust. The GW 5013 acquires, from the dust sensor 5014, and notifies, to the server 5011, the amount of dust sucked by the vacuum cleaner 5015.

When the amount of dust exceeds a value set in advance, the server 5011 provides a garbage bag item on an SNS service to a user as a reward. Specifically, the server 5011 randomly determines the type of gained garbage bag and retains the number and type of gained garbage bags in the DB 5012 for each user.

The server 5011 obtains the proportion of the gained types of garbage bags with respect to all of the types of garbage bags as the garbage bag collection rate. The server 5011 causes a GUI image in accordance with the number and type of gained garbage bags to be displayed in the display device 5016 via the GW 5013. For example, in accordance with the number and type of gained garbage bags, the garbage bag icon 5018 shown in FIG. 55 and the information 5051 showing "garbage bag collection rate 100%" are displayed in the display screen of the display device 5016.

In the case where the garbage bag collection rate has become 100%, the housework level of the user levels up. At this time, the server 5011 performs via GW 5013 a display 5071 of a level increase in the display screen of the display device 5016. The user acquires background music (BGM) as a reward, the server 5011 transmits BGM data to the audio device 5072 via the GW 5013, and the BGM is played by the audio device 5072.

Figure 56:
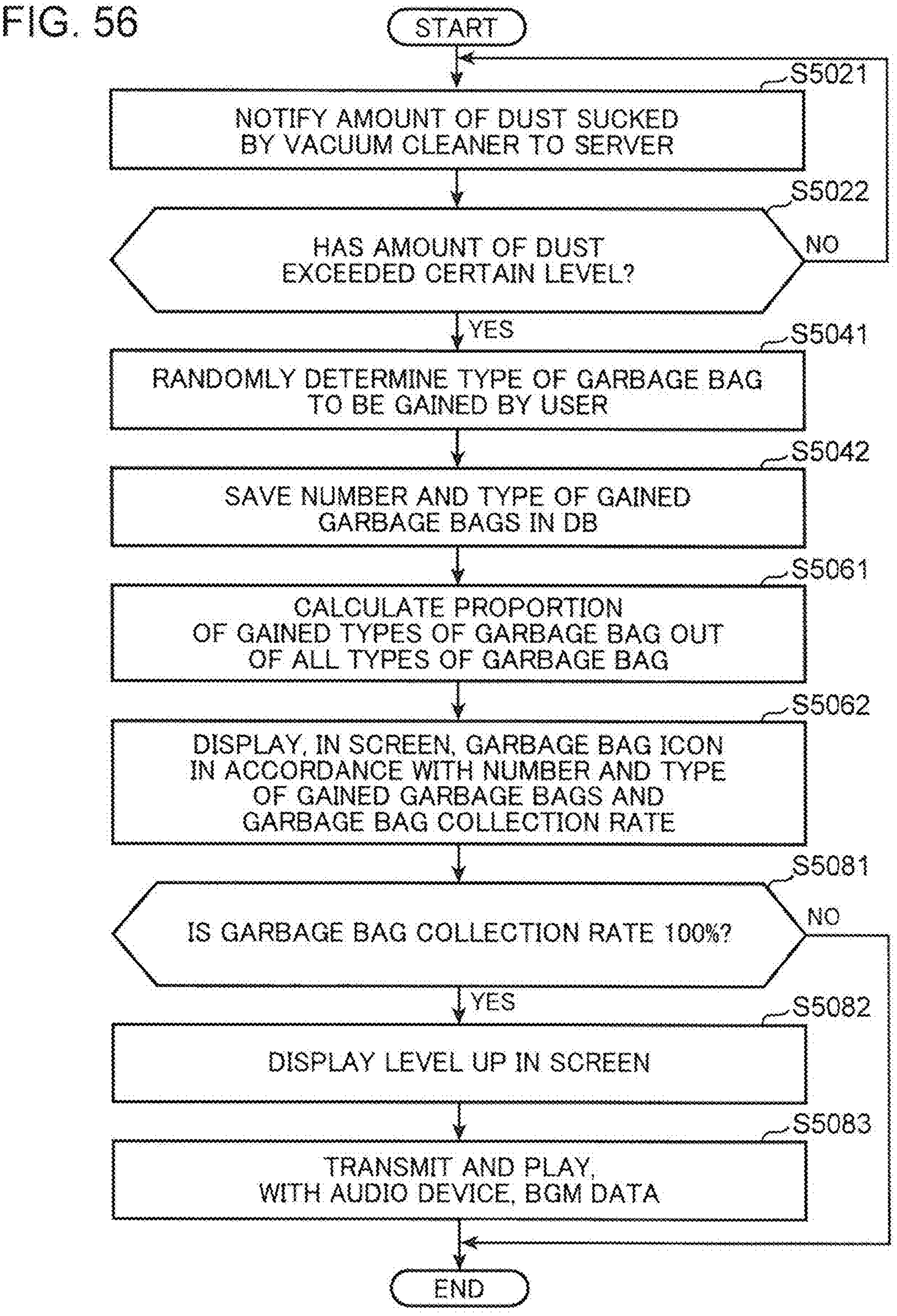
FIG. 56 is a flowchart showing one example of a process in the information sharing system shown in FIG. 54.

FIG. 56 is a flowchart showing one example of a process in the information sharing system shown in FIG. 54. Steps S5021 to S5062 shown in FIG. 56 are processes similar to steps S5021 to S5062 shown in FIG. 52, and therefore description is omitted. Processes different from FIG. 52 will be described in detail.

After the process of step S5062 has been executed, the server 5011 determines whether or not the garbage bag collection rate has become 100% (step S5081) and, in the case where the garbage bag collection rate is not 100% (NO in step S5081), the process is terminated. In the case where the garbage bag collection rate is 100% (YES in step S5081), the server 5011 causes the display of a level increase to be displayed in the display screen of the display device 5016 via the GW 5013 (step S5082). Next, the server 5011 transmits BGM data to the audio device 5072 via the GW 5013 and causes BGM to be played by the audio device 5072 (step S5083).

With the process described above, in this example, the garbage bag icon 5018 increases on the display screen of the display device 5016 in accordance with the amount of dust sucked by the vacuum cleaner 5015, the number and type of gained garbage bags are saved in the DB 5012, garbage bags with different colors or designs can be gained at random, and the types of garbage bags that have been collected at this point can be displayed in percentage. Further, when the garbage bag collection rate is 100%, the cleaning level of a user increases, BGM can be given to the user, and the BGM is played by the audio device 5072. In this manner, in this embodiment, a screen display upon operation of a vacuum cleaner is realized.

(Embodiment 6)

Next, a GUI screen displayed upon operation of a vacuum cleaner, iron, or the like using an SNS application process using a home appliance such as the vacuum cleaner or iron will be described for an information sharing system in Embodiment 6 of the present invention.

Figure 57:
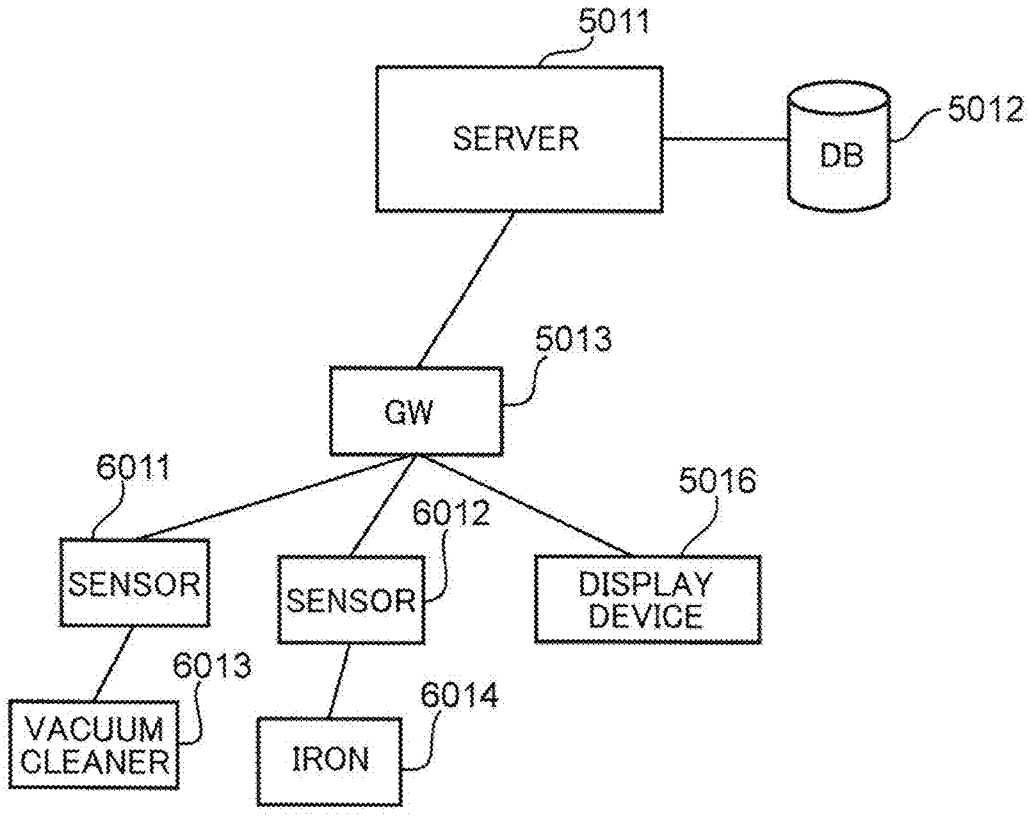
FIG. 57 is a view showing the configuration of an information sharing system in Embodiment 6 of the present invention.
Figure 58:
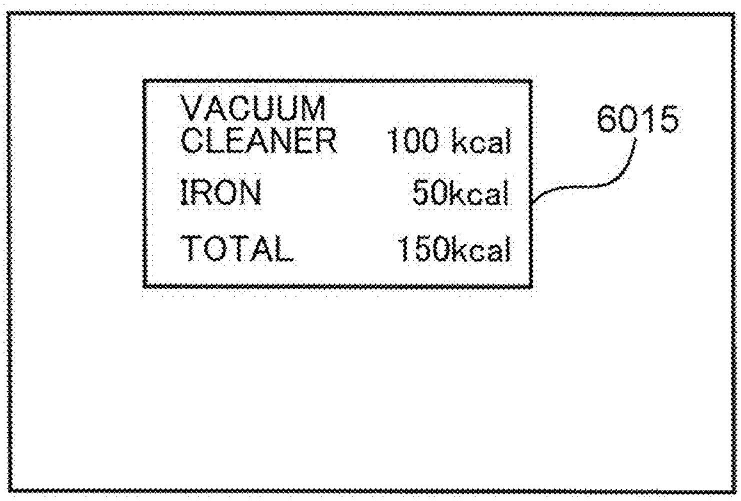
FIG. 58 is a view showing one example of a display screen displayed in a display device shown in FIG. 57.

FIG. 57 is a view showing the configuration of the information sharing system in Embodiment 6 of the present invention. FIG. 58 is a view showing one example of a display screen displayed in a display device shown in FIG. 57. In this embodiment as well, in a similar manner to Embodiment 1, it can be such that home appliance event information including the state of a home appliance is transmitted with respect to the server 5011 via the GW 5013 from a home appliance within each house registered in advance, information on each house is formed as screen information based on the type of the home appliance event information or the occurrence frequency of the home appliance event information, and the screen information is provided with respect to a request of the display device 5016. Regarding this point, description is omitted, and characteristic portions of this embodiment will be described below in detail.

The information sharing system shown in FIG. 57 includes the server 5011, the DB 5012, the GW 5013, sensors 6011 and 6012, a vacuum cleaner 6013 and an iron 6014 that are one example of a home appliance, and the display device 5016. When a user moves the vacuum cleaner 6013 or the iron 6014, the sensor 6011 or 6012 detects the amount of the movement. The GW 5013 acquires, from the sensor 6011 or 6012, and notifies, as home appliance event information to the server 5011, the amount of movement of the vacuum cleaner 6013 or the iron 6014.

In accordance with the amount of movement of the vacuum cleaner 6013 or the iron 6014, the server 5011 calculates the calorie consumption upon performing the housework and retains the calorie consumption in the DB 5012 for each user. The server 5011 generates and, via the GW 5013, causes the display device 5016 to display a graphical user interface (GUI) image in accordance with the calorie consumption. For example, as the GUI image, information 6015 showing the calorie consumption with each home appliance (the vacuum cleaner 6013 or the iron 6014) and the total value is displayed on the display screen of the display device 5016, as shown in FIG. 58.

Figure 59:
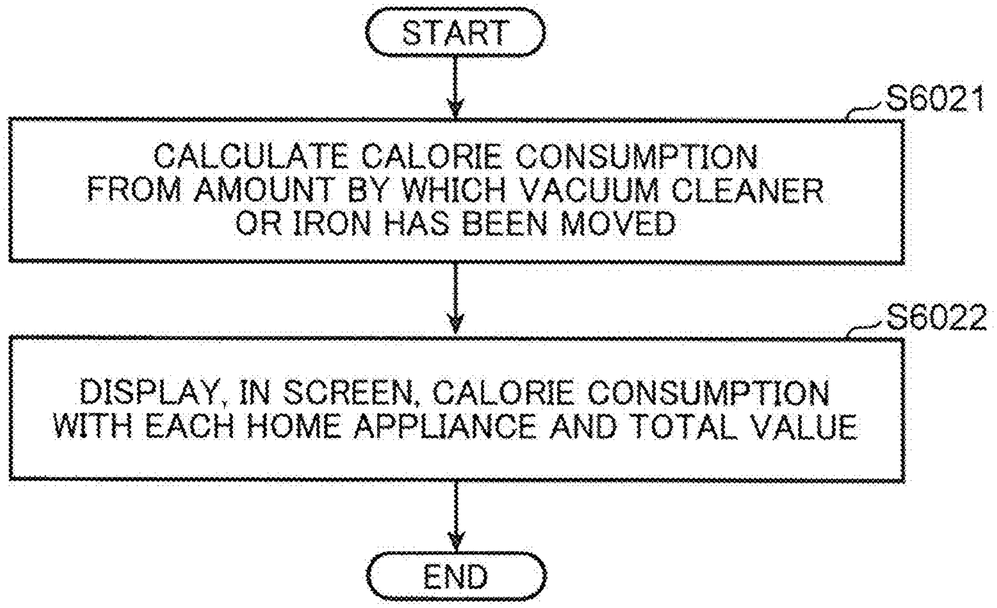
FIG. 59 is a flowchart showing one example of a process in the information sharing system shown in FIG. 57.

FIG. 59 is a flowchart showing one example of a process in the information sharing system shown in FIG. 57. The server 5011 acquires the amount of movement of the vacuum cleaner 6013 or the iron 6014 from the sensor 6011 or 6012 via the GW 5013 and calculates the calorie consumption from the amount by which the vacuum cleaner 6013 or the iron 6014 has been moved (step S6021). Next, the server 5011 generates a GUI image that displays the calorie consumption with each home appliance and the total value for display on the display screen of the display device 5016 via the GW 5013 (step S6022).

With the process described above, in this embodiment, the calorie consumption can be displayed automatically in accordance with the amount by which the vacuum cleaner 6013 or the iron 6014 has been moved upon operation of the home appliance such as the vacuum cleaner 6013 or the iron 6014.

Figure 60:
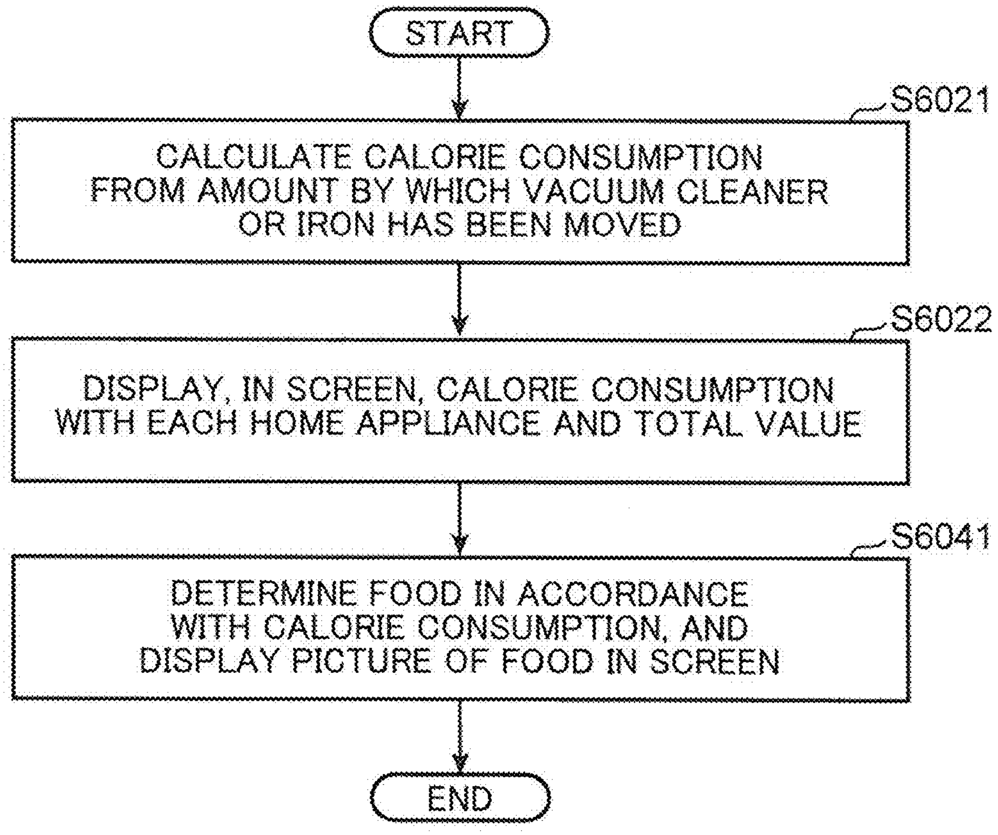
FIG. 60 is a flowchart showing a first extended process in the information sharing system shown in FIG. 57.
Figure 61:
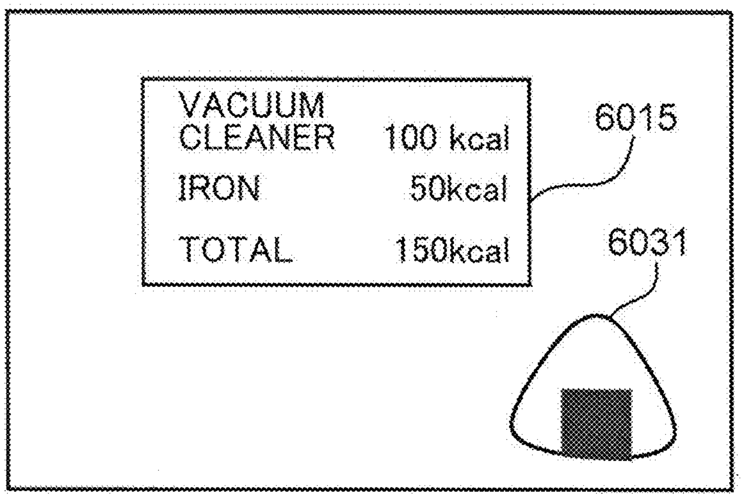
FIG. 61 is a view showing another example of a display screen displayed in the display device shown in FIG. 57.

The process described above may be extended as in FIG. 60. FIG. 60 is a flowchart showing a first extended process in the information sharing system shown in FIG. 57. FIG. 61 is a view showing another example of a display screen displayed in the display device shown in FIG. 57. Steps S6021 and S6022 shown in FIG. 60 are processes similar to steps S6021 and S6022 shown in FIG. 59, and therefore description is omitted. A process different from FIG. 59 will be described in detail.

After the process of step S6022 has been executed, the server 5011 determines food in accordance with the calorie consumption, creates a GUI image including a picture of the determined food, and causes the picture of the food to be displayed in the display screen of the display device 5016 via the GW 5013 (step S6041). For example, as the GUI image, a picture 6031 of food (e.g., rice ball) in accordance with the calorie consumption is displayed on the display screen of the display device 5016, as shown in FIG. 61.

With the process described above, in this example, the calorie consumption can be displayed in accordance with the amount by which the vacuum cleaner 6013 or the iron 6014 has been moved, and a picture of food corresponding to the displayed calorie can be displayed.

Figure 62:
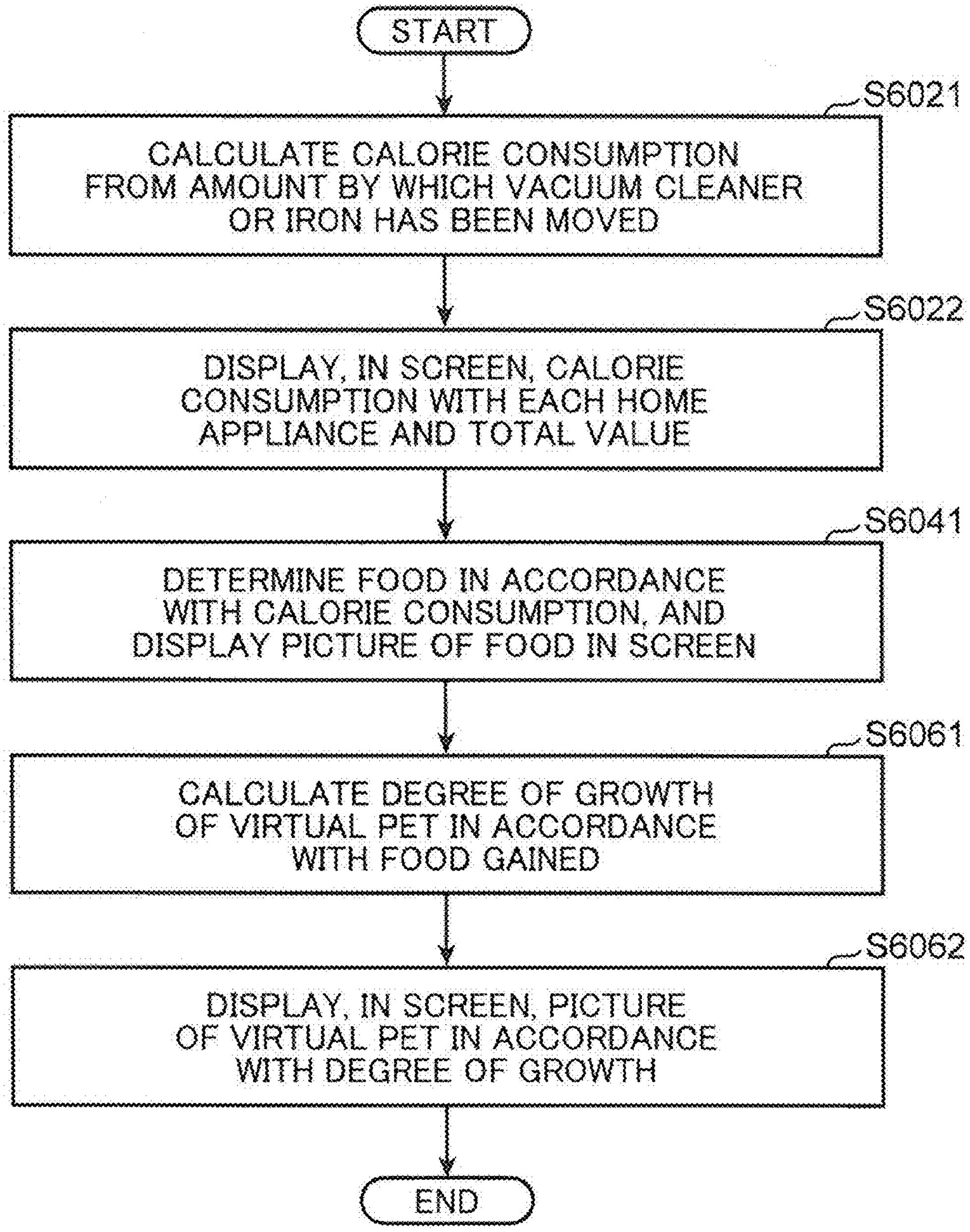
FIG. 62 is a flowchart showing a second extended process in the information sharing system shown in FIG. 57.
Figure 63:
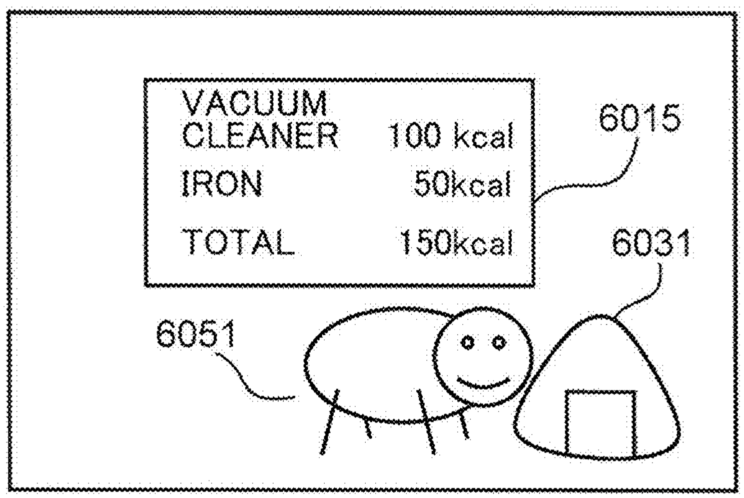
FIG. 63 is a view showing still another example of a display screen displayed in the display device shown in FIG. 57.

The process described above may be extended as in FIG. 62. FIG. 62 is a flowchart showing a second extended process in the information sharing system shown in FIG. 57. FIG. 63 is a view showing still another example of a display screen displayed in the display device shown in FIG. 57. Steps S6021 to S6041 shown in FIG. 62 are processes similar to steps S6021 to S6041 shown in FIG. 60, and therefore description is omitted. Processes different from FIG. 60 will be described in detail.

After the process of step S6041 has been executed, the server 5011 adds the degree of growth of a virtual pet in accordance with gained food (step S6061), creates a GUI image including a picture of the virtual pet in accordance with the degree of growth, and causes the picture of the virtual pet to be displayed in the display screen of the display device 5016 via the GW 5013 (step S6062). For example, as the GUI image, a picture 6051 of a virtual pet in accordance with the degree of growth is displayed on the display screen of the display device 5016, as shown in FIG. 63.

With the process described above, in this example, the calorie consumption can be displayed in accordance with the amount by which the vacuum cleaner 6013 or the iron 6014 has been moved, a picture of corresponding food can be displayed in accordance with the displayed calorie, and the food can further be obtained as an item with which a virtual pet can be fed to enable growth of the pet. In this manner, in this embodiment, a screen display upon operation of a home appliance such as a vacuum cleaner or iron is realized.

From each embodiment described above, each aspect of the present invention is described as follows. That is, an information sharing method according to one aspect of the present invention is an information sharing method that provides a graphical user interface image for sharing information relating to an appliance within a home among a plurality of users, including a receiving step of receiving, as home appliance event information, information on a state change of an appliance within a plurality of homes, a priority determining step of determining a priority of a home that is to be displayed in the graphical user interface image in accordance with an occurrence frequency of the home appliance event information within each home, and a home determining step of determining a home to be displayed in the graphical user interface image in accordance with the priority.

With the information sharing method, information on the state change of an appliance within a plurality of homes is received as home appliance event information, the priority of a home that should be displayed in a graphical user interface image is determined in accordance with the occurrence frequency of the home appliance event information within each home, and a home to be displayed in the graphical user interface image is determined in accordance with the priority. Thus, a more attractive graphical user interface image with enhanced reality or real time properties of information can be provided, since a plurality of users can share information on the state change of the appliance that has actually occurred. It is possible to enhance reality or real time properties of information compared to an existing SNS, and a service with which more attractive content can be enjoyed can be provided.

As a result, an information sharing service having a more attractive graphical user interface image with enhanced reality or real time properties of information can be provided by constructing a method of sharing, between a plurality of users, information on the state change of an appliance that has actually occurred and associating, with an event, and displaying information on a text or photograph posted by a user.

It is preferable that the home appliance event information include home appliance type information representing a type of the appliance, and the priority determining step be implemented such that the home appliance event information is classified for each type of appliance using the home appliance type information and a priority of a home that should be displayed in the graphical user interface image is determined in accordance with an occurrence frequency of home appliance event information for each type of appliance.

In this case, information on the state change of an appliance relating to a community to which a user belongs can be shared, since the priority of a home that should be displayed in a graphical user interface image is determined in accordance with the occurrence frequency of home appliance event information for each type of appliance.

It is preferable that a displaying step of changing and displaying, in the graphical user interface image, a display state of an appliance icon representing an appliance within a home determined in the home determining step, in accordance with an occurrence frequency of home appliance event information for each type of the appliance, be further included.

In this case, the state change of an appliance relating to a community to which a user belongs can be displayed clearly to the user, since the display state of an appliance icon representing the appliance within a home can be changed and displayed in a graphical user interface image in accordance with the occurrence frequency of home appliance event information for each type of appliance.

It is preferable that the home appliance event information include home appliance type information representing a type of the appliance and housework type information representing a type of housework associated with a type of appliance specified by the home appliance type information, and the priority determining step be implemented such that the home appliance event information is classified for each type of housework using the housework type information and a priority of a home that is to be displayed is determined in accordance with an occurrence frequency of home appliance event information associated with a type of housework selected by a user.

In this case, information on the state change of an appliance can be shared with another user having interest in a housework selected by a user, since the priority of a home that should be displayed can be determined in accordance with the occurrence frequency of home appliance event information associated with the type of housework selected by the user.

It is preferable that a displaying step of changing and displaying, in the graphical user interface image, a display state of a home icon representing a home determined in the home determining step, in accordance with an occurrence frequency of home appliance event information associated with a type of housework selected by the user, be further included.

In this case, the state within a home of another user having interest in a housework selected by a user can be displayed clearly to a user, since the display state of a home icon representing a home can be changed and displayed in a graphical user interface image in accordance with the occurrence frequency of home appliance event information associated with the type of housework selected by the user.

It is preferable that a message information receiving step of receiving message information including request information requesting display in coordination with a type of appliance or type of housework selected by a user and also including a message input by the user and a displaying step of superimposing and displaying the message in the graphical user interface image when home appliance event information associated with a type of appliance or type of housework specified by the request information has been received be further included.

In this case, a message can be displayed at a timing of a change in state of an appliance, since the message is superimposed and displayed in a graphical user interface image when home appliance event information associated with the type of appliance or type of housework specified by request information has been received after message information including the request information requesting display in coordination with the type of appliance or type of housework selected by a user and the message input by the user has been received. Since a sender of the message can associate the message of the sender with the home appliance event information confirming the same more simply at the time of sending the message, an information sharing service that is attractive also to the sender of the message can be provided.

It is preferable that the displaying step be implemented such that a home icon representing a home determined in the home determining step is displayed in the graphical user interface image and the message is superimposed and displayed near the home icon.

In this case, a message relating to a home can be checked easily, since the message is superimposed and displayed near a home icon representing the home.

It is preferable that the displaying step be implemented such that an appliance icon representing an appliance within a home determined in the home determining step is displayed in the graphical user interface image and the message is superimposed and displayed near the appliance icon.

In this case, a message relating to an appliance can be checked easily, since the message is superimposed and displayed near an appliance icon representing the appliance within a home.

It is preferable that the home appliance event information include home appliance type information representing a type of the appliance, the method further including: a transitioning step of causing a display screen to transition from the graphical user interface image to a community image relating to a type of appliance specified by home appliance type information included in the home appliance event information in a case where the home appliance event information has been received when the graphical user interface image is displayed.

In this case, a display screen can be changed from a graphical user interface image to a community image relating to the type of appliance in accordance with an appliance used by a user, and the display screen can be changed from the community image relating to the type of appliance to the graphical user interface image in accordance with the termination of use of the appliance.

It is preferable that a displaying step of acquiring, when a new appliance within a home has been detected, community list information that relates to the new appliance, and superimposing and displaying the community list information in the graphical user interface image be further included.

In this case, community list information that relates to a new appliance can be superimposed and displayed in a graphical user interface image to automatically update a display screen without troubling a user with operation, since the community list information that relates to the new appliance is superimposed and displayed in the graphical user interface image when the new appliance within a home has been detected.

It is preferable that the home appliance event information include operation information representing an operation situation of the appliance and home appliance type information representing a type of the appliance, the method further including: a displaying step of determining, as a community to which a user is related, a community associated with a type of appliance specified by the home appliance type information and displaying a user interface image relating to the community in accordance with an operation state of an appliance specified by the operation information.

In this case, a user interface image relating to another community participant can be displayed automatically by operation of an appliance in the case where a user is participating in a community, since a community associated with the type of appliance specified by home appliance type information is determined as a community to which the user is related and a user interface image relating to the determined community is displayed in accordance with the operation state of the appliance specified by operation information.

It is preferable that the appliance include a washstand having a gateway function and a bathroom scale, and the displaying step be implemented such that a relationship of another user with one user belonging to the community is displayed in class as the user interface image.

In this case, the motivation of a user belonging to a community aimed at dieting can be maintained, since a washstand and a bathroom scale are caused to coordinate and the relationship of another user with one user belonging to the community is displayed in class.

INDUSTRIAL APPLICABILITY

In a manner described above, it is possible to enhance reality or real time properties of information compared to an existing information sharing service such as SNS on the Internet, and a service that can be enjoyed as more attractive content can be provided. Further, a sender of information can associate a message of the sender with an event confirming the same more simply at the time of sending the information. Therefore, the service is attractive also to the sender.

The invention claimed is:

1. An information sharing method that provides a graphical user interface image for sharing information relating to an appliance within a home among a plurality of users in an information sharing system including a server, the information sharing method comprising:

a receiving step in which the server receives, as home appliance event information from each of a plurality of homes, information on a state change of an appliance within the home, the home appliance event information including (i) home appliance type information representing a type of the appliance and (ii) housework type information representing a type of housework associated with the type of the appliance represented by the home appliance type information;

a priority determining step in which the server determines, for each of the homes, a priority level for display in a graphical user interface image, the priority level for display being determined by (i) for each type of housework or type of appliance, calculating an occurrence frequency of the home appliance event information within a unit time, and correcting the occurrence frequency by multiplying the calculated occurrence frequency by a weighted coefficient corresponding to the type of housework or the type of appliance, and (ii) determining the priority level for display for the home based on the corrected occurrence frequency;

a home determining step in which the server determines, from among the homes, a home to be displayed in the graphical user interface image in accordance with the determined priority level for display; and a displaying step of displaying, in the graphical user interface image, a display state of the home determined to be displayed in the home determining step.

2. The information sharing method according to claim 1, wherein in the displaying step is implemented such that the display state is an appliance icon representing an appliance within the home determined in the home determining step, the appliance icon being displayed in accordance with the corrected occurrence frequency of home appliance event information for each type of the appliance.

3. The information sharing method according to claim 1, wherein the displaying step is implemented such that the display state is a home icon representing the home determined in the home determining step, the home icon being displayed in accordance with the corrected occurrence frequency of home appliance event information associated with a type of housework selected by the user.

4. The information sharing method according to claim 1, further comprising:

a message information receiving step of receiving message information including request information requesting display in coordination with a type of appliance or type of housework selected by a user and also including a message input by the user; and a displaying step of superimposing and displaying the message in the graphical user interface image when home appliance event information associated with a type of appliance or type of housework specified by the request information has been received.

5. The information sharing method according to claim 4, wherein the displaying step is implemented such that a home icon representing a home determined in the home determining step is displayed in the graphical user interface image and the message is superimposed and displayed near the home icon.

6. The information sharing method according to claim 4, wherein the displaying step is implemented such that an appliance icon representing an appliance within a home determined in the home determining step is displayed in the graphical user interface image and the message is superimposed and displayed near the appliance icon.

7. The information sharing method according to claim 1, further comprising a transitioning step of causing a display screen to transition from the graphical user interface image to a community image relating to a type of appliance specified by home appliance type information included in the home appliance event information in a case where the home appliance event information has been received when the graphical user interface image is displayed.

8. The information sharing method according to claim 1, further comprising a displaying step of acquiring, when a new appliance within a home has been detected, community list information that relates to the new appliance, and superimposing and displaying the community list information in the graphical user interface image.

9. The information sharing method according to claim 1, wherein the home appliance event information includes operation information representing an operation situation of the appliance, the method further comprising:

a displaying step of determining, as a community to which a user is related, a community associated with a type of appliance specified by the home appliance type information, and displaying a user interface image relating to the community in accordance with an operation state of an appliance specified by the operation information.

10. The information sharing method according to claim 9, wherein the appliance includes a washstand having a gateway function and a bathroom scale, and the displaying step is implemented such that a relationship of another user with one user belonging to the community is displayed in class as the user interface image.

11. The information sharing method according to claim 1, further comprising a transmitting step performed by the server of transmitting the graphical user interface image to each of the plurality of users, the plurality of users including a first user, wherein the displaying step is implemented such that the graphical user interface image is displayed on a display device of the first user such that (i) the display state of the home determined to be displayed in the home determining step is displayed and (ii) a display state of a home of the first user is displayed, the home of the first user being different from the home determined to be displayed in the home determining step.

* * * * *